(12) United States Patent
Ooi et al.

(10) Patent No.: US 10,746,908 B2
(45) Date of Patent: Aug. 18, 2020

(54) OPTICAL FILTER AND IMAGING DEVICE

(71) Applicant: AGC Inc., Chiyoda-ku (JP)

(72) Inventors: Yoshiharu Ooi, Chiyoda-ku (JP);
Hiroshi Kumai, Chiyoda-ku (JP);
Kazuhiko Shiono, Koriyama (JP);
Hiroki Hotaka, Koriyama (JP)

(73) Assignee: AGC Inc., Chiyoda-ku (JP)

( * ) Notice: Subject to any disclaimer, the term of this patent is extended or adjusted under 35 U.S.C. 154(b) by 452 days.

(21) Appl. No.: 15/819,670

(22) Filed: Nov. 21, 2017

(65) Prior Publication Data
US 2018/0095203 A1 Apr. 5, 2018

Related U.S. Application Data

(63) Continuation of application No. PCT/CT2016/078010, filed on Sep. 23, 2016.

(30) Foreign Application Priority Data

Sep. 25, 2015 (JP) .................................. 2015-188949

(51) Int. Cl.
*G02B 5/20* (2006.01)
*G02B 5/22* (2006.01)
(Continued)

(52) U.S. Cl.
CPC .............. *G02B 5/208* (2013.01); *C03C 4/082* (2013.01); *C03C 17/007* (2013.01); *C03C 17/42* (2013.01);
(Continued)

(58) Field of Classification Search
CPC . G02B 5/208; G02B 5/22; G02B 5/28; G02B 5/282; G02B 5/223; G02B 5/226;
(Continued)

(56) References Cited

U.S. PATENT DOCUMENTS

2007/0127126 A1 6/2007 Terada
2010/0188737 A1 7/2010 Terada
(Continued)

FOREIGN PATENT DOCUMENTS

CA 2 838 581 A1 12/2012
CN 103608705 A 2/2014
(Continued)

OTHER PUBLICATIONS

International Search Report dated Dec. 20, 2016 in PCT/JP2016/078010, filed on Sep. 23, 2016 (with English Translation).
(Continued)

*Primary Examiner* — Stephone B Allen
*Assistant Examiner* — Adam W Booher
(74) *Attorney, Agent, or Firm* — Oblon, McClelland, Maier & Neustadt, L.L.P.

(57) ABSTRACT

There is provide an optical filter suppressed in incidence angle dependence and having high visible light transmittance. The optical filter includes: an absorption layer containing a first near-infrared absorbent (DA) having a maximum absorption wavelength $\lambda(DA\_T_{min})$ in wavelengths of 685 to 715 nm and a second near-infrared absorbent (DB) having a maximum absorption wavelength $\lambda(DB\_T_{min})$ in wavelengths of 705 to 725 nm or wavelengths of more than 725 nm and 900 nm or less on a side of a wavelength longer than the maximum absorption wavelength $\lambda(DA\_T_{min})$, and satisfying specific light absorption characteristics; and a reflection layer including a dielectric multilayer film satisfying specific reflection characteristics in wavelengths of 700 to 1150 nm, wherein a transmittance of the reflection layer in a boundary region of visible light and near-infrared light and a transmittance of the absorption layer have a specific relation.

24 Claims, 28 Drawing Sheets

(51) Int. Cl.
*G02B 5/28* (2006.01)
*C03C 17/42* (2006.01)
*C09B 57/00* (2006.01)
*C03C 17/00* (2006.01)
*C03C 4/08* (2006.01)
*G02B 1/04* (2006.01)
*G03B 11/00* (2006.01)

(52) U.S. Cl.
CPC .............. *C09B 57/007* (2013.01); *G02B 1/04* (2013.01); *G02B 5/22* (2013.01); *G02B 5/28* (2013.01); *G02B 5/282* (2013.01); *C03C 2204/00* (2013.01); *C03C 2217/445* (2013.01); *C03C 2217/485* (2013.01); *C03C 2217/734* (2013.01); *C03C 2218/365* (2013.01); *G03B 11/00* (2013.01)

(58) Field of Classification Search
CPC .. G02B 5/26; G02B 5/281; G02B 5/285–289; G02B 1/04; C03C 4/082; C03C 17/007; C03C 17/42; C03C 2204/00; C03C 2217/445; C03C 2217/485; C03C 2217/734; C03C 2218/365; C09B 57/007; G03B 11/00
See application file for complete search history.

(56) References Cited

U.S. PATENT DOCUMENTS

| | | |
|---|---|---|
| 2014/0063597 A1 | 3/2014 | Shimmo et al. |
| 2014/0091419 A1 | 4/2014 | Hasegawa et al. |
| 2014/0139912 A1 | 5/2014 | Osawa et al. |
| 2015/0146057 A1 | 5/2015 | Konishi et al. |
| 2015/0259547 A1 | 9/2015 | Ezoe et al. |
| 2015/0260889 A1 | 9/2015 | Shiono et al. |
| 2015/0285971 A1 | 10/2015 | Nagaya et al. |
| 2016/0170105 A1 | 6/2016 | Nagaya et al. |
| 2017/0146708 A1 | 5/2017 | Lah |

FOREIGN PATENT DOCUMENTS

| | | |
|---|---|---|
| CN | 104823083 A | 8/2015 |
| CN | 104838294 A | 8/2015 |
| CN | 105452911 A | 3/2016 |
| EP | 2 927 717 A1 | 10/2015 |
| JP | 2007-183525 | 7/2007 |
| JP | 2013-190553 | 9/2013 |
| JP | 2014-52482 | 3/2014 |
| JP | 2014-130344 | 7/2014 |
| JP | 5884953 | 3/2016 |
| JP | 2016-142891 | 8/2016 |
| KR | 10-2014-0041528 | 4/2014 |
| KR | 10-1453469 B1 | 10/2014 |
| KR | 10-2015-0072428 | 6/2015 |
| KR | 10-2015-0094631 | 8/2015 |
| KR | 10-2016-0027201 | 3/2016 |
| TW | 201428067 A | 7/2014 |
| TW | 201520609 A | 6/2015 |
| WO | WO 2012/169447 A1 | 12/2012 |
| WO | WO 2013/015303 A1 | 1/2013 |
| WO | WO 2014/002864 A1 | 1/2014 |
| WO | WO 2014/030628 A1 | 2/2014 |
| WO | WO 2014/084289 A1 | 6/2014 |
| WO | WO 2014/088063 A1 | 6/2014 |
| WO | WO 2015/056734 A1 | 4/2015 |

OTHER PUBLICATIONS

Written Opinion dated Dec. 20, 2016 in PCT/JP2016/078010, filed on Sep. 23, 2016.

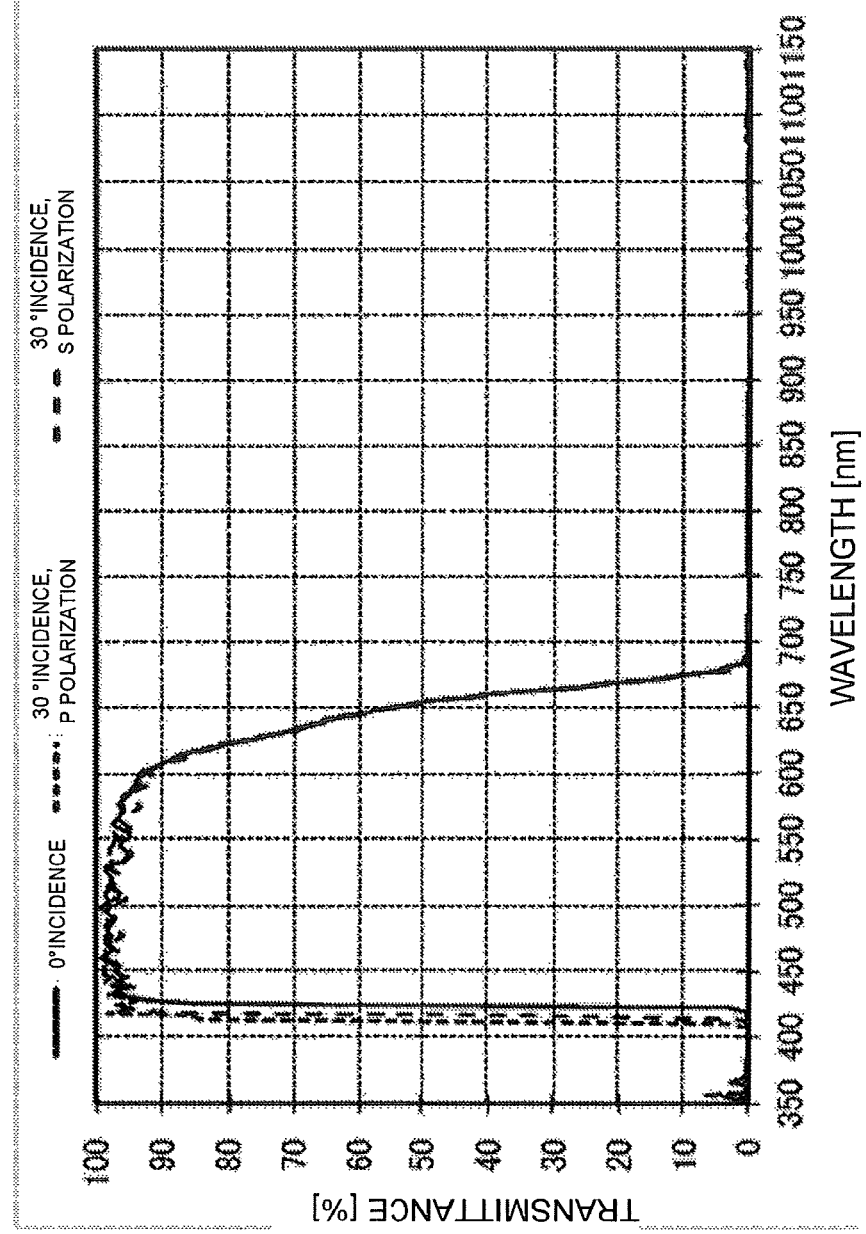

OPTICAL FILTER AND IMAGING DEVICE

CROSS-REFERENCE TO RELATED APPLICATIONS

This application is a continuation of prior International Application No. PCT/JP2016/078010, filed on Sep. 23, 2016 which is based upon and claims the benefit of priority from Japanese Patent Application No. 2015-188949, filed on Sep. 25, 2015; the entire contents of all of which are incorporated herein by reference.

FIELD

The present invention relates to an optical filter that transmits visible light and blocks near-infrared light, and an imaging device including the optical filter.

BACKGROUND

In an imaging device using a solid-state image sensing device, an optical filter that transmits light in a visible range (hereinafter, referred to also as "visible light") and blocks light in a near-infrared range (hereinafter, referred to also as "near-infrared light") is used in order to reproduce the color tone satisfactorily and obtain a clear image. As the optical filter, a near-infrared cut filter including an absorption layer containing a near-infrared absorbing dye and a reflection layer composed of a dielectric multilayer film blocking light in an ultraviolet range (hereinafter, referred to also as "ultraviolet light") and the near-infrared light is known (refer to Patent Reference 1 (JP-A 2013-190553), Patent Reference 2 (JP-A 2014-052482), Patent Reference 3 (International Publication WO2014/002864). More specifically, the dielectric multilayer film itself changes in spectral transmittance curve depending on an incidence angle, and the near-infrared cut filter including both of the reflection layer and the absorption layer can obtain a spectral transmittance curve with the incidence angle dependence suppressed by the absorption characteristics of the absorption layer.

The absorption layer is obtained, for example, by dispersing a near-infrared absorbing dye exhibiting maximum absorption in wavelengths of 700 to 750 nm and having a steep absorbing curve of light in wavelengths of 630 to 700 nm in a transparent resin. Here, when the content of the dye is reduced to prevent the absorption layer from causing a decrease in the transmittance for light of wavelengths of 440 to 600 nm where the visibility is high, a near-infrared absorption band where a predetermined absorptance is obtained narrows. In this case, the incidence angle dependence of the reflection layer becomes obvious so that a wavelength range where light blocking is insufficient may appear.

The optical filters in Patent References 1 and 2 generally obtain an effect of decreasing the incidence angle dependence of the transmittance by the absorption layer in a wavelength range where the transmittance becomes more than 50% in a transmittance transition range where the transmittance greatly changes, of wavelengths of 600 to 700 nm. However, in a wavelength range where the transmittance is 50% or less in the transmittance transition range, even the absorption layer cannot sufficiently absorb light, causing a problem that the incidence angle dependence of the spectral transmittance in the reflection layer becomes obvious as the incidence angle dependence of the optical filter.

Hence, to expand the absorption band suppressing the incidence angle dependence, an absorption layer containing two or more kinds of near-infrared absorbing dyes different in maximum absorption wavelength is under discussion. Patent References 2 and 3 disclose optical filters for which two or more kinds of near-infrared absorbing dyes different in maximum absorption wavelength can be used. Besides, Patent Reference 4 (International Publication WO2012/169447) discloses an optical filter using an absorption layer containing two kinds of near-infrared absorbing dyes having different maximum absorption wavelengths such as wavelengths of 695 to 720 nm and wavelengths of 720 to 800 nm. Further, Patent Reference 5 (Korean Registered Patent 1453469) discloses an optical filter using an absorption layer containing two kinds of light absorbents having different maximum absorption wavelengths such as a wavelength of 685 nm and a wavelength of 702 nm.

The optical filter including an absorption layer containing two kinds of near-infrared absorbing dyes as described above is easy to suppress the incidence angle dependence of the transmittance in the transmittance transition range. However, if the absorbency for the near-infrared light is tried to increase by increasing the additive amount of the dyes, an absorption band where merely slight light absorption can be recognized broadens, so that the transmittance for visible light where high transmittance should be normally obtained also decreases. On the other hand, if the additive amount of the dyes is decreased, the performance of blocking the near-infrared light by absorption decreases, so that the above-described incidence angle dependence becomes obvious. As a result, the suppress of incidence angle dependence and the securement of high visible light transmittance are in a trade-off relation, causing a problem that an optical filter capable of obtaining both characteristics cannot be realized.

SUMMARY

An object of the present invention is to provide an optical filer that keeps high transmittance for visible light of wavelengths of 440 to 600 nm where visibility is high and obtaining high blocking property against light of wavelengths of 700 to 1150 nm where the sensitivity of a solid-state image sensing device is high. Another object of the present invention is to provide an optical filer approximately correcting the spectral sensitivity of the solid-state image sensing device with respect to light of wavelengths of 600 to 690 nm to a high efficiency curve corresponding to the visibility curve and having less change in spectral transmittance curves with respect to incident light at incidence angles of 0° to 30° in addition to the above-described optical characteristics, and an imaging device including the optical filter.

The present invention provides an optical filter including: an absorption layer containing a first near-infrared absorbent (DA) having a maximum absorption wavelength $\lambda$(DA_$T_{min}$) in wavelengths of 685 to 715 nm and a second near-infrared absorbent (DB) having a maximum absorption wavelength $\lambda$(DB_$T_{min}$) in wavelengths of 705 to 725 nm, and satisfying the following requirements (i-1) to (i-3); and a reflection layer comprising a dielectric multilayer film satisfying the following requirements (ii-1) to (ii-2), (i-1) 10 nm≤$\lambda$(DB_$T_{min}$)−$\lambda$(DA_$T_{min}$)<40 nm, (i-2) a transmittance for light of a wavelength of 600 nm is 80% or more, a transmittance for light of a wavelength of 650 nm is 40% or more, a transmittance for light of a wavelength of 700 nm is 3% or less, and a transmittance for light of a wavelength of 714 nm is 10% or less, (i-3) $\{\lambda Sh(DAB\_T5\%)-\lambda Sh(DAB\_T90\%)\} \geq \{\lambda Sh(DAB\_T5\%)-\lambda Sh(DAB\_T50\%)\}$ where $\lambda Sh(DAB\_T90\%)$, $\lambda Sh(DAB\_T50\%)$ and $\lambda Sh(DAB\_T5\%)$ indicate wavelengths at which transmittances in wavelengths of 580 nm to $\lambda(DA\_T_{min})$ become 90%, 50% and 5% respectively, (ii-1) the reflection layer has a reflection band where a transmittance with respect to light at an incidence angle of 0° in wavelengths of 700 to 1150 nm becomes 5% or less, and (ii-2) $\lambda Sh(DAB\_T10\%)+30$ nm$<\lambda_R(0°\_T50\%)<\lambda Lo(DAB\_T5\%)$ where $\lambda_R(0°\_T50\%)$ indicates a wavelength at which a transmittance with respect to the light at the incidence angle of 0° in wavelengths of 680 to 750 nm becomes 50%, $\lambda Sh(DAB\_T10\%)$ indicates a wavelength at which a transmittance of the absorption layer in the wavelengths of 580 nm to $\lambda(DA\_T_{min})$ becomes 10%, and $\lambda Lo(DAB\_T5\%)$ indicates a wavelength at which a transmittance thereof in wavelengths $\lambda(DB\_T_{min})$ to 800 nm becomes 5%.

The present invention further provides an optical filter including: an absorption layer containing a first near-infrared absorbent (DA) having a maximum absorption wavelength $\lambda(DA\_T_{min})$ in wavelengths of 685 to 715 nm and a second near-infrared absorbent (DB) having a maximum absorption wavelength $\lambda(DB\_T_{min})$ in wavelengths of more than 725 nm and 900 nm or less, and the satisfying following requirements (i-4) to (i-6); and a reflection layer comprising a dielectric multilayer film satisfying the following requirements (ii-3) to (ii-5), (i-4) 40 nm$\leq \lambda(DB\_T_{min})$ S 215 nm, (i-5) a transmittance for light of a wavelength of 600 nm is 80% or more, a transmittance for light of a wavelength of 650 nm is 40% or more, a transmittance for light of the wavelength $\lambda(DA\_T_{min})$ is 3% or less, and a transmittance for light of the wavelength $\lambda(DB\_T_{min})$ is 3% or less, (i-6) $\{\lambda Sh(DAB\_T50\%)-\lambda Sh(DAB\_T90\%)\} \geq \{\lambda Sh(DAB\_T5\%)-\lambda Sh(DAB\_T50\%)\}$ where $\lambda Sh(DAB\_T90\%)$, $\lambda Sh(DAB\_T50\%)$ and $\lambda Sh(DAB\_T5\%)$ indicate wavelengths at which transmittances in wavelengths of 580 nm to $\lambda(DA\_T_{min})$ become 90%, 50% and 5% respectively, (ii-3) the reflection layer has a reflection band where a transmittance with respect to light at an incidence angle of 0° in wavelengths of 700 to 1150 nm becomes 5% or less, (ii-4) $\lambda Sh(DAB\_T10\%)+20$ nm$<\lambda_R(0°\_T50\%)<\lambda_C(T_{max})$ where $\lambda_R(0°\_T50\%)$ indicates a wavelength at which a transmittance with respect to the light at the incidence angle of 0° in wavelengths of 680 to 750 nm becomes 50%, $\lambda Sh(DAB\_T10\%)$ indicates a wavelength at which a transmittance of the absorption layer in the wavelengths of 580 nm to $\lambda(DA\_T_{min})$ becomes 10%, and $\lambda_C(T_{max})$ indicates a wavelength at which a transmittance of the absorption layer becomes maximum in wavelengths $\lambda(DA\_T_{min})$ to $\lambda(DB\_T_{min})$, and (ii-5) 0 nm$<\delta\lambda_R Sh(T50\%) \leq 25$ nm where $\delta\lambda_R Sh(T50\%)$ indicates a difference between $\lambda_R(0°\_T50\%)$ and $\lambda_R(30°\_Ts50\%)$, and $\lambda_R(30°\_Ts50\%)$ indicates a wavelength at which a transmittance with respect to s-polarized light at an incidence angle of 30° in wavelengths of 640 to 750 nm becomes 50%.

The present invention provides an optical filer that keeps high transmittance for visible light of wavelengths of 440 to 600 nm where the visibility is high and realizes low transmittance capable of obtaining high blocking property against light of wavelengths of 700 to 1150 nm. The present invention further provides an optical filer approximating the spectral sensitivity curve of wavelengths of 600 to 690 nm to a curve capable of realizing high efficiency corresponding to the visibility curve and having less change in spectral transmittance curves with respect to incident light at incidence angles of 0° to 30° in addition to the above-described optical characteristics. Further, an imaging device excellent in color reproducibility using the optical filter is obtained.

BRIEF DESCRIPTION OF THE DRAWINGS

FIG. 21B is a graph illustrating calculation results of spectral transmittances of an optical filter 30(d) in Example 3.

DETAILED DESCRIPTION

Figure 1A:
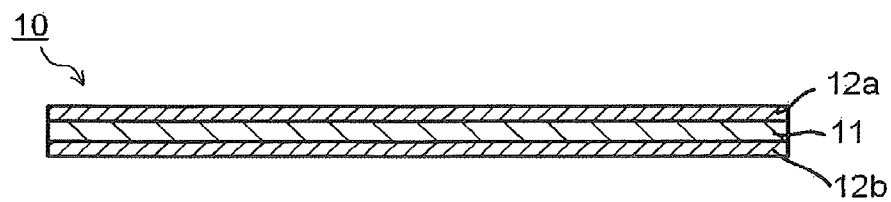
FIG. 1A is a sectional view illustrating one example of an optical filter of the present invention.

An optical filter according to the present invention has an absorption layer and a reflection layer, and first to third embodiments will be described below in detail.

First Embodiment

An optical filter in this embodiment (hereinafter, referred to also as "present filter" in explanation of the first embodiment) has one or more absorption layers. When the present filter has two or more absorption layers, the layers may have either the same configuration or different configurations. For example, one of the absorption layers may be a near-infrared absorption layer composed of a resin containing a later-described near-infrared absorbent (hereinafter, also abbreviated to an "NIR absorbent"), and the other of them may be a near-ultraviolet absorption layer composed of a resin containing a later-described near-ultraviolet absorbent (hereinafter, also abbreviated to a "UV absorbent"). Further, regarding the near-infrared absorbent, a first near-infrared absorbent (DA) and a second near-infrared absorbent (DB) may be contained in the same resin layer or in different resin layers. Besides, the absorption layer itself may be a substrate (resin substrate). Note that, hereinafter, the "first near-infrared absorbent (DA)" is referred to also as an "absorbent DA", the "second near-infrared absorbent (DB)" is referred to also as an "absorbent DB", and a "UV absorbent (DU)" is referred to also as an "absorbent DU".

The reflection layer in this optical filter has one or more dielectric multilayer films. The dielectric multilayer film is not limited to the one entirely composed of dielectric films but may be the one partially containing a material other than a dielectric (for example, metal film). The reflection layer, when having two or more dielectric multilayer films, is generally composed of a plurality of dielectric multilayer films different in reflection band. The average value of optical film thicknesses of films in these dielectric films is different according to the reflection band. A possible example of the configuration is made such that one of the dielectric multilayer films is a near-infrared reflection layer which blocks light on a shorter wavelength side in a near-infrared range (700 to 1150 nm), and the other of them is a near-infrared and near-ultraviolet reflection layer which blocks light in both ranges such as a range on a longer wavelength side of the near-infrared range and a near-ultraviolet range.

The present filter may further include a transparent substrate. In this case, the absorption layer and the reflection layer may be provided on the same principal surface or on different principal surfaces of the transparent substrate. When the absorption layer and the reflection layer are provided on the same principal surface, the order of stacking them is not limited.

The present filter may also include another functional layer such as an anti-reflection layer that suppresses a transmittance loss of visible light. In particular, it is preferable to provide an anti-reflection layer on the absorption layer so as to prevent the absorption layer of the present filter from coming into contact with air. The anti-reflection layer may be configured to cover not only the principal surface of the absorption layer but also the entire side surface thereof. In this case, a damp-proof effect of the absorption layer can be enhanced.

Figure 1B:
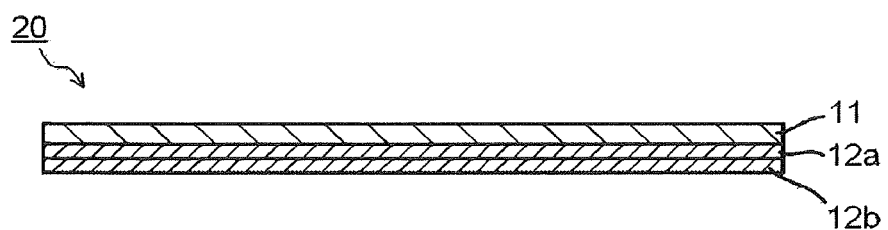
FIG. 1B is a sectional view illustrating another example of the optical filter of the present invention.

Next, configuration examples of the present filter will be described. FIG. 1A illustrates an optical filter 10 including a first reflection layer 12a and a second reflection layer 12b provided on both principal surfaces, respectively, of an absorption layer 11. FIG. 1B illustrates an optical filter 20 including the first reflection layer 12a and the second reflection layer 12b provided in order on one principal surface of the absorption layer 11. Note that "another layer such as the first reflection layer 12a provided on one principal surface of the absorption layer 11" is not limited to the case where another layer is provided in contact with the absorption layer 11, and includes the case where a different functional layer (also including space) is provided between the absorption layer 11 and another layer. The same applies to the following configurations. Here, the absorption layer 11 in the optical filer 10 or 20 may also have a function as a transparent substrate.

Figure 1C:
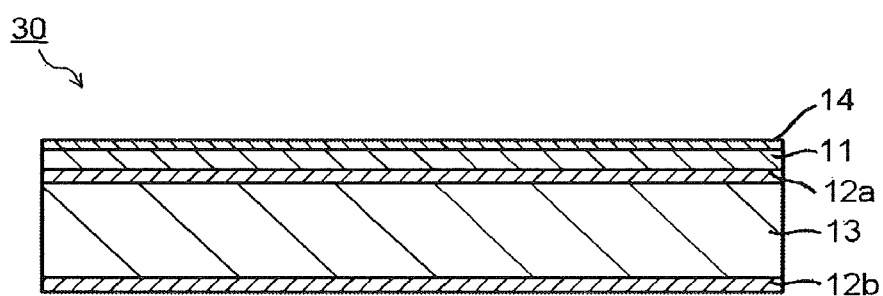
FIG. 1C is a sectional view illustrating another example of the optical filter of the present invention.
Figure 1D:
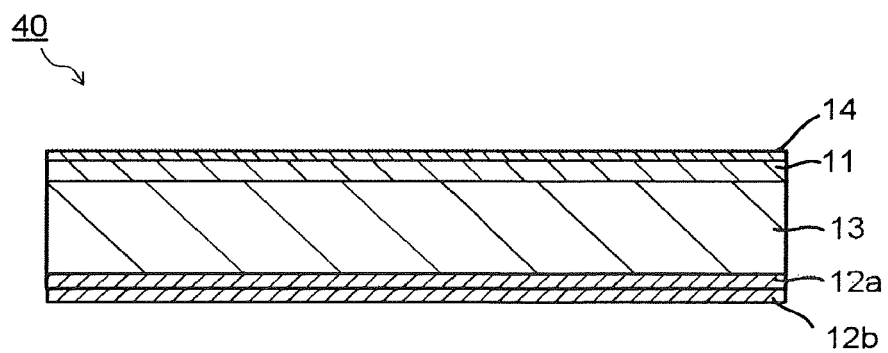
FIG. 1D is a sectional view illustrating another example of the optical filter of the present invention.

FIG. 1C illustrates an optical filter 30 including the first reflection layer 12a and the second reflection layer 12b provided on both principal surfaces of a transparent substrate 13 respectively, and including the absorption layer 11 and an anti-reflection layer 14 provided in order on the first reflection layer 12a. FIG. 1D illustrates an optical filter 40 including the first reflection layer 12a and the second reflection layer 12b provided in order on one principal surface of the transparent substrate 13, and including the absorption layer 11 and the anti-reflection layer 14 provided in order on the other principal surface of the transparent substrate 13. FIG. 1A to FIG. 1D illustrate examples each including two reflection layers with dielectric multilayer films different in configuration. As described above, the first reflection layer 12a may be the near-infrared reflection layer which blocks near-infrared light on the shorter wavelength side, and the second reflection layer 12b may be the near-infrared and near-ultraviolet reflection layer which blocks near-infrared light on the longer wavelength side and the ultraviolet light. Note that the positions of the first reflection layer 12a and the second reflection layer 12b are not limited.

The present filter preferably satisfies the following (1) and (2).

(1) In spectral transmittance curves at incidence angles of 0° to 30°, an average transmittance in wavelengths of 440 to 600 nm is 80% or more.

(2) In the spectral transmittance curves at the incidence angles of 0° to 30°, a transmittance in the entire range of wavelengths of 690 to 720 nm is 5% or less.

The average transmittance of (1) is preferably 85% or more, more preferably 90% or more, and furthermore preferably 95% or more. The transmittance of (2) is more preferably 3% or less and furthermore preferably 2% or less.

Further, in the spectral transmittance curve at an incidence angle of 0°, an average transmittance to light in wavelengths of 350 to 390 nm is desirably 10% or less, preferably 5% or less, and more preferably 1% or less. Next, the configuration of the present filter will be described in detail.

<Absorption Layer>

The absorption layer is a layer containing the absorbent DA, the absorbent DB, and a transparent resin (B) and typically formed by uniformly dissolving or dispersing the absorbents DA and DB at a predetermined mass ratio in the transparent resin (B). Note that the absorption layer may contain an absorbent other than the absorbents DA and DB, such as a UV absorbent DU.

The optical property of the absorption layer containing the NIR absorbent is expressed by a complex refractive index $n-i\kappa$ using a refractive index n and an extinction coefficient $\kappa$, and a spectral transmittance changes accompanying light absorption in accordance with a wavelength ($\lambda$) dependence of the extinction coefficient $\kappa$ peculiar to the absorbent. Where a thickness of the absorption layer in which the absorbent is uniformly dispersed at an absorbent concentration C in a thickness direction in the transparent resin is L, a spectral transmittance $T(\lambda)$ of the absorption layer can be expressed by $T(\lambda)=\exp(-4\pi\kappa L/\lambda)$. Here, $\alpha=4\pi\kappa/\lambda$ is an absorption coefficient, and when expressed by using a common logarithm, it is expressed by $T(\lambda)=10^{-\beta L}$, where an absorption coefficient $\beta$ corresponds to a value obtained by multiplying $\alpha$ by $-\log_{10}(e)=0.434$. At this time, an absorbance A is expressed by $-\log_{10}\{T(\lambda)\}=\beta L$. The absorption coefficients $\alpha$ and $\beta$ change depending on the absorbent concentration C in the absorption layer. Specifically, the spectral transmittance of the absorption layer can be adjusted by the absorbent concentration C in the absorption layer and the thickness L of the absorption layer, and the same applies to the case of including a plurality of NIR absorbents.

However, the NIR absorbent is peculiar in wavelength dependence of the extinction coefficient $\kappa$ and therefore cannot sufficiently block near-infrared light in a wide range by the absorptive action while keeping high transmittance for visible light. Therefore, the present filter uses the absorbent DA having a maximum absorption wavelength $\lambda(DA\_T_{min})$ in wavelengths of 685 to 715 nm to adjust the absorbent concentration C in the absorption layer and the thickness L of the absorption layer. Note that the absorption layer containing only the absorbent DA realizes steep spectral transmittance curves in which the transmittance for light of $\lambda(DA\_T_{min})$ is 6% or less, the transmittance for light of a wavelength of 600 nm is 90% or more, and the transmittance for light of a wavelength of 650 nm is 60% or more.

Figure 2:
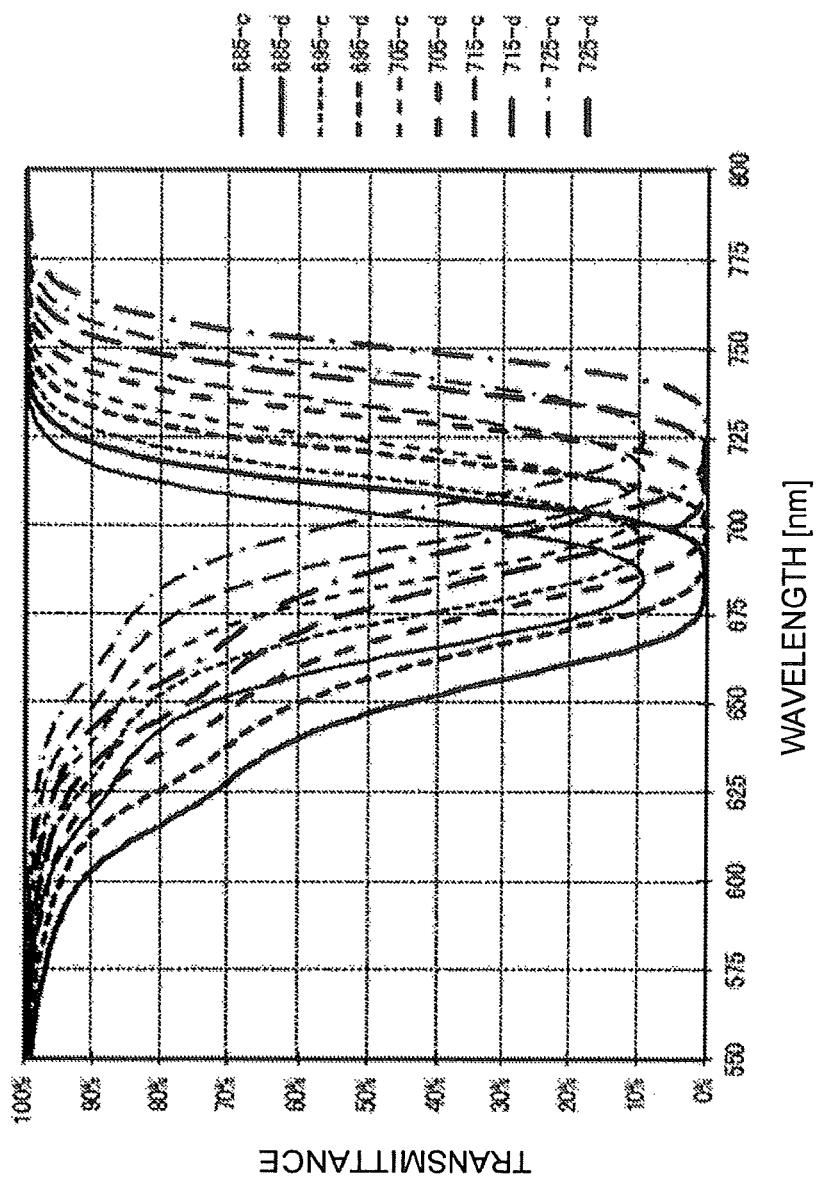
FIG. 2 illustrates spectral transmittance curves of near-infrared absorbents different in maximum absorption wavelength in an optical filter in a first embodiment.

FIG. 2 illustrates calculation results of adjustment to five kinds of NIR absorbents with different maximum absorption wavelengths such as 685 nm, 695 nm, 705 nm, 715 nm and 725 nm on the basis of the spectral transmittance curves of an absorption layer containing a squarylium-based compound as the NIR absorbent. More specifically, FIG. 2 illustrates results of calculating the spectral transmittances at an NIR absorbent concentration where the transmittance at the maximum absorption wavelength becomes 10% (indicated with a "maximum absorption wavelength-c" in FIG. 2) and at a concentration of 2.5 times the above NIR absorbent concentration (indicated with a "maximum absorption wavelength-d" in FIG. 2). Note that a product C×L of the concentration C of the NIR absorbent uniformly dispersed in the transparent resin and the thickness L of the transparent resin layer is an effective thickness of the absorption layer. Here, the effective thickness with which the transmittance for the maximum absorption wavelength becomes 10% is defined as a reference value 1, and examples of the absorption layer hereinafter will be expressed using an effective thickness ratio CL that is the ratio with the reference value. The effective thickness ratio CL corresponds to a relative surface density of the NIR absorbent in the absorption layer. The calculation results indicate that the absorption layer containing the absorbent DA used in the present filter can be obtained by adjusting the concentration C and the thickness L of the absorption layer using the NIR absorbent having the same level of wavelength dependence of the extinction coefficient $\kappa$ as that of the squarylium-based compound having $\lambda(DA\_T_{min})$ in wavelengths of 685 to 715 nm.

Note that use of only a single NIR absorbent is limited to the absorptive action in a narrow near-infrared range and is therefore insufficient in absorption. This causes a transmission band where the transmittance becomes 10% or more with respect to light of wavelengths of 700 to 1150 nm. To improve this problem, the present filter uses the reflection layer together, but the reflection band of the reflection layer shifts depending on the incidence angle of light and incident polarization. The wavelength indicating a transmittance of 50% of the reflection layer shifts to a shorter wavelength side, for example, by about 40 nm at maximum when the incidence angle changes to 0° to 30° in a wavelength range where transition from transmission to reflection occurs. Therefore, when the optical filter has the absorption layer containing only the absorbent DA and the reflection layer, an absorption wavelength band width $\Delta\lambda_{abs}$(T10%) where the transmittance becomes 10% or less near a wavelength of 700 nm is required to be 40 nm or more in order to transmit visible light and obtain spectral transmittance curves with the transmittance for the near-infrared light near a wavelength of 700 nm set to 5% or less and with suppressed incidence angle and incident polarization dependence with respect to light at incidence angles of 0° to 30°. In this specification, the case of referring to "a range near a predetermined wavelength", for example, "a range near a wavelength of 700 nm" refers to a range including 700 nm such as 690 to 710 nm.

However, in the calculation example (an effective thickness ratio CL=2.5) in FIG. 2, the $\Delta\lambda_{abs}$(T10%) is 35 nm at maximum, and therefore to further expand the $\Delta\lambda_{abs}$(T10%), the effective thickness ratio CL of the absorbent DA in the absorption layer needs to be increased. Besides, to suppress a decrease in transmittance for light on a side of a wavelength shorter than $\lambda(DA\_T_{min})$, it is preferable to use the absorbent DA having $\lambda(DA\_T_{min})$ on the longer wavelength side. However, there is an upper limit in the concentration of the absorbent which can be uniformly dispersed in the transparent resin, and if an NIR absorbent exhibiting only slight absorption with respect to visible light is used, the transmittance for visible light decreases.

To achieve the expansion of Δλ$_{abs}$(T10%) and the suppression of decrease in visible light transmittance, the absorption layer of the present filter also contains the absorbent DB having a maximum absorption wavelength λ(DB_T$_{min}$) on a side of a wavelength longer than λ(DA_T$_{min}$) of the absorbent DA, more specifically, in wavelengths of 705 to 725 nm. This configuration allows the present filter to keep a high transmittance for visible light and ensure 40 nm or more of Δλ$_{abs}$(T10%). Here, the absorbent DB has λ(DB_T$_{min}$) in wavelengths of 705 to 725 nm, and is preferably adjusted in effective thickness ratio CL so that transmittances when assuming an absorption layer containing only the absorbent DB become 6% or less for light of λ(DB_T$_{min}$), 90% or more for light of a wavelength of 600 nm, and 65% or more for light of a wavelength of 650 nm. Then, by adjusting the concentration using the NIR absorbent with the spectral transmittance curves at the same level as those of the squarylium-based compound having λ(DB_T$_{min}$) in wavelengths of 705 to 725 nm based on the calculation results in FIG. 2, the absorption layer used in the present filter is obtained.

Figure 3:
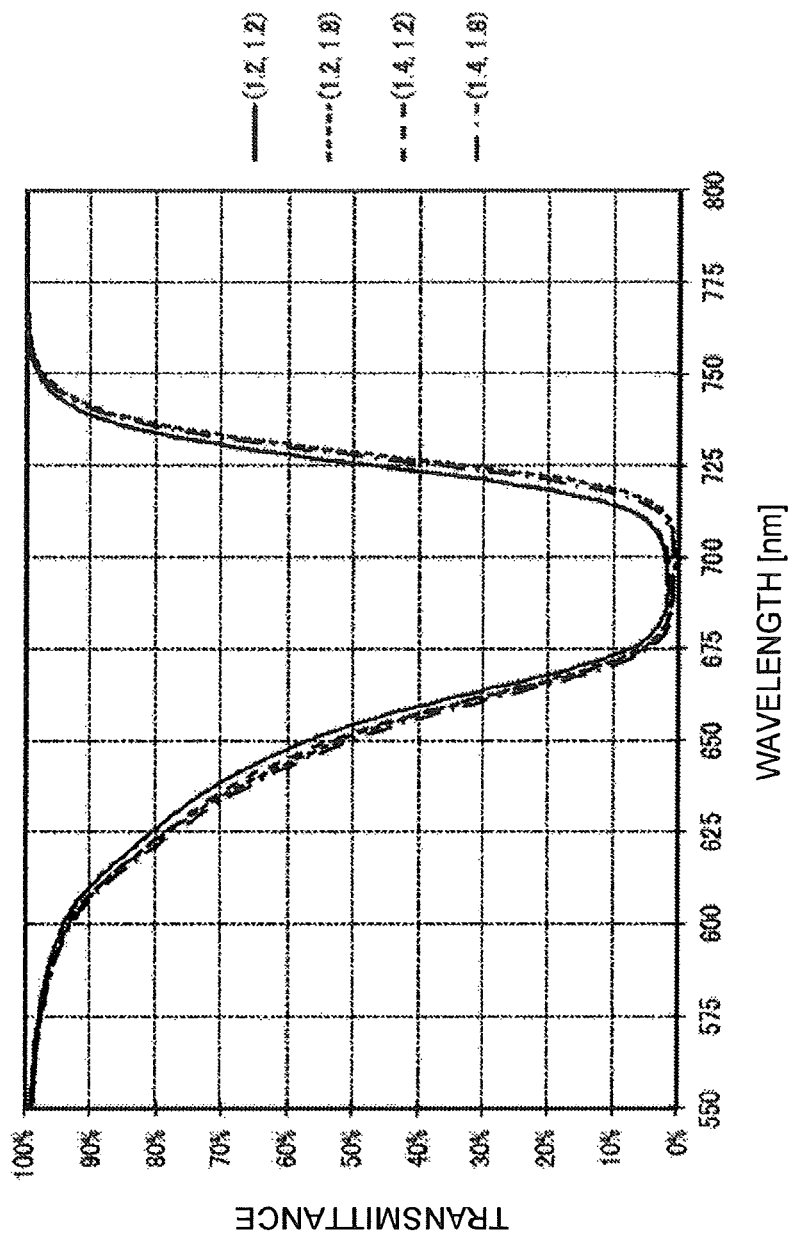
FIG. 3 is a graph illustrating calculation results (1) of spectral transmittances of absorption layers in the optical filter in the first embodiment.

Next, as example, absorption layers are obtained by a transparent resin containing the absorbent DA having λ(DA_T$_{min}$)=685 nm and the absorbent DB having λ(DB_T$_{min}$)=705 nm so that their respective effective thickness ratios (CL(A), CL(B)) are (1.2, 1.2), (1.2, 1.8), (1.4, 1.2) and (1.4, 1.8). FIG. 3 illustrates calculation results of spectral transmittances of the absorption layers with respect to light of wavelengths of 550 to 800 nm. Any of the results shows that the transmittance for light of a wavelength of 600 nm is 90% or more, the transmittance for light of a wavelength of 650 nm is 45% or more, the transmittance for light of wavelengths of 685 to 700 nm is 2% or less, and the transmittance for light of wavelengths of 672 to 714 nm is 10% or less. In short, the absorption layers exhibit steep transmittance changes with respect to light of wavelengths of 600 to 690 nm and can realize Δλ$_{abs}$(T10%)≥40 nm.

It is also found from the results in FIG. 3 that when the wavelengths for which the transmittances in wavelengths of 580 nm to λ(DA_T$_{min}$) become 90%, 50% and 5% are λSh(DAB_T90%), λSh(DAB_T50%), and λSh(DAB_T5%) respectively, {λSh(DAB_T50%)−λSh(DAB_T90%)}≥{λSh(DAB_T5%)−λSh(DAB_T50%)} in any case.

The effective thickness ratios CL(A) and CL(B) capable of realizing the above-described spectral transmittance curves are not limited to the above setting, and the same characteristics can be obtained, for example, when CL(B)=1.2 to 1.8 at CL(A)=1.2 to 1.4. Further, the predetermined spectral transmittance described in the above, Δλ$_{abs}$(T10%)≥40 nm, can be obtained even in the absorption layer (DAB) adjusted to abs other effective thickness ratios.

Figure 4:
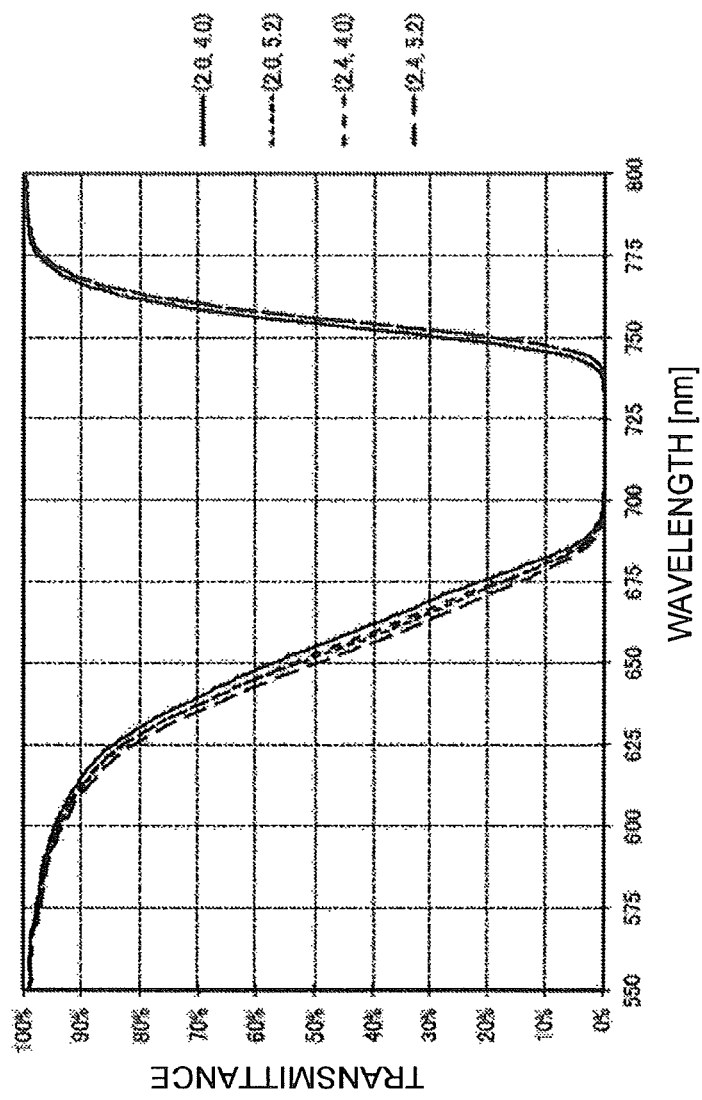
FIG. 4 is a graph illustrating calculation results (2) of spectral transmittances of absorption layers in the optical filter in the first embodiment.

As other examples, absorption layers (DAB) are obtained by a transparent resin containing the absorbent DA having λ(DA_T$_{min}$)=705 nm and the absorbent DB having λ(DB_T$_{min}$)=725 nm so that their respective effective thickness ratios (CL(A), CL(B)) are (2.0, 4.0), (2.0, 5.2), (2.4, 4.0) and (2.4, 5.2). FIG. 4 illustrates calculation results of spectral transmittances of the absorption layers with respect to light of wavelengths of 550 to 800 nm. Any of the results shows that the transmittance for light of a wavelength of 600 nm is 90% or more, the transmittance for light of a wavelength of 650 nm is 50 to 60%, the transmittance for light of wavelengths of 691 to 741 nm is 2% or less, and the transmittance for light of wavelengths of 682 to 745 nm is 10% or less. In short, the absorption layers exhibit steep transmittance changes with respect to light of wavelengths of 600 to 690 nm and can realize Δλ$_{abs}$(T10%)≥60 nm.

It is also found from the results in FIG. 4 that the relation among λSh(DAB_T90%), λSh(DAB_T50%), and λSh(DAB_T5%) similar to the above is {λSh(DAB_T50%)−λSh(DAB_T90%)}≥{λSh(DAB_T5%)−λSh(DAB_T50%)} in any case.

The effective thickness ratios CL(A) and CL(B) capable of realizing the above-described spectral transmittance curves are not limited to the above setting, and the same characteristics can be obtained, for example, when CL(B)=4.0 to 5.2 at CL(A)=2.0 to 2.4. Further, the predetermined spectral transmittance described in the above, Δλ$_{abs}$(T10%)≥60 nm, can be obtained even in the absorption layer adjusted to other effective thickness ratios.

The present filter including the absorption layer containing the absorbents DA and DB at predetermined effective thickness ratios (CL(A), CL(B)) can approximate spectral transmittance curves of wavelengths of 600 to 690 nm to the visibility and can realize Δλ$_{abs}$(T10%) 40 nm.

The spectral transmittance curves of the squarylium-based compound are referred to for the absorbent DA and the absorbent DB, but for the absorbent DA, an NIR absorbent composed of another compound such as a cyanine-based compound, a phthalocyanine-based compound, a naphthalocyanine-based compound, a dithiol metal complex-based compound, a diimonium-based compound or the like may be referred to. For the absorbent DB, a squarylium-based compound or a cyanine-based compound with light absorption characteristics imparted thereto by adjusting the chemical structure of the compound so as to secure wide range of light absorption on the longer wavelength side in the near-infrared range is preferably usable.

A concrete example of the NIR absorbent preferable for the present filter is a squarylium-based compound represented by the following general formula (A1).

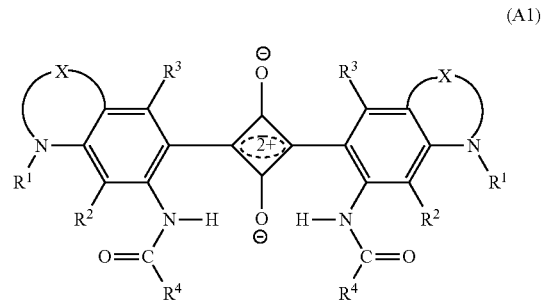

(A1)

Symbols in the formula (A1) are as follows.

X is independently a bivalent organic group represented by the following formula (1) or formula (2), in which one or more hydrogen atoms may be substituted with an alkyl group or alkoxy group having 1 to 12 carbon atoms.

—(CH$_2$)$_{n1}$—   (1)

In the formula (1), n1 is 2 or 3.

—(CH$_2$)$_{n2}$—O—(CH$_2$)$_{n3}$—   (2)

In the formula (2), each of n2 and n3 is independently an integer of 0 to 2, and n2+n3 is 1 or 2.

R$^1$ independently represents a saturated or unsaturated hydrocarbon group having 1 to 12 carbon atoms that may contain a saturated ring structure and may have a branch, a saturated cyclic hydrocarbon group having 3 to 12 carbon atoms, an aryl group having 6 to 12 carbon atoms, or an alaryl group having 7 to 13 carbon atoms.

$R^2$ and $R^3$ independently represent a hydrogen atom, a halogen atom, or an alkyl group or alkoxy group having 1 to 10 carbon atoms.

$R^4$ is independently a hydrocarbon group having 5 to 25 carbon atoms with at least one or more branches, in which one or more hydrogen atoms may be substituted with a halogen atom, a hydroxyl group, a carboxy group, a sulfo group, or a cyano group and in which the hydrocarbon group may contain an unsaturated bond, an oxygen atom, or a saturated or unsaturated ring structure between carbon atoms.

The compound represented by the above-described general formula (A1) exhibits a steep inclination in the absorption spectrum in the vicinity of a boundary between the visible range and the near-infrared range, and exhibits high blocking performance with respect to near-infrared light. For this reason, the absorption layer has excellent absorption characteristic even if a small amount of the compound is added thereto, enabling realization of the reduction in thickness and size of the optical filter. Besides, the compound represented by the above-described general formula (A1) is excellent in heat resistance, thus suppressing also a change in spectral transmittance in a thermal process.

For the squarylium-based compound, for example, WO 2012/169447 can be referred to, and the document illustrates a compound exhibiting a maximum absorption wavelength of 695 to 747 nm. Besides, as the absorption layers containing a squarylium-based compound in various transparent resins, for example, WO 2014/088063 can be referred to, and the document illustrates an example having a maximum absorption wavelength of 691 to 722 nm. Further, WO 2014/030628 can also be referred to, and the document illustrates concrete examples of an absorption layers containing a cyanine-based compound exhibiting maximum absorption wavelengths of 694 nm, 740 nm, 747 nm and a phthalocyanine-based compound exhibiting a maximum absorption wavelength of 681 nm in a transparent resin.

Conditions of Absorption Layer (First Embodiment)

The absorption layer contains the absorbent DA and the absorbent DB in the relation of the following (i-1) and satisfies the following conditions (i-2) and (i-3). The absorption layer is obtained by adjusting the concentration C and the thickness L of each of the absorbents so as to satisfy the following conditions (i-2) and (i-3).

(i-1) $10\ \mathrm{nm} \le \lambda(\mathrm{DB\_T}_{min}) - \lambda(\mathrm{DA\_T}_{min}) < 40\ \mathrm{nm}$,
(i-2) The transmittance for light of a wavelength of 600 nm is 80% or more, a transmittance for light of a wavelength of 650 nm is 40% or more, a transmittance for light of a wavelength of 700 nm is 3% or less, and a transmittance for light of a wavelength of 714 nm is 10% or less,
(i-3) $\{\lambda\mathrm{Sh}(\mathrm{DAB\_T50\%}) - \lambda\mathrm{Sh}(\mathrm{DAB\_T90\%})\} \ge \{\lambda\mathrm{Sh}(\mathrm{DAB\_T5\%}) - \lambda\mathrm{Sh}(\mathrm{DAB\_T50\%})\}$ In the above, $\lambda\mathrm{Sh}(\mathrm{DAB\_T90\%})$, $\lambda\mathrm{Sh}(\mathrm{DAB\_T50\%})$ and $\lambda\mathrm{Sh}(\mathrm{DAB\_T5\%})$ indicate wavelengths at which transmittances in wavelengths of 580 nm to $\lambda(\mathrm{DA\_T}_{min})$ become 90%, 50% and 5% respectively.

In (i-2), the transmittance for light of a wavelength of 600 nm is preferably 90% or more, the transmittance for light of a wavelength of 650 nm is preferably 45% or more, the transmittance for light of a wavelength of 700 nm is preferably 2% or less, and the transmittance for light of a wavelength of 714 nm is preferably 5% or less. The transmittance for light of a wavelength of 650 nm is more preferably 50% or more. The (i-3) is regulation of inclination of the spectral transmittance curve in the visible range where the transmittance decreases from 90% to 5% due to absorption of light by the absorption layer, and the wavelength width $\{\lambda\mathrm{Sh}(\mathrm{DAB\_T5\%}) - \lambda\mathrm{Sh}(\mathrm{DAB\_T50\%})\}$ narrower than the wavelength width $\{\lambda\mathrm{Sh}(\mathrm{DAB\_T50\%}) - \lambda\mathrm{Sh}(\mathrm{DAB\_T90\%})\}$ is more preferable because steep light blocking property is obtained on the longer wavelength side in the transmittance transition range. Besides, the above regulation only needs to adjust CL using the absorbents DA and DB, and satisfaction of the above regulation efficiently enables realization of high light blocking property against light of wavelengths of 690 to 720 nm and spectral sensitivity correction with respect to light of wavelengths of 600 to 690 nm.

<Reflection Layer>

The absorption layer containing the absorbents DA and DB is insufficient by itself to block the near-ultraviolet light of wavelengths of 350 to 390 nm and the near-infrared light on a side of a wavelength longer than $\lambda(\mathrm{DB\_T}_{min})$ of light of wavelengths of 350 to 1150 nm for which a solid-state image sensing device has sensitivity. The reflection layer has a function of transmitting visible light and improving the light blocking property against the near-ultraviolet light and the near-infrared light, so that the solid-state image sensing device in the imaging device including the present filter can effectively detect only visible light.

The reflection band of the spectral transmittance curve of the reflection layer shifts to the shorter wavelength side with an increase in incidence angle as described above. More specifically, in terms of the wavelength indicating a predetermined transmittance (for example, 50%), the reflection layer changes in the wavelength depending on the incidence angle of light, and changes also in shift amount (unit [nm]) corresponding to the difference amount in the wavelength due to the change in incidence angle. Further, the reflection layer differs in shift amount depending on the polarization component even for light at the same incidence angle. Therefore, the present filter is obtained based on the design keeping the spectral transmittance curves of visible light and exhibiting high light blocking property to the unnecessary near-ultraviolet light and near-infrared light in consideration of the incidence angle dependence and the polarization dependence of the reflection layer.

When the reflection layer is configured as a dielectric multilayer film having an optical film thickness of $\lambda_0/4$ with respect to a specific wavelength $\lambda_0$ in the near-infrared range, a reflection band is generated not only near $\lambda_0$ but also near $\lambda_0/3$. Owing to the characteristics of the reflection layer, a group of dielectric multilayer films enables blocking of the near-ultraviolet light of a wavelength of 400 nm or less and the near-infrared light of wavelengths of 725 to 1150 nm.

The material of the dielectric multilayer film, which has high visible light transmittance and has a large $(n_H - n_L)/(n_H + n_L)$ where the refractive index of the dielectric film having high refractive index and the refractive index of the dielectric film having low refractive index are $n_H$ and $n_L$ respectively, is more likely to ensure a later-described predetermined near-infrared reflection band width $\Delta\lambda_{NIR}$ and high reflectance. Hereinafter, the dielectric film having high refractive index is referred to also as a "high-refractive index film", and the dielectric film having low refractive index is referred to also as a "low-refractive index film". Examples of the high-refractive index film having $n_H \ge 2.15$ at a visible wavelength of 588 nm include $TiO_2$, $Ta_2O_5$, $Nb_2O_5$, ZnS, ZnSe and the like, and examples of the low-refractive index film include $Na_5Al_3F_{14}$, $Na_3AlF_6$, $MgF_2$ and the like having $n_L \leq 1.38$ in addition to $SiO_2$ having $n_L=1.46$. Further, the dielectric multilayer film may include a dielectric film exhibiting an intermediate refractive index in addition to the high-refractive index film and the low-refractive index film, for the purpose of adjusting the spectral transmittance curves, decreasing the film stress, improving the adhesiveness and so on.

Further, the reflection layer may be configured to include two types of dielectric multilayer films different in maximum reflection wavelength $\lambda_0$ in order to ensure a reflection band width $\Delta\lambda_{NIR}$ of about 450 nm exhibiting high reflectivity in wavelengths of 700 to 1150 nm. More specifically, the reflection layer of this configuration includes two types (groups) of dielectric multilayer films such as a first reflection layer for reflection band on the shorter wavelength side and a second reflection layer for reflection band on the longer wavelength side in the near-infrared range, and the following description will be made assuming that two types of dielectric multilayer films are included.

Here, the reflection layer preferably includes wavelengths of $\lambda_R(0°\_T50\%)$ to $\lambda_R(30°\_Ts50\%)$ in a band exhibiting the above-described $\Delta\lambda_{abs}(T10\%)$ in the absorption layer. Note that both of $\lambda_R(0°\_T50\%)$ and $\lambda_R(30°\_Ts50\%)$ represent reflection characteristic indexes on the shorter wavelength side in the near-infrared range in the reflection layer, and the former represents the wavelength at which the transmittance with respect to light at an incidence angle of 0° in wavelengths of 680 to 750 nm becomes 50%, and the latter represents the wavelength at which the transmittance with respect to light of s-polarized light at an incidence angle of 30° in wavelengths of 640 to 750 nm becomes 50%. Note that the latter is more preferably included in a wavelength range of 680 to 750 nm. It is preferable for the present filter because the incidence angle dependence of the transmittances with respect to light at incidence angles of 0° to 30° is decreased by satisfying the above relation.

Besides, the reflection layer is preferably designed in consideration also of the polarization dependence as described above. Specifically, considering the changes in interference light path length difference between the dielectric films and in effective refractive index with an increase in incidence angle on the basis of the incidence angle of 0°, the center wavelength of the reflection band shifts to the shorter wavelength side, the reflection band width decreases with respect to p-polarized light, and the reflection band width increases with respect to s-polarized light. As a result, when the incidence angle changes in 0° to 30°, the shortest wavelength at which the transmittance becomes 50% on the shorter wavelength side of the near-infrared reflection band width $\Delta\lambda_{NIR}$ corresponds to the wavelength $\lambda_R$Sh(30°_Ts50%) of the s-polarized light at an incidence angle of 30°, whereas the shortest wavelength at which the transmittance becomes 50% on the longer wavelength side of the $\Delta\lambda_{NIR}$ corresponds to the wavelength $\lambda_R$Lo(30° Tp50%) of the p-polarized light at the incidence angle of 30°.

As described above, considering the incidence angle dependence and the polarization dependence (hereinafter, referred also to as "incidence angle/polarization dependence"), a maximum wavelength shift amount $\delta\lambda_R$Sh (T50%) [nm] where the transmittance becomes 50% with respect to the light at the incidence angles of 0° to 30° near a wavelength of 700 nm of the reflection layer is expressed by the following relation and takes, for example, a value of about 40 nm. Further, $\delta\lambda_R$Sh(T50%) increases with the incidence angle.

$$\delta\lambda_R Sh(T50\%) = \lambda_R(0°\_T50\%) - \lambda_R(30°\_Ts50\%)$$

On the other hand, the absorption layer has little or no change in spectral transmittance curve due to the incidence angle and polarization of incident light.

Therefore, even if a shift occurs in the present filter in a range of $\lambda_R(0°\_T50\%)$ to $\lambda_R(30°\_Ts50\%)$ due to the incidence angle/polarization dependence of the transmittance caused from the reflection layer, the range only needs to fall within the absorption wavelength band where the absorption layer exhibits a predetermined transmittance or less. For example, as for the absorption layer, when the wavelength on the longer wavelength side of the wavelength at which the transmittance becomes 50% near the wavelength of 700 nm is $\lambda$Lo(DAB_T50%), the present filter only needs to satisfy the relation of "$\lambda$Sh(DAB_T50%)$\leq\lambda_R$(30°_Ts50%) $<\lambda_R(0°\_T50\%)\leq\lambda$Lo(DAB_T50%)" the incidence angle/polarization dependence of the spectral transmittances in wavelengths of 600 to 750 nm can be suppressed. More specifically, the present filter satisfying the above condition is preferable because the incidence angle/polarization dependence of the spectral transmittances in wavelengths of 600 to 750 nm appears only in a limited wavelength range where the transmittance becomes 25% (=50%×50%) or less. For example, when the maximum wavelength shift amount $\delta\lambda_R$Sh(T50%) of the reflection layer is 40 nm, the near-infrared absorption wavelength band width $\Delta\lambda_{abs}(T50\%)$ of the absorption layer is preferably 40 nm or more.

To further decrease the incidence angle/polarization dependence of the transmittance caused from the reflection layer, the present filter more preferably satisfies, regarding the absorption layer, the relation of "$\lambda$Sh(DAB_T10%)$\leq\lambda_R$ (30°_Ts50%)$<\lambda_R(0°\_T50\%)\leq\lambda$Lo(DAB_T10%)" where the wavelength on the shorter wavelength side is $\lambda$Sh (DAB_T10%) and the wavelength on the longer wavelength side is $\lambda$Lo(DAB_T10%), among the wavelength at which the transmittance becomes 10% near a wavelength of 700 nm. Specifically, the incidence angle/polarization dependence of the spectral transmittances in wavelengths of 600 to 750 nm of the present filter satisfying the above condition is limited only to a wavelength range where the transmittance becomes 5% (=10%×50%) or less.

To further decrease the incidence angle/polarization dependence of the transmittance caused from the reflection layer, the present filter more preferably satisfies the relation of "$\lambda$Sh(DAB_T10%)$\leq\lambda_R$(30°_Ts10%)$<\lambda_R(0°\_T10\%)$ $\leq\lambda$Lo(DAB_T10%)" where the wavelength of the s-polarized light at an incidence angle of 30° is $\lambda_R$Sh(30°_Ts10%) and the wavelength at an incidence angle of 0° is $\lambda_R(0°\_T10\%)$, among the wavelength at which the transmittance becomes 10% near a wavelength of 700 nm. Note that $\lambda_R$Sh(30°_Ts10%) corresponds to the shortest wavelength at which the transmittance becomes 10% on the shorter wavelength side of the near-infrared reflection band width $\Delta\lambda_{NIR}$, and $\lambda_R(0°\_T10\%)$ corresponds to the longest wavelength at which the transmittance becomes 10% on the shorter wavelength side of $\Delta\lambda_{NIR}$. The incidence angle/polarization dependence of the spectral transmittances in wavelengths of 600 to 750 nm of the present filter satisfying the above condition is limited only in a wavelength range where the transmittance becomes 1% (=10%×10%) or less.

Further, to set the transmittances for wavelengths $\lambda(DB\_T_{min})$ to $\lambda$Lo(DAB_T50%) to 3% or less in the present filter, the reflection layer is preferably designed so that the wavelength $\lambda_R$Sh(0°_T5%) where the transmittance at an incidence angle of 0° becomes 5% on the shorter wavelength side of the near-infrared band is located on a side of a wavelength shorter than the wavelength $\lambda$Lo (DAB_T50%). Further, to set the transmittances for wavelengths λ(DB_T$_{min}$) to λLo(DAB_T50%) to 0.5% or less in the present filter, the reflection layer is preferably designed so that the wavelength λ$_R$Sh(0°_T1%) where the transmittance at an incidence angle of 0° becomes 1% on the shorter wavelength side of the near-infrared band is located on a side of a wavelength shorter than the wavelength λLo (DAB_T50%).

Further, the reflection layer of the present filter is preferably configured to be able to decrease the incidence angle/polarization dependence also on the longer wavelength side of the near-infrared reflection band. For example, the reflection layer is preferably designed so that a wavelength λLo(30°_Tp15%)>1150 nm, where λLo(30°_Tp15%) is the wavelength at which the transmittance for the p-polarized light at an incidence angle of 30° becomes 15%. Further, the reflection layer is preferably designed so that a wavelength λLo(30°_Tp5%)>1150 nm, where λLo(30°_Tp5%) is the wavelength at which the transmittance for the p-polarized light incident at an incidence angle of 30° becomes 5%.

As described above, in the reflection layer, the shortest wavelengths at which the transmittances become 15% and 5% on the longer wavelength side of the near-infrared reflection band with respect to light at incidence angles of 0° to 30° are the p-polarized light at an incidence angle of 30°, and correspond to the above λLo(30°_Tp15%) and the above λLo(30°_Tp5%), respectively. The reflection layer has specifications that these wavelengths are located on a side of a wavelength longer than 1150 nm where the solid-state image sensing device has sensitivity, enabling the present filter to suppress the incidence angle/polarization dependence of the spectral transmittance curves of wavelengths of 550 to 1150 nm and improve the color reproducibility of the imaging device. Next, the conditions of the reflection layer in the present filter will be described.

Conditions of Reflection Layer (First Embodiment)

(ii-1) The reflection layer has a reflection band where a transmittance with respect to light at an incidence angle of 0° in wavelengths of 700 to 1150 nm becomes 5% or less.
(ii-2) The reflection layer satisfies the following relation.

$$\lambda Sh(DAB\_T10\%) + 30 \text{ nm} < \lambda_R(0°\_T50\%) < \lambda Lo(DAB\_T5\%)$$

Where the wavelength at which a transmittance with respect to light at the incidence angle of 0° in wavelengths of 680 to 750 nm becomes 50% is λ$_R$(0°_T50%). In the above, λSh(DAB_T10%) and λLo(DAB_T5%) represent the wavelength at which a transmittance of the absorption layer with respect to light of wavelengths of 580 nm to λ(DA_T$_{min}$) becomes 10% and the wavelength of the absorption layer at which a transmittance with respect to light of wavelengths λ(DB_T$_{min}$) to 800 nm becomes 5%, respectively. Note that the transmittance in (ii-1) is preferably 3% or less. Further, the average transmittance of the reflection layer with respect to light at incidence angles of 0° to 30° in wavelengths of 700 to 1150 nm is preferably 1% or less and more preferably 0.5% or less for suppression of stray light.

Next, a concrete design example of the reflection layer will be described based on the optical filter 30 in FIG. 1C. The optical filter 30 in FIG. 1C has the first reflection layer 12a, the absorption layer 11, and the second reflection layer 12b. For the reflection layers (the first reflection layer 12a and the second reflection layer 12b), the dielectric multilayer films are designed to reflect the near-infrared light of wavelengths of 725 to 1150 nm at which the absorptivity of the absorption layer 11 is low.

The specifications of the first reflection layer 12a in this example are decided in the order of (Design 1) to (Design 3). The first reflection layer 12a is configured to have 27 layers made by alternately stacking TiO$_2$ with n$_H$=2.37 and SiO$_2$ with n$_L$=1.45 with respect to a design wavelength λ$_0$=880 nm to generate a reflection band in wavelengths of 720 to 950 nm so that the optical film thicknesses n$_H$d$_H$ and n$_L$d$_L$ are about λ$_0$/4 (Design 1). Note that since the refractive indexes n$_H$ and n$_L$ of the dielectric multilayer film changes depending on the wavelength, the refractive index values at the design wavelength λ$_0$ are exemplified.

Next, to reduce ripples in the visible range, the first reflection layer 12a is configured such that the optical film thickness of each of the 27 layers of TiO$_2$ and SiO$_2$ is shifted by about ±15% from λ$_0$/4 (Design 2). Further, to obtain the effect of reducing ripples in the visible range and the antireflection effect, the first reflection layer 12a is configured to have 33 layers in total by adding three layers of SiO$_2$/TiO$_2$/SiO$_2$ each having an optical film thickness smaller than λ$_0$/4 to the interface between the transparent substrate and the 27 layers and the interface between the absorption layer and the 27 layers (Design 3). Table 1 is the concrete configuration of (Design 3). Note that for spectral transmittance evaluation of the reflection layer, the refractive indexes of the transparent substrate and the absorption layer (transparent resin) provided before and after the reflection layer with respect to light of a wavelength of 880 nm are set to 1.51. The same applies to refractive indexes of transparent substrates or transparent substrates and transparent resins in subsequent Tables 2 to 4.

TABLE 1

| Layer structure | Medium | Optical film thickness (λ$_0$) |
|---|---|---|
| Upper surface | Transparent resin | |
| 1 | SiO$_2$ | 0.180 |
| 2 | TiO$_2$ | 0.018 |
| 3 | SiO$_2$ | 0.066 |
| 4 | TiO$_2$ | 0.260 |
| 5 | SiO$_2$ | 0.260 |
| 6 | TiO$_2$ | 0.240 |
| 7 | SiO$_2$ | 0.245 |
| 8 | TiO$_2$ | 0.233 |
| 9 | SiO$_2$ | 0.242 |
| 10 | TiO$_2$ | 0.229 |
| 11 | SiO$_2$ | 0.241 |
| 12 | TiO$_2$ | 0.231 |
| 13 | SiO$_2$ | 0.241 |
| 14 | TiO$_2$ | 0.230 |
| 15 | SiO$_2$ | 0.239 |
| 16 | TiO$_2$ | 0.231 |
| 17 | SiO$_2$ | 0.240 |
| 18 | TiO$_2$ | 0.233 |
| 19 | SiO$_2$ | 0.243 |
| 20 | TiO$_2$ | 0.238 |
| 21 | SiO$_2$ | 0.249 |
| 22 | TiO$_2$ | 0.255 |
| 23 | SiO$_2$ | 0.293 |
| 24 | TiO$_2$ | 0.293 |
| 25 | SiO$_2$ | 0.292 |
| 26 | TiO$_2$ | 0.262 |
| 27 | SiO$_2$ | 0.253 |
| 28 | TiO$_2$ | 0.248 |
| 29 | SiO$_2$ | 0.265 |
| 30 | TiO$_2$ | 0.263 |
| 31 | SiO$_2$ | 0.066 |
| 32 | TiO$_2$ | 0.018 |
| 33 | SiO$_2$ | 0.180 |
| Lower surface | Transparent substrate | |

Figure 5:
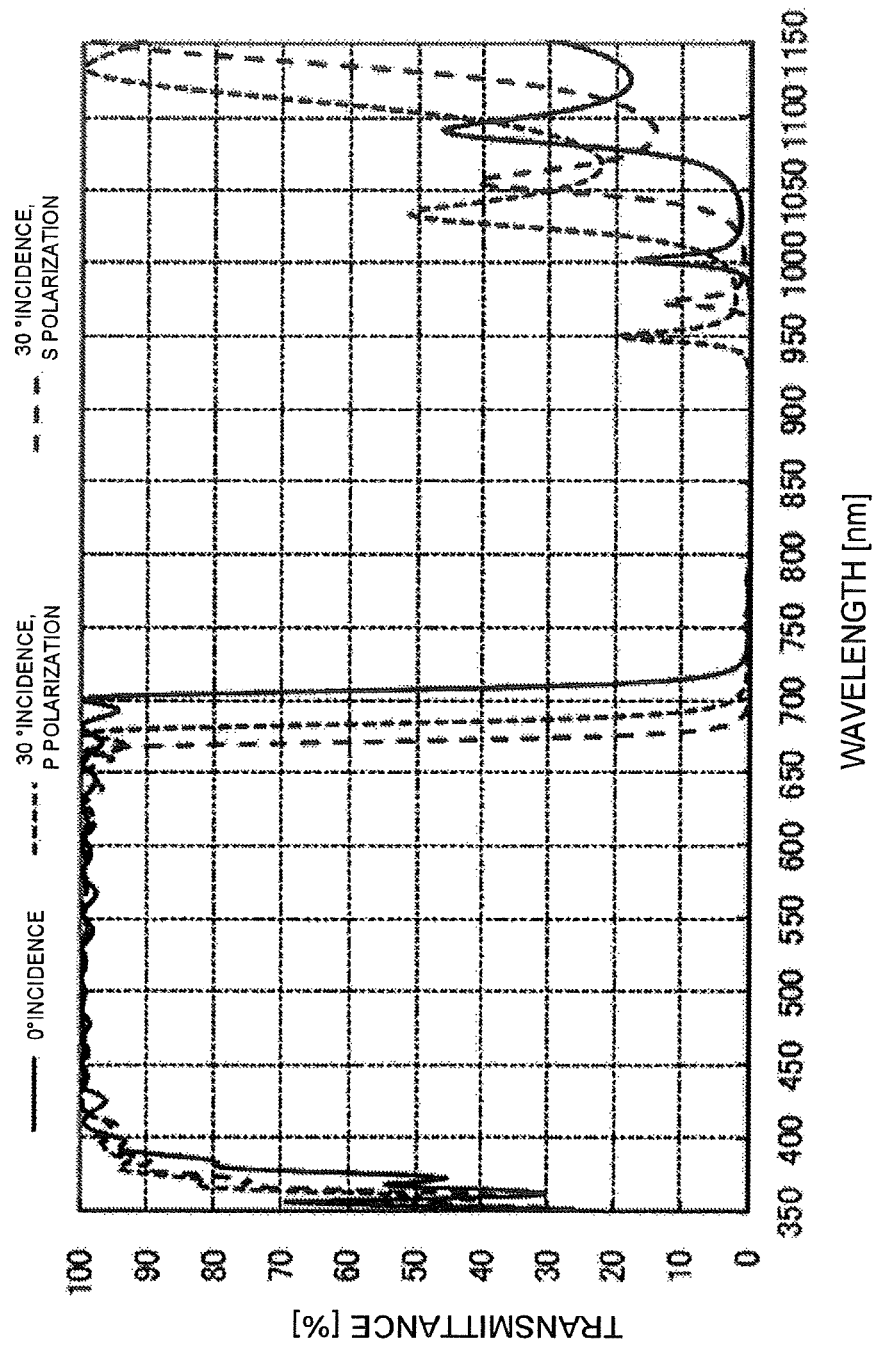
FIG. 5 is a graph illustrating calculation results of spectral transmittances of a first reflection layer of the optical filter in the first embodiment.
Figure 6:
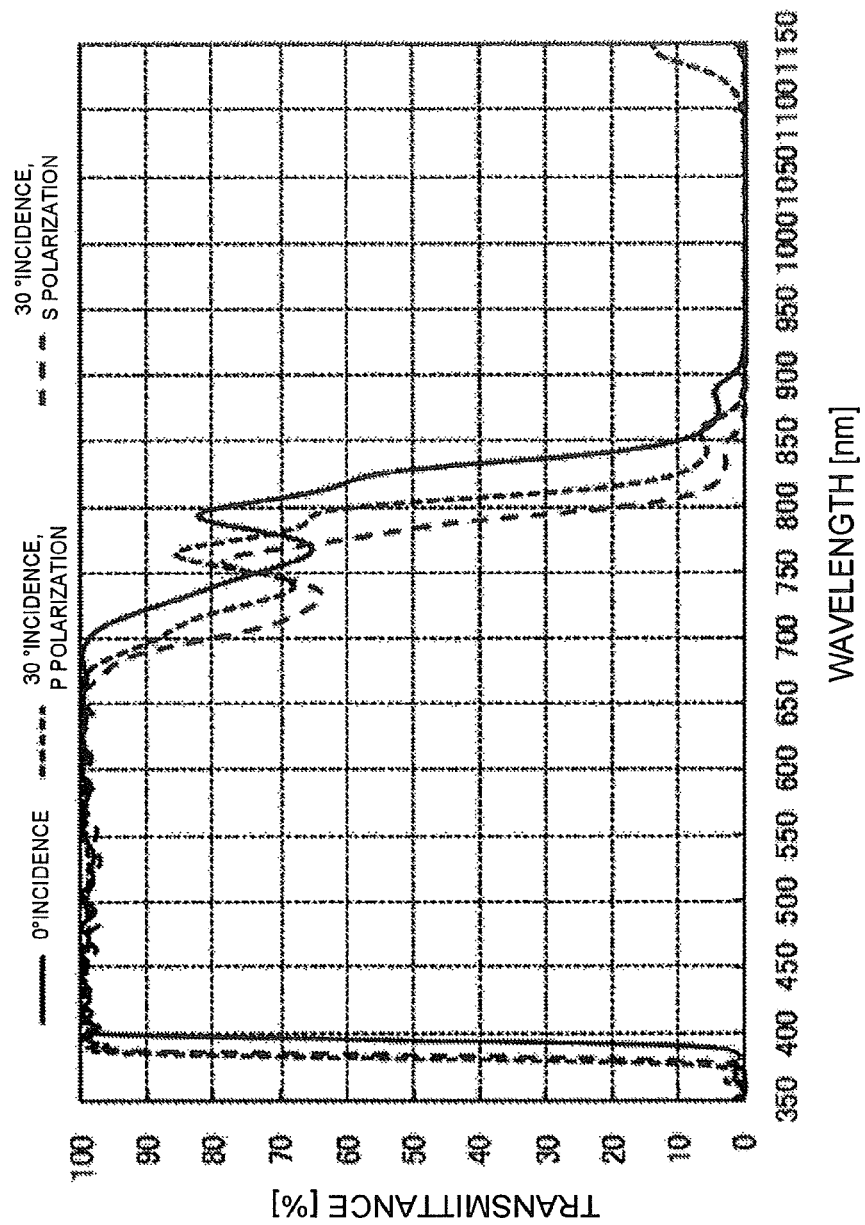
FIG. 6 is a graph illustrating calculation results of spectral transmittances of a second reflection layer of the optical filter in the first embodiment.
Figure 7:
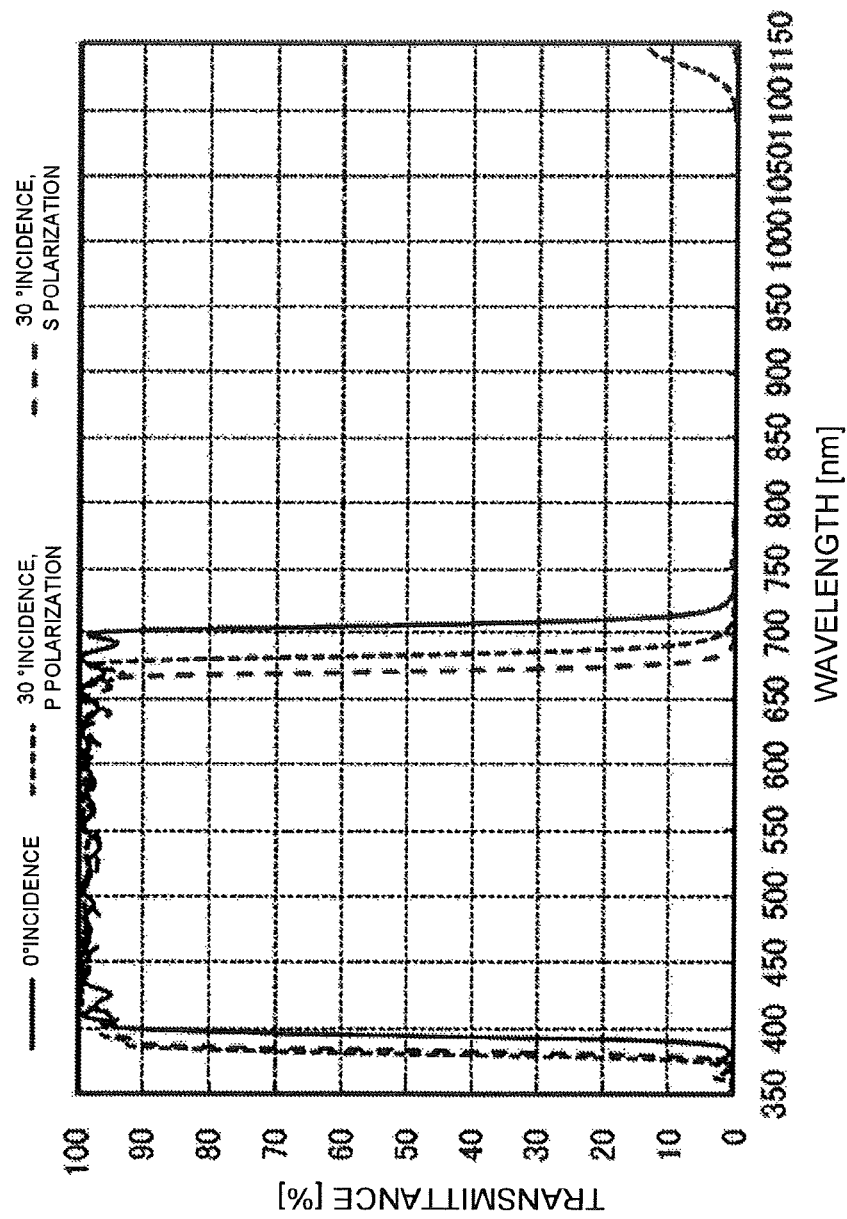
FIG. 7 is a graph (1) illustrating calculation results of spectral transmittances of a reflection layer of the optical filter in the first embodiment.
Figure 8:
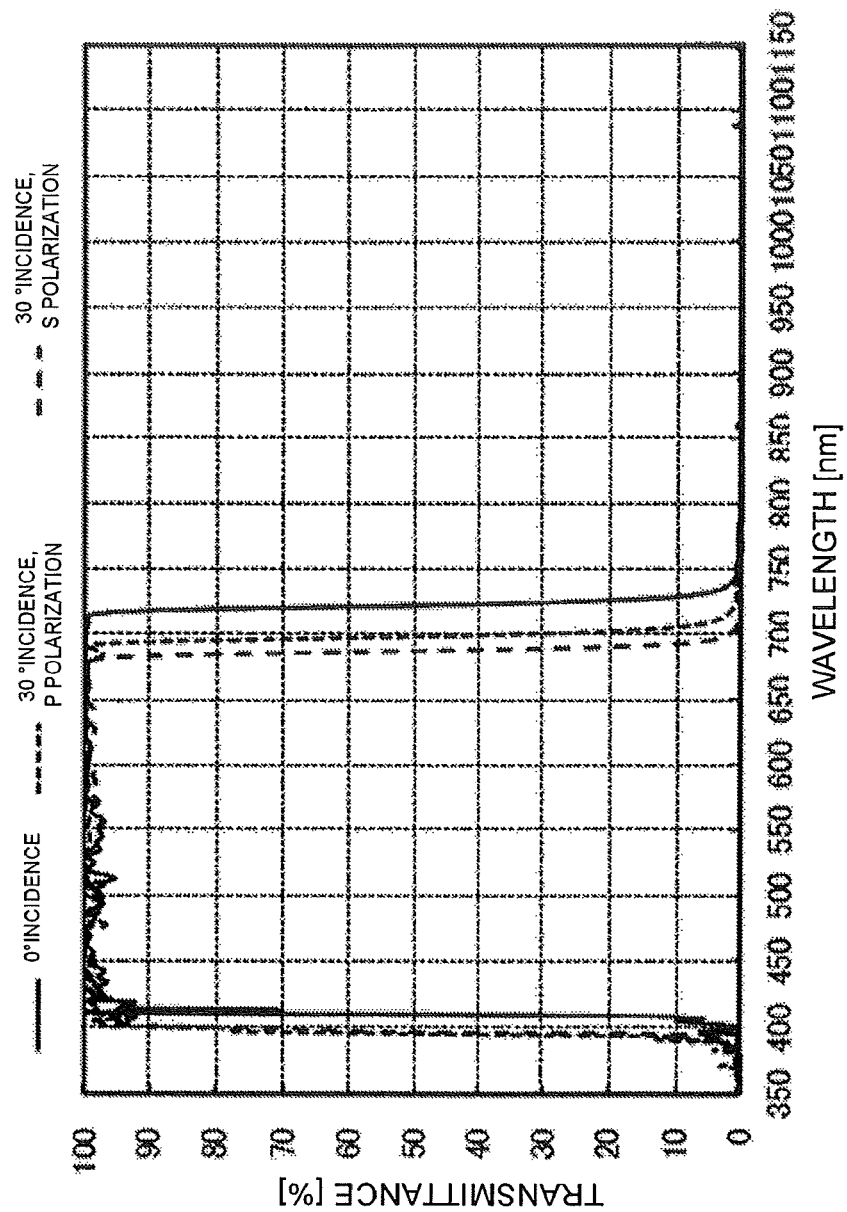
FIG. 8 is a graph (2) illustrating calculation results of spectral transmittances of a reflection layer of the optical filter in the first embodiment.

FIG. 5 illustrates calculation results of spectral transmittances of at an incidence angle of 0° and p-/s-polarized light at an incidence angle of 30° in consideration of refractive index wavelength dispersion of $TiO_2$ and $SiO_2$ regarding the first reflection layer (Table 1). The calculation and later-described calculations illustrated in FIG. 6 to FIG. 8 are performed without consideration of reflection loss at an air interface which can be reduced by a later-described anti-reflection layer. The first reflection layer has a reflection band where the transmittances with respect to light at incidence angles of 0° to 30° become 50% or less for light of wavelengths of 715 to 1043 nm, 15% or less for light of wavelengths of 720 to 957 nm, 10% or less for light of wavelengths of 722 to 956 nm, 5% or less for light of wavelengths of 726 to 953 nm, and 1% or less for light of wavelengths of 736 to 946 nm, and exhibits an average transmittance of 99% or more for visible light of wavelengths of 420 to 670 nm. Note that the first reflection layer (Table 1) has a minimum transmittance of the near-infrared reflection band of about 0.004% but can be further decreased by increasing the number of layers.

Table 2 is a design example of the second reflection layer 12b of the optical filter 30, and its specifications are decided in the order of (Design 1') to (Design 3'). The second reflection layer 12b is configured to have 23 layers made by alternately stacking $TiO_2$ with $n_H$=2.36 and $SiO_2$ with $n_L$=1.45 with respect to a design wavelength $\lambda_0$=1024 nm to generate reflection bands in wavelengths of 350 to 400 nm and in wavelengths of 850 to 1150 nm so that the optical film thicknesses $n_H d_H$ and $n_L d_L$ are about $\lambda_0/4$ (Design 1').

Next, to reduce ripples in the visible range, the second reflection layer 12b is configured such that the optical film thickness of each of the 23 layers of $TiO_2$ and $SiO_2$ is shifted by about ±10% from $\lambda_0/4$ (Design 2'). Further, to obtain the effect of reducing ripples of the visible light and the anti-reflection effect, the second reflection layer 12b is configured to have 26 layers in total by adding, at an optical film thickness smaller than $\lambda_0/4$, $SiO_2$ layer to the interface between air and the 23 layers and two layers of $SiO_2$ and $TiO_2$ to the interface between the transparent substrate and the 23 layers (Design 3'). Table 2 is the concrete configuration of (Design 3').

TABLE 2

| Layer structure | Medium | Optical film thickness ($\lambda_0$) |
| --- | --- | --- |
| Upper surface | Air | |
| 1 | $SiO_2$ | 0.135 |
| 2 | $TiO_2$ | 0.257 |
| 3 | $SiO_2$ | 0.266 |
| 4 | $TiO_2$ | 0.260 |
| 5 | $SiO_2$ | 0.268 |
| 6 | $TiO_2$ | 0.261 |
| 7 | $SiO_2$ | 0.270 |
| 8 | $TiO_2$ | 0.260 |
| 9 | $SiO_2$ | 0.268 |
| 10 | $TiO_2$ | 0.258 |
| 11 | $SiO_2$ | 0.265 |
| 12 | $TiO_2$ | 0.252 |
| 13 | $SiO_2$ | 0.251 |
| 14 | $TiO_2$ | 0.233 |
| 15 | $SiO_2$ | 0.237 |
| 16 | $TiO_2$ | 0.237 |
| 17 | $SiO_2$ | 0.252 |
| 18 | $TiO_2$ | 0.246 |
| 19 | $SiO_2$ | 0.247 |
| 20 | $TiO_2$ | 0.228 |
| 21 | $SiO_2$ | 0.230 |
| 22 | $TiO_2$ | 0.221 |
| 23 | $SiO_2$ | 0.238 |
| 24 | $TiO_2$ | 0.244 |
| 25 | $SiO_2$ | 0.051 |
| 26 | $TiO_2$ | 0.021 |
| Lower surface | Transparent substrate | |

FIG. 6 illustrates calculation results of spectral transmittances of at an incidence angle of 0° and p-/s-polarized light at an incidence angle of 30° in consideration of refractive index wavelength dispersion of $TiO_2$ and $SiO_2$ regarding the second reflection layer (Table 2). The second reflection layer has a reflection band where the transmittances with respect to light at incidence angles of 0° to 30° become 50% or less for light of wavelengths of 836 to 1244 nm, and 15% or less for light of wavelengths of 853 to 1210 nm. The second reflection layer further has a reflection band where the transmittances become 10% or less for light of wavelengths of 858 to 1146 nm, 5% or less for light of wavelengths of 870 to 1138 nm, and 1% or less for light of wavelengths of 914 to 1118 nm, and exhibits an average transmittance of 98% or more for visible light of wavelengths of 420 to 670 nm. Note that the second reflection layer (Table 2) has a minimum transmittance of the near-infrared reflection band of about 0.02% but can be further decreased by increasing the number of layers.

Note that the optical filters 10, 30 illustrated in FIGS. 1A, 1C are made such that the first reflection layer 12a and the second reflection layer 12b are arranged to be separate from each other. The reflection layers of the present filter include the case of arrangement of them separate from each other, but when the space between the first reflection layer 12a and the second reflection layer 12b is smaller than the coherence length of incident light, calculation is required to be performed in consideration of interference between reflected lights generated on both of them. On the other hand, when the space between them is longer than the coherence length of incident light, there is no interference, and consideration of the interference between reflected lights is unnecessary. On the imaging device, natural light having a short coherence length is incident from the subject side. Therefore, when the optical filter installed in the imaging device includes the first reflection layer 12a and the second reflection layer 12b on both principal surfaces of the absorption layer 11 or the transparent substrate 13 having a thickness of 30 μm or more, it is unnecessary to take interference between them into consideration for the spectral transmittance of the reflection layer including both of them.

FIG. 7 illustrates calculation results of spectral transmittances (at an incidence angle of 0° and p-/s-polarized light at an incidence angle of 30°) of the "reflection layer" including the first and second reflection layers. The reflection layer has transmittances with respect to light at incidence angles of 0° to 30° of 50% or less for light of wavelengths of 350 to 380 nm and wavelengths of 707 to 1236 nm, 15% or less for light of wavelengths of 350 to 377 nm and wavelengths of 712 to 1198 nm, 10% or less for light of wavelengths of 350 to 376 nm and wavelengths of 714 to 1135 nm, 5% or less for light of wavelengths of 718 to 1127 nm, and 1% or less for light of wavelengths of 727 to 1108 nm. The reflection layer further exhibits an average transmittance of 98% or more for visible light of wavelengths of 420 to 670 nm, and an average transmittance of 0.5% or less for near-infrared light of wavelengths of 730 to 1150 nm.

Besides, for example, in the case of combining the reflection layer illustrated in FIG. 7 and the absorption layers illustrated in FIG. 3, $\lambda Sh(DAB\_T10\%)+30$ nm$<\lambda_R(0°\_T50\%)<\lambda Lo(DAB\_T5\%)$ is satisfied where the wavelength at which the transmittance of the reflection layer with respect to light at an incidence angle of 0° in wavelengths of 680 to 750 nm becomes 50% is $\lambda_R(0°\_T50\%)$, and the wavelength at which the transmittance of the absorption layer with respect to light of wavelengths of 580 nm to $\lambda(DA\_T_{min})$ becomes 10% is $\lambda Sh(DAB\_T10\%)$ and the wavelength at which the transmittance of the absorption layer with respect to light of wavelengths $\lambda(DB\_T_{min})$ to 800 nm becomes 5% is $\lambda Lo(DAB\_T5\%)$.

Besides, the optical filters 20 and 40 illustrated in FIGS. 1B and 1D are made by stacking the first reflection layer 12a and the second reflection layer 12b. In this case, since reflected lights generated on both of the interfaces interfere with each other, it is preferable to calculate the spectral transmittance with the first reflection layer 12a and the second reflection layer 12b regarded as one continuous dielectric multilayer film having coherency of light. For example, if the first and second reflection layers individually designed are simply stacked, ripples may occur in the transmission band and the reflection band. Accordingly, to reduce the ripples, it is preferable to adjust the thickness of each of the dielectric multilayer films and the thickness of the dielectric film at the boundary between the first and second reflection layers, the interface with air, the interface with the absorption layer 11 and the like.

FIG. 8 illustrates calculation results of spectral transmittances (at an incidence angle of 0° and p-/s-polarized light at an incidence angle of 30°) of the "reflection layer" composed of the dielectric multilayer film made by sequentially stacking the first and second reflection layers to alternately stack 59 layers of $TiO_2$ and $SiO_2$ on one principal surface of the transparent substrate 13 for the optical filter 40 in FIG. 1D. The reflection layer used, as bases, the first reflection layer composed of 27 layers having an optical film thickness of about $\lambda_0/4$ at $\lambda_0=926$ nm and the second reflection layer composed of 23 layers having an optical film thickness of about $\lambda_0/4$ at $\lambda_0=1050$ nm. Note that the dielectric multilayer films having the spectral transmittances illustrated in FIG. 8 are obtained by adjusting the optical film thicknesses listed in Table 1 and Table 2 to improve the transmittance for visible light and reduce ripples.

The reflection layer has a reflection band where the transmittances with respect to light at incidence angles of 0° to 30° become 50% or less for light of wavelengths of 350 to 394 nm and wavelengths of 721 to 1260 nm. The reflection layer further exhibits transmittances of 15% or less for light of wavelengths of 350 to 390 nm and wavelengths of 726 to 1152 nm, 10% or less for light of wavelengths of 350 to 388 nm and wavelengths of 728 to 1151 nm, 5% or less for light of wavelengths of 732 to 1150 nm, and 1% or less for light of wavelengths of 742 to 1087 nm. The reflection layer further exhibits an average transmittance of 98% or more for visible light of wavelengths of 420 to 670 nm and an average transmittance of 0.2% or less for near-infrared light of wavelengths of 730 to 1150 nm.

Besides, for example, in the case of combining the reflection layer illustrated in FIG. 8 and the absorption layers illustrated in FIG. 4, $\lambda Sh(DAB\_T10\%)+30$ nm$<\lambda_R(0°\_T50\%)<\lambda Lo(DAB\_T5\%)$ is satisfied where the wavelength at which the transmittance of the reflection layer with respect to light at an incidence angle of 0° in wavelengths of 680 to 750 nm becomes 50% is $\lambda_R(0°\_T50\%)$, and the wavelength at which the transmittance of the absorption layer with respect to light of wavelengths of 580 nm to $\lambda(DA\_T_{min})$ becomes 10% is $\lambda Sh(DAB\_T10\%)$ and the wavelength at which the transmittance of the absorption layer with respect to light of wavelengths $\lambda(DB\_T_{min})$ to 800 nm becomes 5% is $\lambda Lo(DAB\_T5\%)$.

The reflection layers illustrated in FIG. 7 and FIG. 8, even in any arrangement in the optical filters 10, 20, 30, and 40, exhibit transmittances with respect to light at incidence angles of 0° to 30° of 15% or less for light of wavelengths of 350 to 377 nm and wavelengths of 726 to 1152 nm, 10% or less for light of wavelengths of 350 to 376 nm and wavelengths of 728 to 1135 nm, 5% or less for light of wavelengths of 732 to 1127 nm, and 1% or less for light of wavelengths of 742 to 1087 nm. The reflection layer further exhibits an average transmittance of 98% or more for visible light of wavelengths of 420 to 670 nm and an average transmittance of 0.5% or less for near-infrared light of wavelengths of 730 to 1150 nm.

Note that when the reflection layer includes the first and second reflection layers on the same principal surface of the absorption layer or the transparent substrate, the dielectric multilayer films can be formed in sequence, resulting in improved productivity. On the other hand, the optical filter in which the reflection layer is arranged is likely to cause substrate distortion due to film stress, and is therefore preferably designed so that the film stress falls within an allowable range. Further, the reflection layer is preferably designed to suppress the ripples that are more likely to occur with an increase in the number of layers of the dielectric multilayer film.

Besides, when the reflection layer includes the first and second reflection layers to be separate from each other on both principal surfaces of the transparent substrate, the productivity may lower because the reflection layers are formed separately on a front surface and a rear surface. On the other hand, in the optical filter in which the reflection layers are arranged, the film stresses act to cancel each other on both surfaces of the substrate, so that the distortion of the substrate is easily suppressed, for example, even if the transparent substrate is thinned. Further, when the transparent substrate is thicker than the coherence length of incident light, interference ripples between the first and second reflection layers hard to occur. As a result, the first and second reflection layers can realize desired spectral transmittance curves by calculation in consideration of only multiple reflection while ignoring the interference between these dielectric multilayer films.

The reflection layers have reflection bands where the transmittances with respect to light at incidence angles of 0° to 30° become 50% or less also for the near-ultraviolet range as illustrated in FIG. 7 and FIG. 8. Further, the ultraviolet light of a wavelength of 350 nm or less is blocked by absorption by $TiO_2$ of the reflection layer, the transparent substrate and the like, with the result that the transmittance becomes 10% or less for light of a wavelength of 378 nm or less. However, the reflection band on the near-ultraviolet side of the reflection layer also shifts to the shorter wavelength side with an increase in incidence angle from 0° to 30°. More specifically, the wavelength at which the transmittance is 50% in the near-ultraviolet range shifts by 14 nm each, from 397 nm to 383 nm in FIG. 7 and from 409 nm to 395 nm in FIG. 8. The present filter preferably includes an absorption layer also containing a UV absorbent in addition to the NM absorbent so as to decrease the near-ultraviolet light incidence angle dependence of the reflection layer.

The UV absorbent concretely has a maximum absorption wavelength $\lambda(DU\_T_{min})$ in wavelengths of 370 to 405 nm, and has a wavelength $\lambda Lo(DU\_T50\%)$ at which the transmittance becomes 50% in wavelengths of 400 to 420 nm. Under assumption of the absorption layer containing only the UV absorbent, the kind of the UV absorbent, the UV absorbent concentration C, and the thickness L of the absorption layer are preferably set so that the UV absorbent has an average transmittance with respect to light of wavelengths of 440 to 680 nm of 90% or more and more preferably 95% or more in the spectral transmittance curve with respect to light at an incidence angle of 0°. As an example of the UV absorbent having a light blocking property against light of wavelengths of 350 to 390 nm, a merocyanine-based dye is preferable. Further, SDA3382 and MSA 3144 manufactured by H.W. Sands Corp., and UV386A and UV386B, UV386A manufactured by QCR Solutions Corp. (all of the above are product names) are also preferable.

<Transparent Substrate>

In the case of using the transparent substrate in this filer, the transparent substrate only needs to be made of a material exhibiting high transmittance for visible light of wavelengths of 420 to 670 nm and may be a material absorbing near-infrared light or near-ultraviolet light. Examples of the material include inorganic materials such as glass and crystal and organic materials such as a resin, and its shape is not limited either. From optical and mechanical reliability and handling property during manufacture, glass is preferable. Further, the transparent substrate is preferably 0.03 to 5 mm thick and more preferably 0.03 to 0.5 mm thick. Further, the transparent substrate is, when made of glass, preferably 0.05 to 0.5 mm thick.

Examples of the glass usable for the transparent substrate include soda lime glass, borosilicate glass, non-alkaline glass, quartz glass, and absorption-type glass in which CuO or the like is added to fluorophosphate-based glass, phosphate-based glass or the like. Examples of the crystalline material usable for the transparent substrate include birefringent crystals such as crystalline quartz, lithium niobate, sapphire and the like. Examples of the resin usable for the transparent substrate include a polyester resin, a polyolefin resin, an acrylic resin, a urethane resin, a vinyl chloride resin, a fluorocarbon resin, a polycarbonate resin, a polyvinylbutyral resin, a polyvinylalcohol resin, a polyimide resin, and the like.

The transparent substrate, when made of the above-described absorption-type glass in which CuO is added, has a wide near-infrared absorption band at a maximum absorption wavelength of 800 to 900 nm. Further, the absorption-type glass can adjust the transmittance for light of wavelengths of 700 to 1150 nm by adjusting the CuO addition concentration and the thickness, and can realize a transmittance of 20% or less. Since the absorption-type glass absorbs also a visible range of wavelengths of 550 to 700 nm, the CuO addition concentration and the thickness are adjusted while the decrease in transmittance for the visible light is suppressed.

Further, the transparent substrate, when composed of the absorption-type glass, can enhance the light blocking property against the near-infrared light which cannot be absorbed even by the absorption layer including the absorbents DA and DB in a transparent resin (B). In particular, the optical filter using the absorption-type glass can mitigate the required level of decrease in reflectivity for the near-infrared light required of the reflection layer, and therefore can realize the reduction in the number of layers of the dielectric multilayer film constituting the reflection layer and realize high light blocking property against unnecessary light to improve the image quality of the imaging device. Further, the optical filter using the absorption-type glass can absorb light of wavelengths of 700 to 1150 nm rarely depending on the incidence angle. Therefore, the optical filter can suppress image deterioration caused from the near-infrared reflected light generated in the reflection layer becoming stray light in the imaging device.

<Anti-Reflection Layer>

The present filter preferably includes an anti-reflection layer that reduces the reflection loss of visible light. The anti-reflection layer can be realized by stacking dielectric films different in refractive index in 3 to 9 layers into a thickness of 200 to 400 nm in order to obtain antireflection effect for visible light of wavelengths of 400 to 700 nm. Further, the anti-reflection layer may be the one having an anti-reflection structure called moth-eye structure on the surface of the absorption layer.

The present filter is made on the premise of the combination of the absorption layer satisfying the difference between $\lambda(DB\_T_{min})$ of the absorbent DB and $\lambda(DA\_T_{min})$ of the absorbent DA of 10 nm$\leq\lambda(DB\_T_{min})-\lambda(DA\_T_{min})$<40 nm. Therefore, the present filter can be configured to adjust the effective thickness ratio CL of the NIR absorbent in the absorption layer and generate no transmission band where the transmittance becomes 1% or more in the intermediate wavelength range between $\lambda(DA\_T_{min})$ and $\lambda(DB\_T_{min})$.

On the other hand, the above-described difference in the wavelength is comparatively small such as 10 to 40 nm, so that when the effective thickness ratio CL is adjusted to the one suppressing the decrease in transmittance for the visible light, the absorption wavelength band width $\Delta\lambda_{abs}$ becomes more difficult to expand. As a result, the blocking of the near-infrared light tends to depend on the reflection characteristics of the reflection layer. Further, when the absorbent DB large in difference between $\lambda(DB\_T_{min})$ and $\lambda(DA\_T_{min})$ is used in order to expand $\Delta\lambda_{abs}$, a transmission band where the transmittance becomes 1% or more becomes more likely to occur in the intermediate wavelength range between them. For example, when the effective thickness ratio CL of the absorbent DA is adjusted to cause a steep transmittance change with respect to light of wavelengths of 600 to 690 nm, $\Delta\lambda_{abs}$ contracts, and the above-described transmission band is likely to occur. Therefore, the present filter is preferably designed to have an appropriate reflection layer according to $\Delta\lambda_{abs}$ changing by the NIR absorbent to be used. Further, the present filter preferably has a difference in transmittance with respect to lights at incidence angles of 0° and 30° of a wavelength at which the transmittance becomes 50% or less in spectral transmittance curves in the visible range to the near-infrared range, in particular, in wavelengths of 600 to 900 nm of 30% or less, more preferably 20% or less, furthermore preferably 10% or less, and still more preferably 5% or less. Note that this index is preferably satisfied also in the optical filters in later-described second and third embodiments.

Second Embodiment

An optical filter in this embodiment is different from the first embodiment in $\lambda(DB\_T_{min})$ of an absorbent DB used for an absorption layer and a reflection layer configuration, but has the same absorbent DA, transparent substrate, anti-reflection layer and so on as those of the first embodiment for which overlapping description will be omitted. Further, the optical filter in second embodiment is referred to also as "present filter" in explanation of the second embodiment.

The $\lambda(DA\_T_{min})$ of the absorbent DA contained in the absorption layer is the same wavelength of 685 to 715 nm as that in the first embodiment but the $\lambda(DB\_T_{min})$ of the absorbent DB is a wavelength of more than 725 nm and 900 nm or less, so that the present filter satisfies 40 nm≤λ$(DB\_T_{min})-\lambda(DA\_T_{mm})$≤215 nm. Since the present filter has a large wavelength difference between $\lambda(DB\_T_{min})$ and $\lambda(DA\_T_{min})$ as compared with the optical filter in the first embodiment, a transmission band where the transmittance becomes 1% or more becomes more likely to occur near a wavelength $\lambda_C(T_{max})$ where the transmittance in the absorption layer becomes maximum, in the wavelengths $\lambda(DA\_T_{min})$ to $\lambda(DB\_T_{min})$.

Therefore, when the reflection layer is designed to satisfy the relation of $\lambda_R(0°\_T50\%) > \lambda_C(T_{max})$ to prevent occurrence of the above transmission band, the reflection band in the reflection layer shifts to the shorter wavelength side with an increase in incidence angle, so that the transmission band in the absorption layer occurring near $\lambda_C(T_{max})$ disappears by reflection on the reflection layer. However, the transmission band near $\lambda_C(T_{max})$ with respect to light at an incidence angle of 0° cannot be eliminated.

On the other hand, when the reflection layer is designed to satisfy the relation of $\lambda_R(0°\_350\%) < \lambda_C(T_{max})$ to surely eliminate the transmission band near $\lambda_C(T_{max})$, the following tendency may occur. Specifically, the reflection layer eliminates the transmission band in the absorption layer occurring near $\lambda_C(T_{max})$ with respect to light at incidence angles of 0° to 30°. However, the reflection band shifts to the shorter wavelength side with an increase incidence angle, so that the reflection layer may reflect, more than necessary, also visible light where the transmittance of the absorption layer increases, on a side of a wavelength shorter than $\lambda(DA\_T_{min})$. In this case, the incidence angle/polarization dependence of the spectral transmittances may increase in wavelengths of 650 to 700 nm where the transmittance is 50% or less.

Accordingly, for the present filter, the reflection layer exhibiting spectral transmittance curves with less incidence angle/polarization dependence is designed based on the spectral absorption characteristics of the absorption layer, for combination. Such design allows the present filter to exhibit the spectral transmittances with little or no incidence angle/polarization dependence with respect to light at incidence angles of 0° to 30° even if the reflection band of the reflection layer shifts, eliminate the transmission band near $\lambda_C(T_{max})$, and realize high light blocking property against light of wavelengths of 700 to 1150 nm.

Hereinafter, concrete design conditions of the present filter will be described. Note that desired spectral transmittance curves have spectral transmittances capable of keeping high transmittances for visible light of wavelengths of 440 to 600 nm, exhibiting high absorbency with respect to light of wavelengths of 690 to 720 nm, and approximately correcting the spectral transmittance curves of wavelengths of 600 to 690 nm to a visibility curve. Further, the conditions of the absorption layer and the reflection layer to realize an optical filter with less spectral transmittance change due to the incidence angle/polarization dependence will be described below.

Conditions of Absorption Layer (Second Embodiment)

The absorption layer contains the absorbent DA and the absorbent DB in the relation of the following (i-4) and satisfies the following conditions (i-5) and (i-6). The absorption layer is obtained by adjusting the concentration C and the thickness L of each of the absorbents so as to satisfy the following conditions (i-5) and (i-6).

(i-4) 40 nm $\lambda(DB\_T_{min})-\lambda(DA\_T_{min})$≤215 nm is satisfied.
(i-5) The transmittance for light of a wavelength of 600 nm is 80% or more, the transmittance for light of a wavelength of 650 nm is 40% or more, the transmittance for light of the wavelength $\lambda(DA\_T_{min})$ is 3% or less, and the transmittance for light of the wavelength $\lambda(DB\_T_{min})$ is 3% or less.
(i-6) $\{\lambda Sh(DAB\_T50\%)-\lambda Sh(DAB\_T90\%)\} \leq \{\lambda Sh(DAB\_T5\%)-\lambda Sh(DAB\_T50\%)\}$ is satisfied.

Where, λSh(DAB_T90%), λSh(DAB_T50%), and λSh(DAB_T5%) represent wavelengths at which the transmittances in wavelengths of 580 nm to $\lambda(DA\_T_{min})$ become 90%, 50%, and 5% respectively. In (i-5), the transmittance for light of a wavelength of 600 nm is preferably 90% or more, the transmittance for light of a wavelength of 650 nm is preferably 50% or more, the transmittance for light of the wavelength $\lambda(DA\_T_{min})$ is preferably 2% or less, and the transmittance for light of the wavelength $\lambda(DB\_T_{min})$ is preferably 2% or less.

Figure 9:
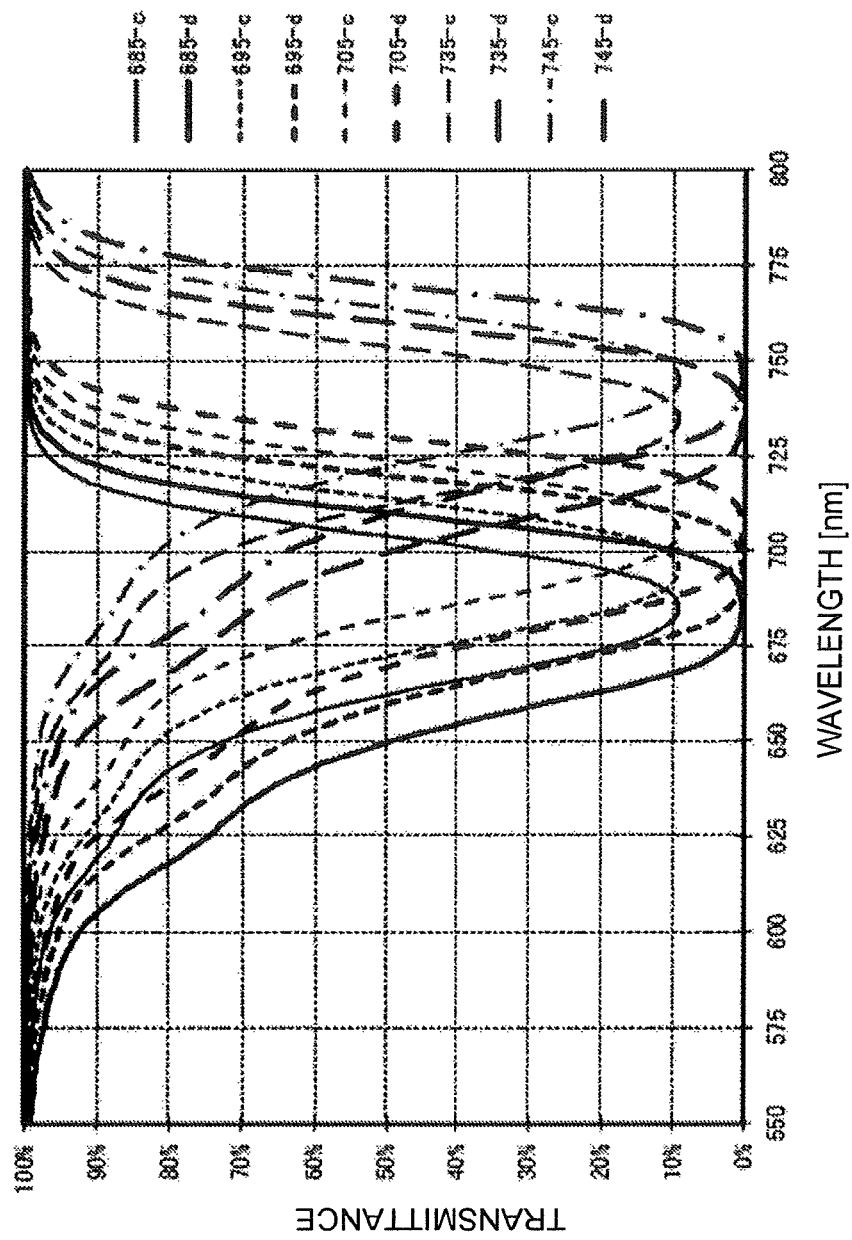
FIG. 9 illustrates spectral transmittance curves of near-infrared absorbents different in maximum absorption wavelength in an optical filter in a second embodiment.

FIG. 9 illustrates calculation results of the spectral transmittances at an NIR absorbent concentration where the transmittance for the maximum absorption wavelength becomes approximately 10% (indicated with a "maximum absorption wavelength-c" in FIG. 9) and at a concentration of 2.5 times the above NIR absorbent concentration (indicated with a "maximum absorption wavelength-d" in FIG. 9) regarding five kinds of NIR absorbents with different maximum absorption wavelengths such as 685 nm, 695 nm, 705 nm, 735 nm and 745 nm on the basis of the spectral transmittances of an absorption layer containing a squarylium-based compound.

The present filter has an absorption layer containing the absorbent DB having $\lambda(DB\_T_{min})$ in wavelengths of more than 725 nm and 900 nm or less on a side of a wavelength longer than $\lambda(DA\_T_{min})$ of the absorbent DA. The absorption layer can improve the light blocking property by a wide absorption wavelength band width on a side of a wavelength longer than $\lambda(DB\_T_{min})$ while keeping high transmittance for visible light. Here, under assumption of the absorption layer containing only the absorbent DB, the absorbent concentration C and the thickness L of the absorption layer (effective thickness ratio CL) of the absorbent DB are adjusted so that the transmittance for light of $\lambda(DB\_T_{min})$ becomes 6% or less, the transmittance for light of a wavelength of 600 nm becomes 90% or more, and the transmittance for light of a wavelength of 650 nm becomes 65% or more. Specifically, the absorption layer containing the absorbent DB is obtained by using the NIR absorbent of the spectral transmittance curves at the same level as those of the squarylium-based compound having $\lambda(DB\_T_{min})$ in wavelengths of more than 725 and 775 nm or less and adjusting the effective thickness ratio CL of the NIR absorbent, based on the calculation results in FIG. 9.

Figure 10:
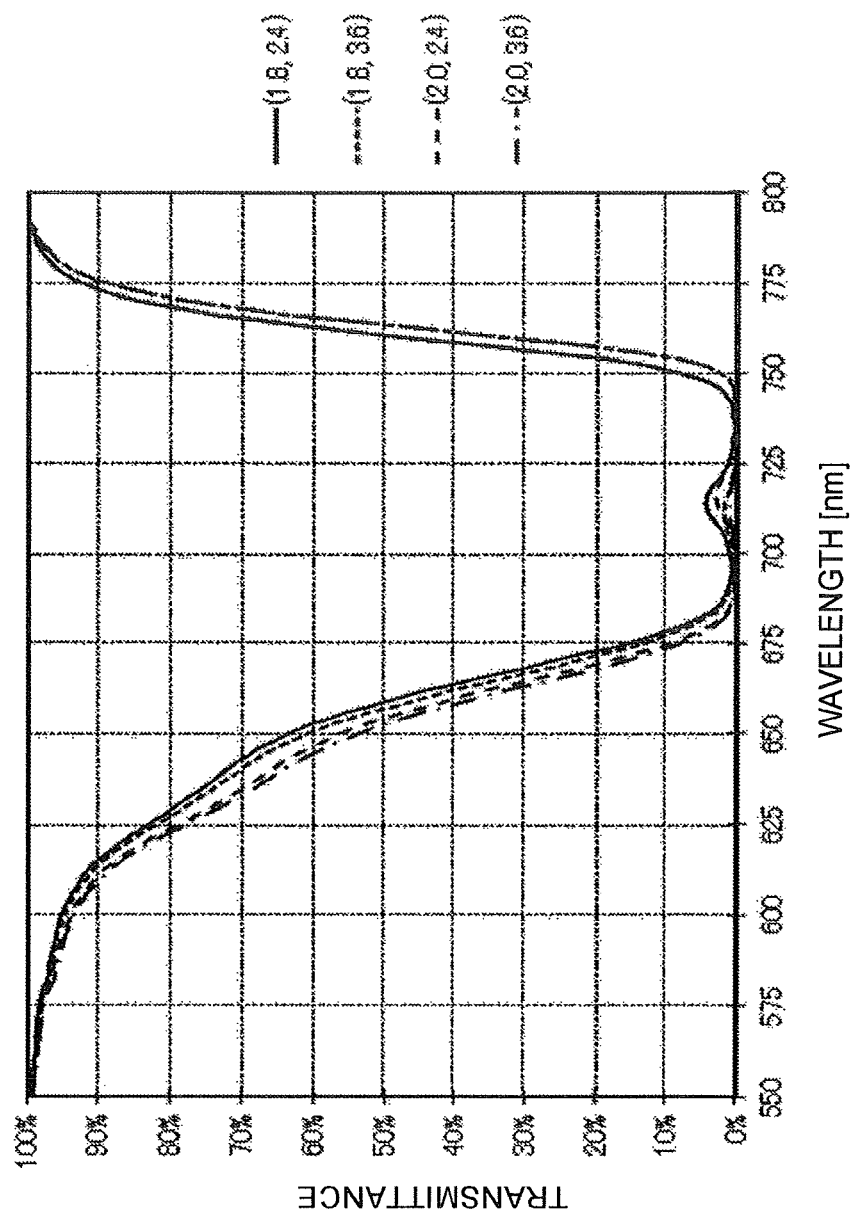
FIG. 10 is a graph (1) illustrating calculation results of spectral transmittances of absorption layers of the optical filter in the second embodiment.

FIG. 10 illustrates calculation results of spectral transmittances in wavelengths of 550 to 800 nm of absorption layers obtained by a transparent resin containing the absorbent DA having $\lambda(DA\_T_{min})$=695 nm and the absorbent DB having $\lambda(DB\_T_{min})$=735 nm so that their respective effective thickness ratios (CL(A), CL(B)) are (1.8, 2.4), (1.8, 3.6), (2.0, 2.4) and (2.0, 3.6). Any of the transmittances in FIG. 10 is 90% or more for light of a wavelength of 600 nm and 53 to 64% for light of a wavelength of 650 nm. The transmittances of the calculation results are 2% or less for light of wavelengths of 687 to 705 nm and wavelengths of 723 to 745 nm, 5% or less for light of wavelengths of 682 to 748 nm, 10% or less for light of wavelengths of 678 to 751 nm, 2% or less for light of the wavelength $\lambda(DA\_T_{min})$, and 2% or less for light of the wavelength $\lambda(DB\_T_{min})$. In short, the absorption layers exhibit a steep transmittance change on the longer wavelength side of the visible range of wavelengths of 600 to 690 nm and can realize 60 nm or more as $\Delta\lambda_{abs}(T10\%)$. Note that these calculation results also show occurrence of a transmission band where the transmittance becomes approximately 1 to 5% near $\lambda_C(T_{max})=713$ nm. Further, $\{\lambda Sh(DAB\_T50\%)-\lambda Sh(DAB\_T90\%)\} \geq \{\lambda Sh(DAB\_T5\%)-\lambda Sh(DAB\_T50\%)\}$ is satisfied.

Note that the effective thickness ratios realizing the above-described spectral transmittance curves in FIG. 10 are not limited to the above, but the same characteristics can be obtained, for example, even when CL(B)=2.4 to 3.6 at CL(A)=1.8 or when CL(B)=2.4 to 3.6 at CL(A)=2.0. Further, even an absorption layer adjusted to an effective thickness ratio other than the above can realize a transmittance for light of a wavelength of 600 nm of 90% or more, a transmittance for light of a wavelength of 650 nm of 50% or more, a transmittance for light of a wavelength $\lambda(DA\_T_{min})$ of 3% or less, a transmittance for light of a wavelength $\lambda(DB\_T_{min})$ of 2% or less, an absorption wavelength band width $\Delta\lambda_{abs}(T2\%)$ where the transmittance for light near a wavelength of 700 nm becomes 2% or less of 20 nm or more, an absorption wavelength band width $\Delta\lambda_{abs}(T5\%)$ where the transmittance for light near a wavelength of 700 nm becomes 5% or less of 60 nm or more, and an absorption wavelength band width $\Delta\lambda_{abs}(T10\%)$ where the transmittance for light near a wavelength of 700 nm becomes 10% or less of 70 nm or more.

Figure 11:
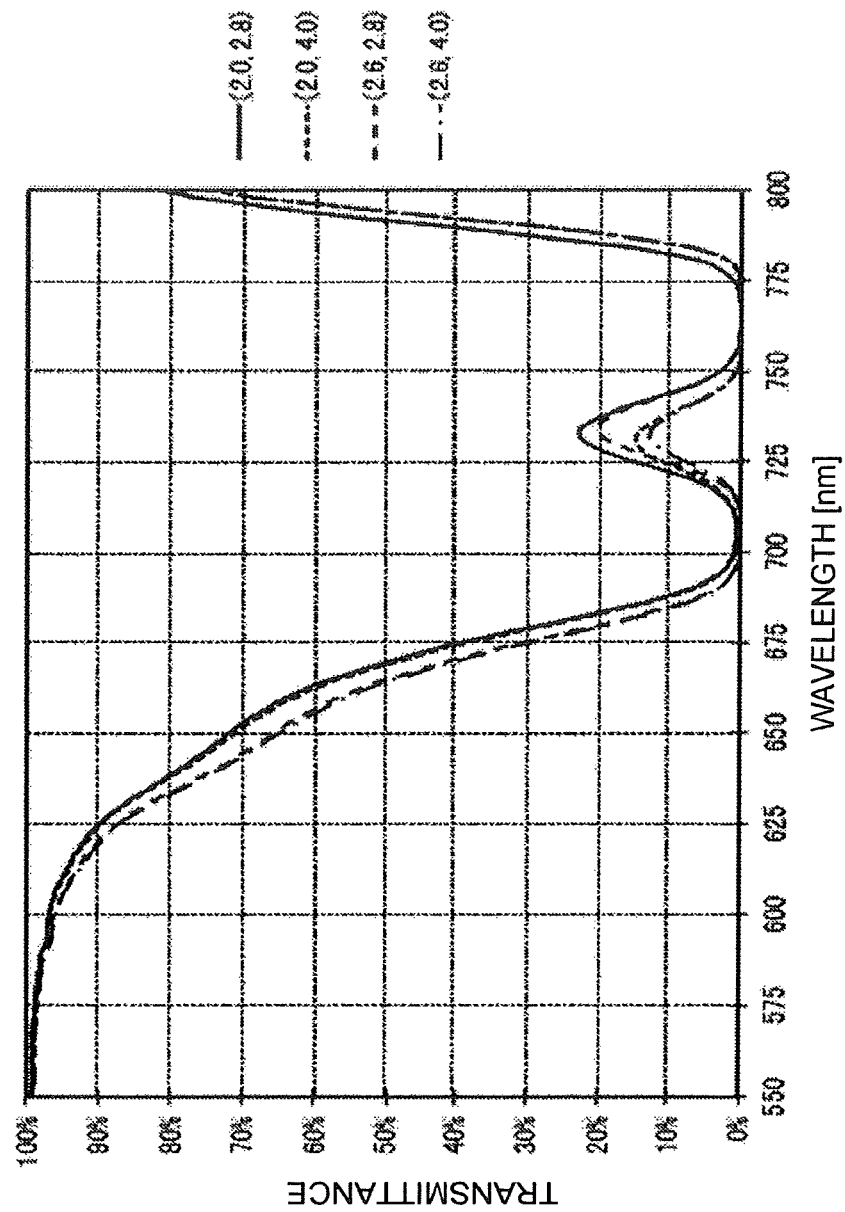
FIG. 11 is a graph (2) illustrating calculation results of spectral transmittances of absorption layers of the optical filter in the second embodiment.

Next, a design example of an absorption layer different from the above example will be illustrated. FIG. 11 illustrates calculation results of spectral transmittances with respect to light of wavelengths of 550 to 800 nm of absorption layers obtained by a transparent resin containing the absorbent DA having $\lambda(DA\_T_{min})=705$ nm and the absorbent DB having $\lambda(DB\_T_{min})=765$ nm so that their respective effective thickness ratios (CL(A), CL(B)) are (2.0, 2.8), (2.0, 4.0), (2.6, 2.8) and (2.6, 4.0). Any of the transmittances in FIG. 11 is 90% or more for light of a wavelength of 600 nm, 64 to 72% for light of a wavelength of 650 nm, 2% or less for light of wavelengths of 696 to 714 nm and wavelengths of 752 to 776 nm, 5% or less for light of wavelengths of 692 to 718 nm and wavelengths of 748 to 779 nm, 10% or less for light of wavelengths of 688 to 722 nm and wavelengths of 744 to 782 nm, 2% or less for light of the wavelength $\lambda(DA\_T_{min})$, and 2% or less for light of the wavelength $\lambda(DB\_T_{min})$. Note that the calculation results also show occurrence of a transmission band where the transmittance with respect to light near a wavelength of 732 nm becomes 12 to 23%. Further, $\{\lambda Sh(DAB\_T50\%)-\lambda Sh(DAB\_T90\%)\} \geq \{\lambda Sh(DAB\_T5\%)-\lambda Sh(DAB\_T50\%)\}$ is satisfied.

Note that the effective thickness ratios realizing the spectral transmittance curves in FIG. 11 are not limited to the above, and the above characteristics can be obtained, for example, even in an absorption layer adjusted to CL(B)=2.8 to 4.0 at CL(A)=2.0, CL(B)=2.8 to 4.0 at CL(A)=2.6, or an effective thickness ratio other than them. Further, the present filter has the absorption layer capable of exhibiting a wide absorption band as compared with that of the first embodiment while having the reflection layer sufficiently blocking stray light occurring near $\lambda_C(T_{max})$. On the premise of the above, the absorption layer can realize a $\Delta\lambda_{abs}(T10\%)$ where the transmittance except a transmission abs band near $\lambda_C(T_{max})$ becomes 10% or less of 70 nm or more. Note that this design is an example that a $\Delta\lambda_{abs}(T10\%)$ of 90 nm or more is realized.

The absorption layer may contain, as with the absorption layer in the first embodiment, the near-ultraviolet absorbent (absorbent DU) having a maximum absorption wavelength $\lambda(DU\_T_{min})$ in wavelengths of 370 to 405 nm and having a wavelength $\lambda Lo(DU\_T50\%)$ at which the transmittance becomes 50% in wavelengths of 400 to 420 nm.

Since the wavelength difference between $\lambda(DA\_T_{min})$ and $\lambda(DB\_T_{min})$ of two kinds of NIR absorbents contained in the absorption layer in the present filter falls within a range of 40 nm or more and 215 nm or less as described above, a transmission band where the transmittance becomes 1% or more occurs in the intermediate wavelength range between them. Further, the absorbent DA can approximately correct the spectral transmittance curves of wavelengths of 600 to 690 nm to a visibility curve to realize the spectral transmittances for absorbing light of wavelengths of 690 to 720 nm. Therefore, the wavelength difference between $\lambda Sh(DAB\_T5\%)$ where the transmittance of the absorption layer becomes 5% on the shorter wavelength side of $\lambda(DA\_T_{min})$ and $\lambda_C(T_{max})$ becomes narrow to be about 30 nm.

Accordingly, the present filter includes the reflection layer improving the light blocking property, insufficient only by the absorption layer, with respect to light of wavelengths of 700 to 1150 nm using the spectral transmittance curves of the absorption layer having less incidence angle/polarization dependence with respect to light of wavelengths of 600 to 700 nm. Here, when the reflection layer similar to that in the first embodiment is used, the reflection band of the reflection layer shifts to the shorter wavelength side by about 40 nm near 700 nm with respect to light at incidence angles of 0° to 30°, so that a transmittance change due to the incidence angle/polarization dependence occurs with respect to light of wavelengths of 650 to 750 nm.

To decrease the incidence angle/polarization dependence, the present filter preferably uses a reflection layer with less shift amount. Specifically, the reflection layer preferably uses a design that the maximum shift amount of the reflection band near a wavelength of 700 nm becomes 30 nm or less, preferably 25 nm or less, and more preferably 20 nm or less with respect to light at incidence angles of 0° to 30°.

For the reflection layer with less incidence angle/polarization dependence, for example, the designs described in WO 2013/015303, JP-A 2007-183525 can be referred to. The former illustrates an example of setting a difference in wavelength at which the transmittance becomes 50% between incidence angles of 0° and 30° with respect to light near a wavelength of 650 nm to 16 nm by a dielectric multilayer film made by stacking 15 or more unit refractive index layers composed of a layer having a refractive index of 2 or more and a layer having a refractive index of 1.6 or less. The latter illustrates an example of setting the average refractive index to high (1.94) and setting a difference in wavelength at which the transmittance becomes 50% between incidence angles of 0° and 25° to 15 nm by a dielectric multilayer film made by alternately stacking 27 layers of $TiO_2$ having a refractive index of 2.27 and a composite oxide of $La_2O_3$ and $Al_2O_3$ having a refractive index of 1.72. Next, the conditions of the reflection layer in the present filter will be described.

Conditions of Reflection Layer (Second Embodiment)

(ii-3) The reflection layer has a reflection band where the transmittance with respect to light at an incidence angle of 0° in wavelengths of 700 to 1150 nm becomes 5% or less.
(ii-4) The reflection layer satisfies the following relation.

$$\lambda Sh(DAB\_T10\%)+20\ nm<\lambda_R(0°\_T50\%)<\lambda_C(T_{max})$$

Where a wavelength at which a transmittance with respect to light at the incidence angle of 0° in wavelengths of 680 to 750 nm becomes 50% is $\lambda_R(0°\_T50\%)$, and a wavelength at which the transmittance of the absorption layer in the wavelengths of 580 nm to $\lambda(DA\_T_{min})$ becomes 10% is $\lambda Sh(DAB\_T10\%)$.
(ii-5) A difference $\delta\lambda_R Sh(T50\%)$ between wavelength $\lambda_R(0°\_350\%)$ and wavelength $\lambda_R(30°\_Ts50\%)$ with respect to s-polarized light at an incidence angle of 30° in wavelengths of 640 to 750 nm satisfies 0 nm<$\Delta\lambda_R Sh(T50\%)\leq 25$ nm.

By satisfying the conditions of (ii-3) to (ii-5), the present filter has merely small transmittance change with respect to light of wavelengths of 640 to 750 nm at incidence angles of 0° to 30° even when a transmission band occurs due to the absorption layer near $\lambda_C(T_{max})$, so that stable light blocking property can be obtained with respect to near-infrared light of wavelengths of 700 to 1150 nm. Note that it is more preferable that (ii-5) is satisfied in a wavelength range of wavelengths of 680 to 750 nm, in which case the transmittance change with respect to light of wavelengths of 680 to 750 nm at incidence angles of 0° to 30° is small.

The reflection layer may be configured to include two kinds of dielectric multilayer films different in maximum reflection wavelength $\lambda_0$ as with the optical filter in the first embodiment. The reflection layer has, for example, the first reflection layer 12a and the second reflection layer 12b, and the above-described design of the dielectric multilayer film with less shift amount of the reflection band is preferably applied to the first reflection layer 12a that reflects light on the shorter wavelength side of the near-infrared range of wavelengths of 700 to 1150 nm. Note that the second reflection layer 12b that reflects light on the longer wavelength side of the near-infrared range and the near-ultraviolet light may be designed similarly to that of the first embodiment.

The condition of (ii-3) in the reflection layer of the present filter is the same as the condition of (ii-1) of the reflection layer in the first embodiment, and is achieved by the reflection characteristics of the first reflection layer 12a and the second reflection layer 12b. The condition of (ii-5) is mainly achieved by the reflection characteristics of the first reflection layer 12a, thereby reducing the shift amount $\Delta\lambda_R Sh(T50\%)$ of the reflection layer with respect to the change at incidence angles of 0° to 30°. The condition related to the spectral characteristics of the absorption layer on the premise of the reflection layer is (ii-4), which is different from the condition (ii-2) of the reflection layer in the first embodiment. Preferable conditions of the spectral transmittances of the absorption layer and reflection layer other than the above conditions are the same as those in the first embodiment, and therefore description thereof will be omitted.

Next, a design example of the reflection layer in the present filter will be described, but description of portions common to the design of the optical filter in the first embodiment will be omitted. Table 3 is a design example of the first reflection layer 12a of the optical filter 30. Besides, the absorption layer 11 has characteristics illustrated in FIG. 10. In this design, the first reflection layer 12a blocks light of the transmission band near a wavelength of 713 nm which the absorption layer 11 cannot sufficiently block and the near-infrared light of wavelengths of 750 to 1150 run by the reflection bands of the first reflection layer 12a and the second reflection layer 12b.

TABLE 3

| Layer structure | Medium | Optical film thickness ($\lambda_0$) | $n_H d_H/n_L d_L$ |
|---|---|---|---|
| Upper surface | Transparent resin | | |
| 1 | Al$_2$O$_3$ | 0.162 | |
| 2 | TiO$_2$ | 0.396 | 8.5 |
| 3 | SiO$_2$ | 0.047 | |
| 4 | TiO$_2$ | 0.452 | 8.5 |
| 5 | SiO$_2$ | 0.053 | |
| 6 | TiO$_2$ | 0.448 | 7.3 |
| 7 | SiO$_2$ | 0.061 | |
| 8 | TiO$_2$ | 0.442 | 6.6 |
| 9 | SiO$_2$ | 0.067 | |
| 10 | TiO$_2$ | 0.436 | 6.1 |
| 11 | SiO$_2$ | 0.072 | |
| 12 | TiO$_2$ | 0.432 | 5.7 |
| 13 | SiO$_2$ | 0.075 | |
| 14 | TiO$_2$ | 0.429 | 5.5 |
| 15 | SiO$_2$ | 0.077 | |
| 16 | TiO$_2$ | 0.427 | 5.4 |
| 17 | SiO$_2$ | 0.079 | |
| 18 | TiO$_2$ | 0.427 | 5.4 |
| 19 | SiO$_2$ | 0.079 | |
| 20 | TiO$_2$ | 0.418 | 5.3 |
| 21 | SiO$_2$ | 0.079 | 5.4 |
| 22 | TiO$_2$ | 0.427 | |
| 23 | SiO$_2$ | 0.077 | 5.5 |
| 24 | TiO$_2$ | 0.429 | |
| 25 | SiO$_2$ | 0.075 | 5.7 |
| 26 | TiO$_2$ | 0.432 | |
| 27 | SiO$_2$ | 0.072 | 6.1 |
| 28 | TiO$_2$ | 0.436 | |
| 29 | SiO$_2$ | 0.067 | 6.6 |
| 30 | TiO$_2$ | 0.441 | |
| 31 | SiO$_2$ | 0.067 | 6.7 |
| 32 | TiO$_2$ | 0.448 | |
| 33 | SiO$_2$ | 0.053 | 8.5 |
| 34 | TiO$_2$ | 0.452 | |
| 35 | SiO$_2$ | 0.047 | 8.5 |
| 36 | TiO$_2$ | 0.396 | |
| 37 | Al$_2$O$_3$ | 0.162 | |
| Lower surface | Transparent substrate | | |

Specifications of the first reflection layer 12a in this example are decided in the order of (Design A) to (Design D). First of all, the optical film thickness ratio ($n_H d_H/n_L d_L$) of adjacent TiO$_2$/SiO$_2$ unit refractive index layers is set to 6.0 on the premise of a multilayer film configuration made by alternately stacking TiO$_2$ having $n_H$=2.39 and SiO$_2$ having $n_L$=1.45 in order to reduce the shift amount due to the incidence angle/polarization dependence (Design A). Then, the first reflection layer 12a is configured to have a 34-layer configuration in consideration of occurrence of a reflection band of a transmittance of 50% or less and securement of a reflection band width where the transmittance becomes 1% or less with respect to light of wavelengths of 700 to 830 nm at an incidence angle of 0°, and steepness of the transmittance change in a transition wavelength range (Design B). Note that the first reflection layer 12a has an average value of the optical film thicknesses $n_H d_H$ and $n_L d_L$ of adjacent dielectric films of about $\lambda_0/4$ with respect to a design wavelength $\lambda_0=746$ nm. Besides, the refractive indexes of the transparent substrate 13 and the absorption layer 11 are set to about 1.51.

Next, the first reflection layer 12a is configured to have a 35-layer configuration by shifting the sum $(n_H d_H + n_L d_L)$ of the optical film thicknesses of the unit refractive index layers composed of adjacent 17 pairs (34 layers) of TiO$_2$ and SiO$_2$ by about ±10% from $\lambda_0/2$ in order to reduce ripples of visible light (Design C). As a result, the adjacent 17 pairs of $n_H d_H / n_L d_L$ is distributed to be 5.3 to 8.5 (average value=6.5). Further, the first reflection layer 12a is configured to have a 37-layer configuration by adding Al$_2$O$_3$ to the interfaces between the dielectric multilayer film composed of 35 layers of TiO$_2$ and SiO$_2$ with the transparent substrate 13 and with the absorption layer 11 in order to improve the transmittance for visible light (Design D=Table 3). As a result, the average refractive index (optical film thickness/physical thickness of the whole dielectric multilayer film) of the first reflection layer (37 layers) is 2.17.

Figure 12:
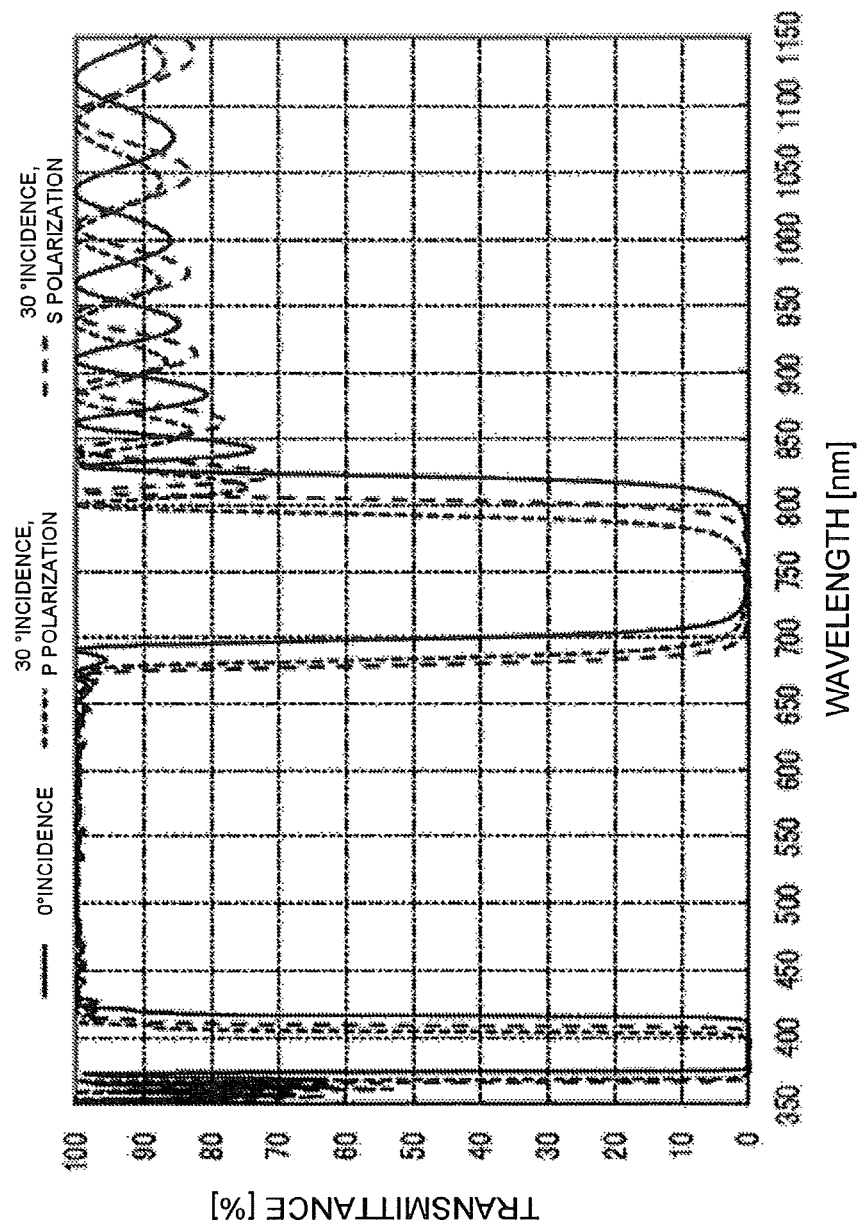
FIG. 12 is a graph illustrating calculation results of spectral transmittances of a first reflection layer of the optical filter in the second embodiment.
Figure 13:
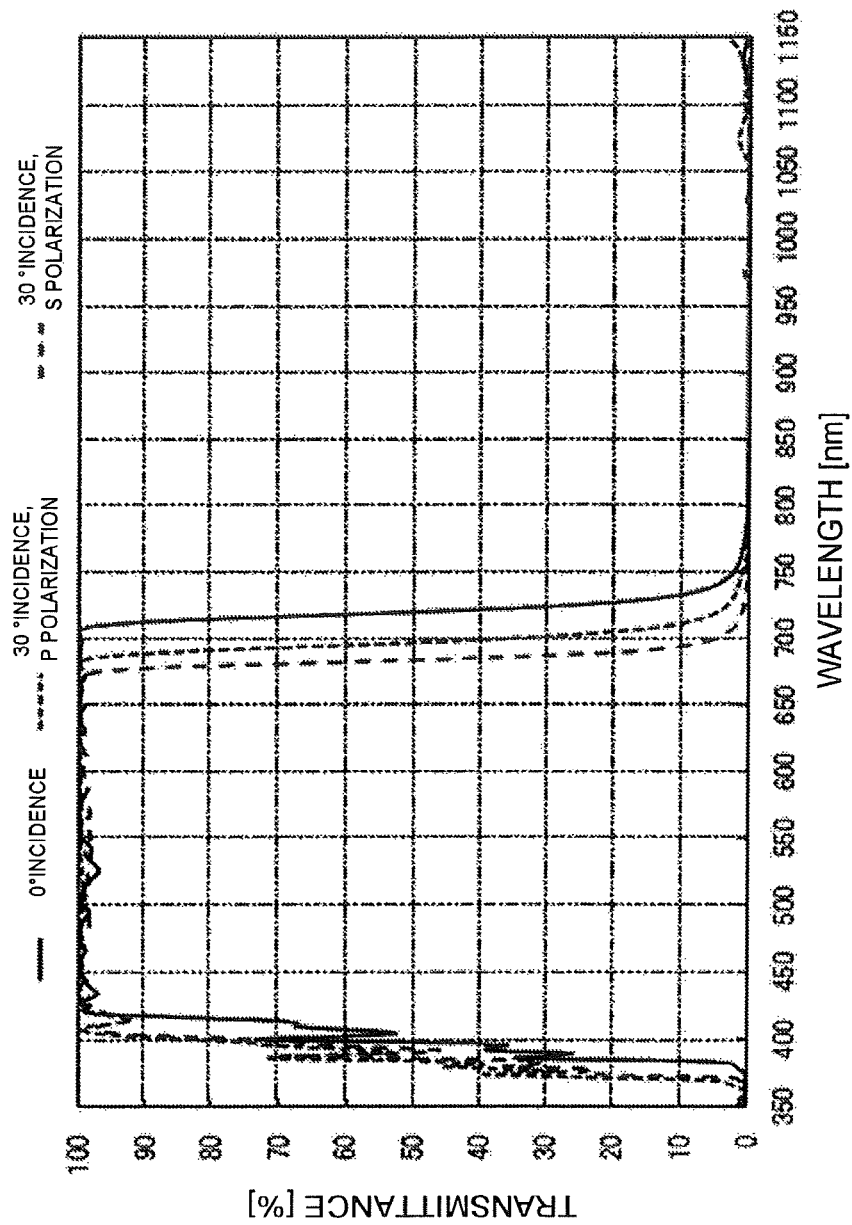
FIG. 13 is a graph illustrating calculation results of spectral transmittances of a second reflection layer of the optical filter in the second embodiment.
Figure 14:
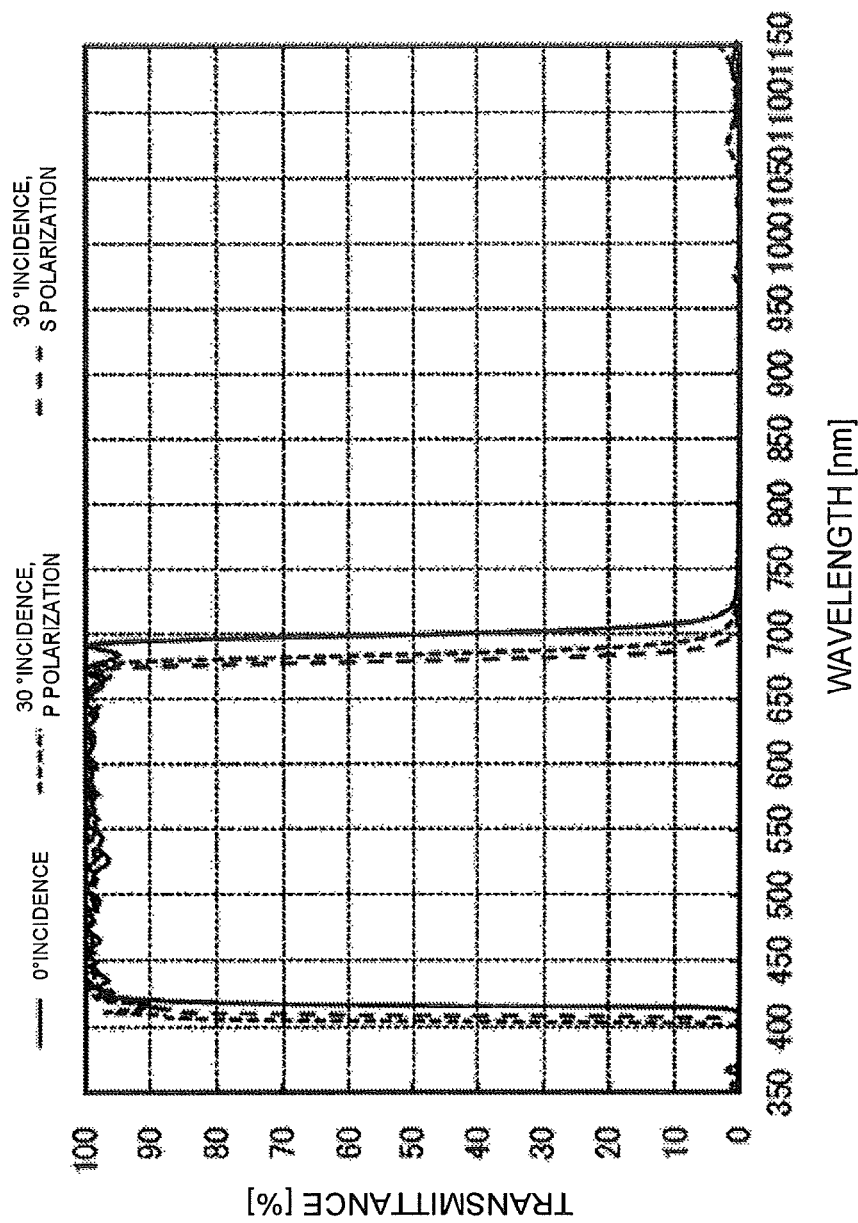
FIG. 14 is a graph (1) illustrating calculation results of spectral transmittances of the reflection layer of the optical filter in the second embodiment.
Figure 15:
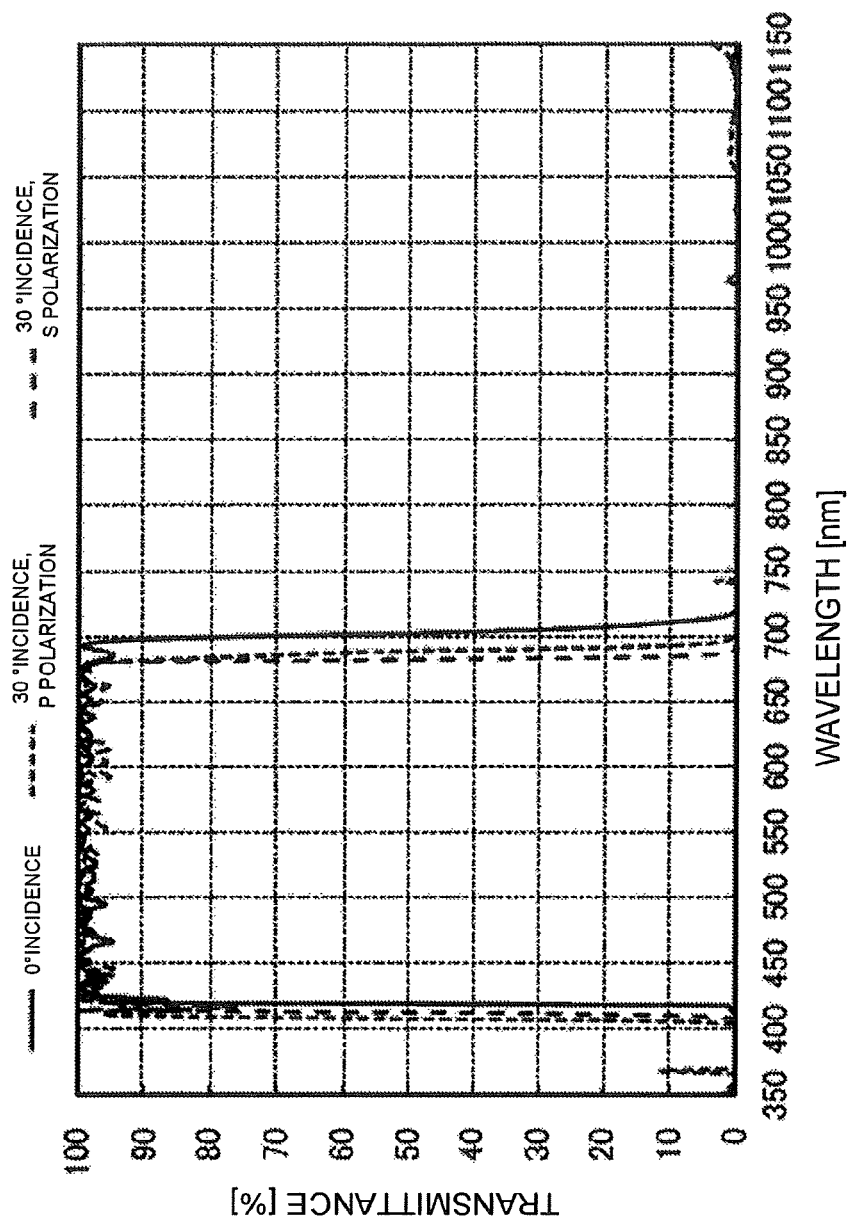
FIG. 15 is a graph (2) illustrating calculation results of spectral transmittances of the reflection layer of the optical filter in the second embodiment.

FIG. 12 illustrates calculation results of spectral transmittances of light at an incidence angle of 0° and p-/s-polarized light at an incidence angle of 30° in consideration of refractive index wavelength dispersion of TiO$_2$ and SiO$_2$ regarding the first reflection layer listed in Table 3. Note that the calculations and later-described calculations illustrated in FIG. 13 to FIG. 15 are performed without consideration of the reflection loss at an air interface, and the reflection loss of visible light can be reduced, for example, by the above-described anti-reflection layer. As illustrated in FIG. 12, the first reflection layer in this design example has a reflection band where the transmittances with respect to light at incidence angles of 0° to 30° become 50% or less for light of wavelengths of 699 to 822 nm, 15% or less for light of wavelengths of 705 to 815 nm, 10% or less for light of wavelengths of 708 to 812 nm, 5% or less for light of wavelengths of 711 to 808 nm, and 1% or less for light of wavelengths of 723 to 795 nm. Further, the first reflection layer exhibits an average transmittance of 99% or more for light of wavelengths of 420 to 670 nm. Note that the first reflection layer (Table 3) has a minimum transmittance of the near-infrared reflection band of about 0.2% but can be decreased by increasing the number of layers.

The first reflection layer in this design example has a $\lambda_R(0°\_T50\%)$ of 699 nm with respect to light at an incidence angle of 0° in wavelengths of 680 to 750 nm, a $\lambda_R(30°\_Ts50\%)$ of 679 nm with respect to s-polarized light at an incidence angle of 30° in wavelengths of 640 to 750 nm, and a shift amount of about 20 nm.

Table 4 is a design example of the second reflection layer 12b of the optical filter 30, and specifications are decided in the order of (Design A') to (Design C'). First of all, the second reflection layer 12b is configured to have a 33-layer configuration so that the optical film thicknesses $n_H d_H$ and $n_L d_L$ are about $\lambda_0/4$ by alternately stacking TiO$_2$ and SiO$_2$ with respect to a design wavelength $\lambda_0=948$ nm to cause a reflection band in wavelengths of 750 to 1150 nm (Design A').

Next, the second reflection layer 12b is configured to have optical film thicknesses of 33 layers of TiO$_2$ and SiO$_2$ shifted by about ±18% from $\lambda_0/4$ to expand the reflection band and reduce ripples of visible light (Design B'). Further, to obtain the effect of reducing ripples of the visible light in wavelengths of 400 to 700 nm and the antireflection effect, the second reflection layer 12b is configured to have 36 layers in total by adding, at an optical film thickness smaller than $\lambda_0/4$, SiO$_2$ to the interface between air and the 33 layers and adding two layers of SiO$_2$ and TiO$_2$ to the interface between the transparent substrate and the 33 layers (Design C'=Table 4).

TABLE 4

| Layer structure | Medium | Optical film thickness ($\lambda_0$) |
|---|---|---|
| Upper surface | Air | |
| 1 | SiO$_2$ | 0.148 |
| 2 | TiO$_2$ | 0.286 |
| 3 | SiO$_2$ | 0.296 |
| 4 | TiO$_2$ | 0.285 |
| 5 | SiO$_2$ | 0.294 |
| 6 | TiO$_2$ | 0.278 |
| 7 | SiO$_2$ | 0.276 |
| 8 | TiO$_2$ | 0.261 |
| 9 | SiO$_2$ | 0.275 |
| 10 | TiO$_2$ | 0.274 |
| 11 | SiO$_2$ | 0.284 |
| 12 | TiO$_2$ | 0.264 |
| 13 | SiO$_2$ | 0.269 |
| 14 | TiO$_2$ | 0.267 |
| 15 | SiO$_2$ | 0.281 |
| 16 | TiO$_2$ | 0.258 |
| 17 | SiO$_2$ | 0.249 |
| 18 | TiO$_2$ | 0.229 |
| 19 | TiO$_2$ | 0.233 |
| 20 | SiO$_2$ | 0.217 |
| 21 | TiO$_2$ | 0.227 |
| 22 | SiO$_2$ | 0.215 |
| 23 | TiO$_2$ | 0.225 |
| 24 | SiO$_2$ | 0.213 |
| 25 | TiO$_2$ | 0.225 |
| 26 | SiO$_2$ | 0.214 |
| 27 | TiO$_2$ | 0.224 |
| 28 | SiO$_2$ | 0.216 |
| 29 | TiO$_2$ | 0.226 |
| 30 | SiO$_2$ | 0.218 |
| 31 | TiO$_2$ | 0.230 |
| 32 | SiO$_2$ | 0.226 |
| 33 | TiO$_2$ | 0.249 |
| 34 | SiO$_2$ | 0.266 |
| 35 | TiO$_2$ | 0.059 |
| 36 | SiO$_2$ | 0.024 |
| Lower surface | Transparent substrate | |

FIG. 13 illustrates calculation results of spectral transmittances of light at an incidence angle of 0° and p-/s-polarized light at an incidence angle of 30° in consideration of refractive index wavelength dispersion of TiO$_2$ and SiO$_2$ regarding the second reflection layer (Table 4). The second reflection layer in this design example has a reflection band where the transmittances at incidence angles of 0° to 30° become 50% or less for light of wavelengths of 720 to 1299 nm, 15% or less for light of wavelengths of 730 to 1235 nm, 10% or less for light of wavelengths of 733 to 1230 nm, 5% or less for light of wavelengths of 740 to 1223 nm, and 1% or less for light of wavelengths of 760 to 1150 nm. The second reflection layer further has a transmittance of 99% or more with respect to wavelengths of 420 to 670 nm. The second reflection layer (Table 4) has a minimum transmittance of the near-infrared reflection band of about 0.001% but can be further decreased by increasing the number of layers.

Further, the second reflection layer in this design example has a $\lambda_R(0°\_T50\%)$ of 720 nm with respect to light at an incidence angle of 0° in wavelengths of 680 to 750 nm, a $\lambda_R(30°\_Ts50\%)$ of 684 nm with respect to s-polarized light at an incidence angle of 30° in wavelengths of 640 to 750 nm further in wavelengths of 680 to 750 nm, and a shift amount of about 36 nm.

Next, the calculation results of spectral transmittances of the reflection layer including the first and second reflection layers will be described. As in the first embodiment, specifications of the first and second reflection layers of the present filter are decided in consideration of the coherence length of incident light and film stress due to the arrangement of them in the present filter.

FIG. 14 illustrates calculation results of spectral transmittance curves (at an incidence angle of 0° and p-/s-polarized light at an incidence angle of 30°) of the reflection layer including the first and second reflection layers arranged to hold the transparent substrate sandwiched between them. The reflection layer in this design has a reflection band where the transmittances at incidence angles of 0° to 30° become 50% or less for light of wavelengths of 350 to 403 nm and wavelengths of 699 to 1230 nm, 15% or less for light of wavelengths of 350 to 402 nm and wavelengths of 706 to 1166 nm, 10% or less for light of wavelengths of 350 to 402 nm and wavelengths of 708 to 1162 nm, 5% or less for light of wavelengths of 350 to 401 nm and wavelengths of 711 to 1154 nm, and 1% or less for light of wavelengths of 723 to 1064 nm. The reflection layer further exhibits an average transmittance of 98% or more with respect to light of wavelengths of 420 to 670 nm, and an average transmittance of 0.5% or less with respect to light of wavelengths of 730 to 1150 nm.

Here, $\lambda_R(0°\_T50\%)$ and $\lambda_R(30°\_Ts50\%)$ at which the transmittance becomes 50% on the shorter wavelength side of the near-infrared reflection band in the reflection layer in this design example are decided by the spectral transmittances of the first reflection layer as illustrated in FIG. 14 More specifically, the reflection layer has shift amounts of the transmittance of 50% at incidence angles 0° and 30° of about 20 nm. On the other hand, $\lambda_R(0°\_T50\%)$ to $\lambda_R(30°\_Ts50\%)$ at which the transmittance becomes 50% with respect to the incidence angles of 0° and 30° of the second reflection layer are in the reflection band of the first reflection layer, and therefore rarely affect the spectral transmittance curves of the reflection layer.

For example, in the case where the reflection layer illustrated in FIG. 14 is combined with the absorption layers illustrated in FIG. 10, $\lambda Sh(DAB\_T10\%)+20$ nm$<\lambda_R(0°\_T50\%)<\lambda_C(T_{max})$ (where $\lambda_C(T_{max})$ is the wavelength at which the transmittance of the absorption layer becomes maximum in the wavelengths $\lambda(DA\_T_{min})$ to $\lambda(DB\_T_{min})$) is satisfied where the wavelength at which the transmittance of the reflection layer with respect to light at an incidence angle of 0° in wavelengths of 680 to 750 nm becomes 50% is $\lambda_R(0°\_T50\%)$ and the wavelength at which the transmittance of the absorption layer in wavelengths of 580 nm to $\lambda(DA\_T_{min})$ becomes 10% is $\lambda Sh(DAB\_T10\%)$. Further, a difference $\delta\lambda_R Sh(T50\%)$ between the wavelength $\lambda_R(0°\_T50\%)$ and the wavelength $\lambda_R(30°\_Ts50\%)$ satisfies 0 nm$<\delta\lambda_R Sh(T50\%)\leq25$ nm where the wavelength at which the transmittance with respect to s-polarized light at an incidence angle of 30° in wavelengths of 640 to 750 nm is $4(30°\_Ts50\%)$.

FIG. 15 illustrates calculation results of spectral transmittance curves (at an incidence angle of 0° and p-/s-polarized light at an incidence angle of 30°) of the reflection layer composed of a dielectric multilayer film made by sequentially stacking 73 layers of the first and second reflection layers on one principal surface of the transparent substrate. The reflection layer in this design used, as basic designs, a 34-layer configuration in which the average optical film thickness of unit refractive index layers each composed of $TiO_2$ and $SiO_2$ of adjacent 17 pairs (34 layers) in the first reflection layer becomes about $\lambda_0/4$ at $\lambda_0=753$ nm, and a 33-layer configuration composed of $TiO_2$ and $SiO_2$ in the second reflection layer in which an optical film thickness becomes about $\lambda_0/4$ at $\lambda_0=948$ nm. In this design, the optical film thickness distribution is adjusted and an adjusting layer is further added to improve the transmittance for visible light and reduce ripples.

The reflection layer in this design has a reflection band where the transmittances with respect to light at incidence angles of 0° to 30° become 50% or less for light of wavelengths of 350 to 410 and wavelengths of 709 to 1238 nm, 15% or less for light of wavelengths of 350 to 409 nm and wavelengths of 716 to 1182 nm, 10% or less for light of wavelengths of 350 to 409 nm and wavelengths of 717 to 1172 nm, 5% or less for light of wavelengths of 350 to 408 nm and wavelengths of 720 to 1162 nm, and 1% or less for light of wavelengths of 724 to 1068 nm. The reflection layer further exhibits an average transmittance of 98% or more for light of wavelengths of 420 to 670 nm, and an average transmittance of 0.3% or less for light of wavelengths of 730 to 1150 nm.

The reflection layer in this design example has a $\lambda_R(0°\_T50\%)$ of 702 nm with respect to light at an incidence angle of 0° in wavelengths of 680 to 750 nm, a $\lambda_R(30°\_Ts50\%)$ of 682 nm with respect to s-polarized light at an incidence angle of 30°, and a shift amount of about 20 nm.

For example, in the case where the reflection layer illustrated in FIG. 15 is combined with the absorption layers illustrated in FIG. 11, $\lambda Sh(DAB\_T10\%)+20$ nm$<\lambda_R(0°\_T50\%)<\lambda_C(T_{max})$ is satisfied. Further, a difference $\Delta\lambda_R Sh(T50\%)$ between the wavelength $\lambda_R(0°\_T50\%)$ and the wavelength $\lambda_R(30°\_Ts50\%)$ satisfies 0 nm$<\Delta\lambda_R Sh(T50\%)\leq25$ nm.

The optical filter in the second embodiment including the reflection layer and the absorption layer preferably has following characteristics the same as those of the optical filter in the first embodiment. Not that a more preferable embodiment in the following characteristics is the same as that in the case of the optical filter in the first embodiment. In the spectral transmittance curves at incidence angles of 0° to 30°, the following conditions (1) and (2) are satisfied.
(1) The average transmittance in wavelengths of 440 to 600 nm is 80% or more.
(2) The transmittance in the whole range of wavelengths of 690 to 720 nm is 5% or less. The average transmittance with respect to light of wavelengths of 350 to 390 nm in the spectral transmittance curve at an incidence angle of 0° is 10% or less. The difference between the transmittance with respect to light at an incidence angle of 0° and the transmittance with respect to light at an incidence angle of 30° of a wavelength at which the transmittance becomes 50% in the spectral transmittance curves of wavelengths of 600 to 900 nm is 30% or less.

Each of the optical filters in the first and second embodiments including the reflection layer and the absorption layer can keep high transmittance for light of wavelengths of 440 to 600 nm where the visibility is high, and block light of wavelengths of 690 to 720 nm by the absorption layer. Further, the optical filter of the present invention can improve the light blocking property against light of wavelengths of 700 to 1150 nm where the solid-state image sensing device has sensitivity and suppress the incidence angle/polarization dependence of the reflection layer.

The optical filter according to the present invention may use an absorbent having $\lambda(DB\_T_{min})$ on a side of a wavelength longer than the maximum absorption wavelength of the absorbent DB used in the optical filters in the first and second embodiments, for example, wavelengths of 745 to 1000 nm to less absorb visible light. The absorbent is used on the premise of being able to adjust the effective thickness ratio CL so that at least the transmittance for light of wavelengths of 450 to 550 nm becomes 90% or more when absorption of visible light remains. Examples of the NIR absorbent having maximum absorption in wavelengths of 800 to 920 nm include 04, 79 and the like in IRD series manufactured by KODAK Company, 5547, 5588 and the like in Epolight™ series manufactured by Epolin, Inc., 907B, 910C and the like in NIR series manufactured by QCR Solutions Corp., SDA8630 and the like manufactured by H.W. Sands Corp., NP800, IRA868 manufactured by Exciton, Inc. (all of the above are product names).

Third Embodiment

An optical filter in this embodiment uses absorption-type glass as a part of an absorption layer. An example of the configuration of the absorption layer of the present filter includes absorption-type glass made by adding CuO or the like to fluorophosphate-based glass, phosphate-based glass or the like, and a layer in which an absorbent DA is dissolved or dispersed in a transparent resin (B) (referred to also as a "resin layer" in this embodiment). In this case, the absorption-type glass is on the premise of containing an absorbent DB exhibiting $\lambda(DB\_T_{min})$. Further, the optical filter in the third embodiment is referred to also as "present filter" in explanation of the third embodiment.

The absorption-type glass can be adjusted in transmittance for light of wavelengths of 700 to 1150 nm by adjusting the addition concentration of CuO or the like and the thickness. Further, the present filter using the absorption-type glass containing the absorbent DB can mitigate the high reflectance specification for near-infrared light required of the reflection layer, and therefore can achieve the equivalent light blocking property by a smaller number of dielectric layers and improve the light blocking property through use of the dielectric multilayer film having the same configuration.

Note that the present filter may have a dielectric layer between the absorption-type glass and the resin layer, in which case the durability of the absorption layer in the present filter can be improved. The thickness of the dielectric layer is preferably 30 nm or more, more preferably 100 nm or more, and furthermore preferably 200 nm or more. Though there is no upper limit, the thickness of the dielectric layer is preferably 2000 nm or less and more preferably 1000 nm or less from the viewpoint of easiness of design and manufacture.

Here, as the glass containing CuO, for example, the one described in WO 2014/30628A1 can be used.

Since the present filter uses the absorption-type glass on the premise of containing the absorbent DB, $\lambda(DB\_T_{min})$ by the absorption-type glass exists in wavelengths of 800 to 900 nm and the absorption-type glass has an absorption wavelength band width near $\lambda(DB\_T_{min})$ wider than that of the NIR absorbent. Therefore, the absorption layer made by combining the absorption-type glass and the transparent resin containing the absorbent DA is likely to cause a transmission band where the transmittance becomes 2% or more in a wide range near $\lambda_C(T_{max})$. Therefore, it is preferable that the present filter eliminates the transmission band using a reflection layer with less incidence angle/polarization dependence as with the optical filter in the second embodiment. More specifically, in the present filter using the absorption-type glass, the reflection layer is designed so that the shift amount is in the absorption band of the absorbent DA even if the wavelength at which the transmittance of the reflection layer becomes 50% shifts with respect to light at incidence angles of 0° to 30° in wavelengths of 650 to 750 nm.

As described above, the third embodiment corresponds to the optical filter using the absorption-type glass containing the absorbent DB having a $\lambda(DB\_T_{min})=800$ to 900 nm in the second embodiment. More specifically, the present filter means that the maximum absorption wavelength $\lambda(DB\_T_{min})$ of the absorbent DB is a wavelength of more than 725 nm and 900 nm or less, and satisfies 40 nm$\leq\lambda(DB\_T_{min})-\lambda(DA\_T_{min})<215$ nm.

Note that the configuration defined in the second embodiment (however, the configuration that the transmittance for light of a wavelength $\lambda(DB\_T_{min})$ is 3% or less in the condition of (i-5) is not essential, but a preferable configuration is employed) and preferable conditions may be employed other than the absorption-type glass (absorbent DB), such as the transparent resin (B), the absorbent DA, the reflection layer, and the anti-reflection layer.

First to Third Embodiments and Imaging Device

The optical filter in each of the embodiments can correct the sensitivity approximate to the visibility curve by the absorption layer containing the absorbents DA and DB with respect to light of wavelengths of 600 to 690 nm of visible light as described above. Each of the optical filters can also keep the spectral transmittance curves in wavelengths of 600 to 690 nm of the absorption layer even if the reflection band shifts due to the incidence angle/polarization dependence of the reflection layer. Therefore, each of the optical filters can sufficiently block near-infrared light with the spectral transmittances for the near-infrared light rarely affected by the incidence angle/polarization dependence.

When the absorption layer further contains the absorbent DU, the present filter can keep the spectral transmittance curves as the optical filter even if the spectral transmittance curves of the reflection layer with respect to near-ultraviolet light shift due to the incidence angle/polarization dependence. Further, the present filter can realize a sufficiently low transmittance by the reflection layer even when the light blocking property of the absorption layer with respect to the near-ultraviolet light is insufficient. Further, in the specifications of the optical filter that the incidence angle further expands (more than) 30°, it is preferable to adjust the absorption layer in consideration of the shift amount of the reflection layer accompanying the expansion so as to suppress the incidence angle/polarization dependence.

Figure 16:
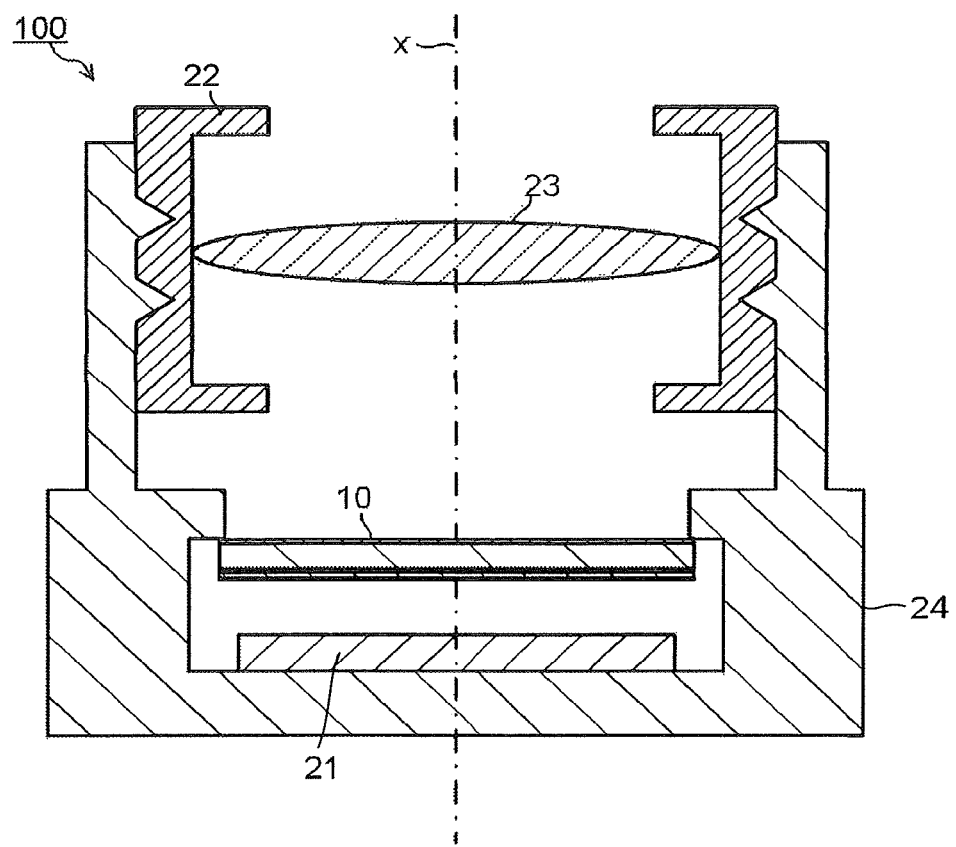
FIG. 16 is a sectional view schematically illustrating one example of an imaging device of the present invention.

FIG. 16 is a schematic view of an imaging device 100 having an optical filter 10 installed as the optical filter. Note that the following description also applies to the case of using an optical filter having another configuration in the imaging device 100. In the imaging device 100, the reflected light by the reflection layer in the optical filter 10 becomes stray light that is incident again on the optical filter 10 by repeated reflection or scattering in the imaging device such as a solid-state image sensing device 21, an imaging lens 23, and a housing 24 that fixes them. Accordingly, with high light blocking property against light of wavelengths of 700 to 1150 nm, more stray light reaching a light-receiving surface of the solid-state image sensing device 21 can be reduced. As a result, a sharp image with less superposition of unrequired image reaching the solid-state image sensing device 21 and less noise light can be imaged.

Further, the optical filter 10 in each of the embodiments is arranged, for example, between the imaging lens 23 and the solid-state image sensing device 21 in the imaging device 100. Further, the optical filter 10 can be used also while directly bonded via an adhesive layer to the solid-state image sensing device 21, the imaging lens 23 or the like. The imaging lens 23 is fixed by a lens unit 22 provided inside the housing 24, and the solid-state image sensing device 21 and the imaging lens 23 are arranged along an optical axis X. The orientation and position when the optical filter 10 is installed are appropriately selected according to the design.

EXAMPLES

Example 1

A manufacturing example of the optical filter 30 will be described in this example. First of all, the first reflection layer 12a listed in Table 1 and the second reflection layer 12b listed in Table 2 are formed on one principal surface and the other principal surface of the transparent substrate 13 composed of a transparent resin film of 100 μm thick having a refractive index of 1.52, respectively. Next, the absorption layer 11 in which a squarylium-based compound having a $\lambda(DA\_T_{min})$=685 nm as the absorbent DA and a squarylium-based compound having a $\lambda(DB\_T_{min})$=705 nm as the absorbent DB are contained in the transparent resin, is formed on the surface of the first reflection layer 12a. Specifically, the absorption layer 11 is obtained by applying by the die coating method a coating solution made by mixing the absorbents DA and DB and a cyclohexanone solution of an acrylic resin having a refractive index of 1.49 at a predetermined mass ratio and then stirring and dissolving them at room temperature, and then drying the solution by heating. Here, the absorbents DA and DB are adjusted so that the effective thickness ratios (CL(A), CL(B)) are (1.2, 1.2), (1.2, 1.8), (1.4, 1.2) or (1.4, 1.8). FIG. 3 illustrates the calculation results of spectral transmittances only of the absorption layers with respect to light of wavelengths of 550 to 800 nm.

Figure 17A:
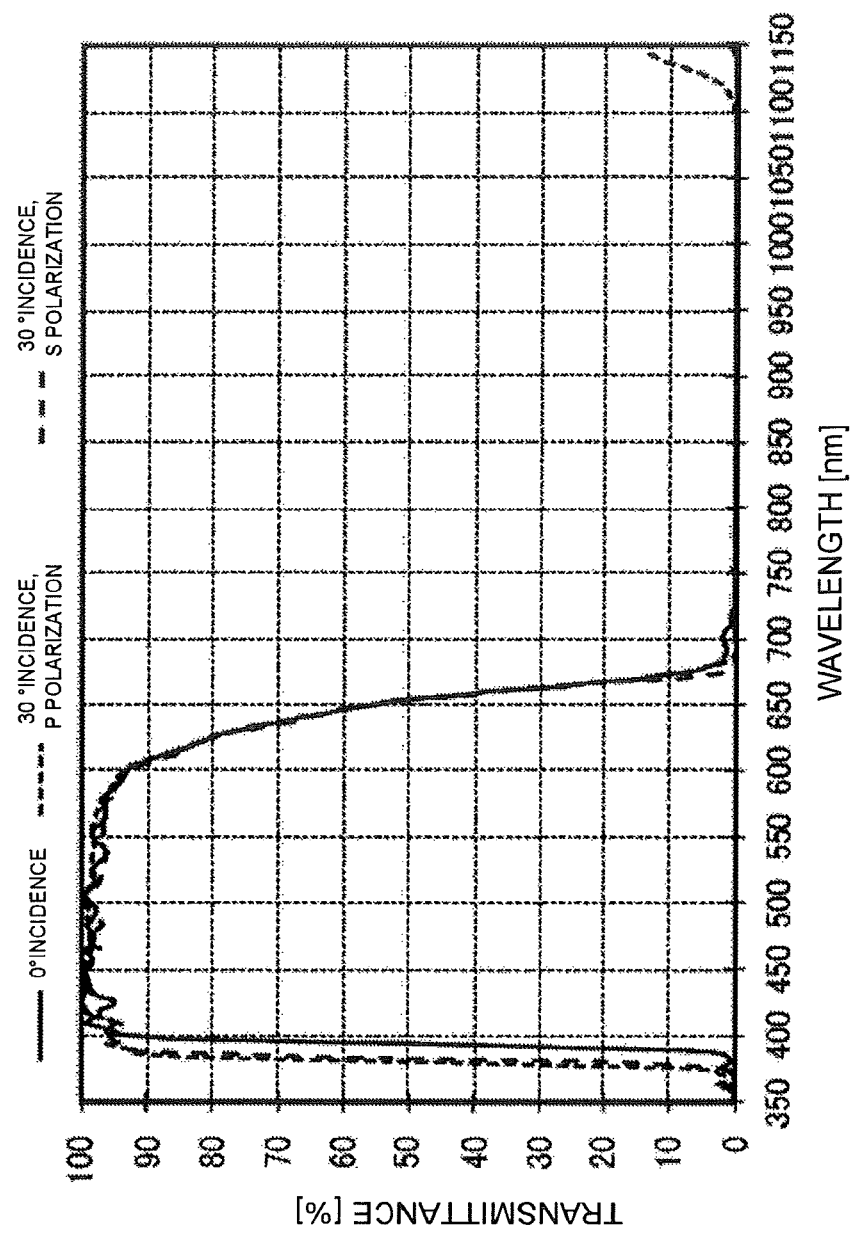
FIG. 17A is a graph illustrating calculation results of spectral transmittances of an optical filter 30(a) in Example 1.
Figure 17B:
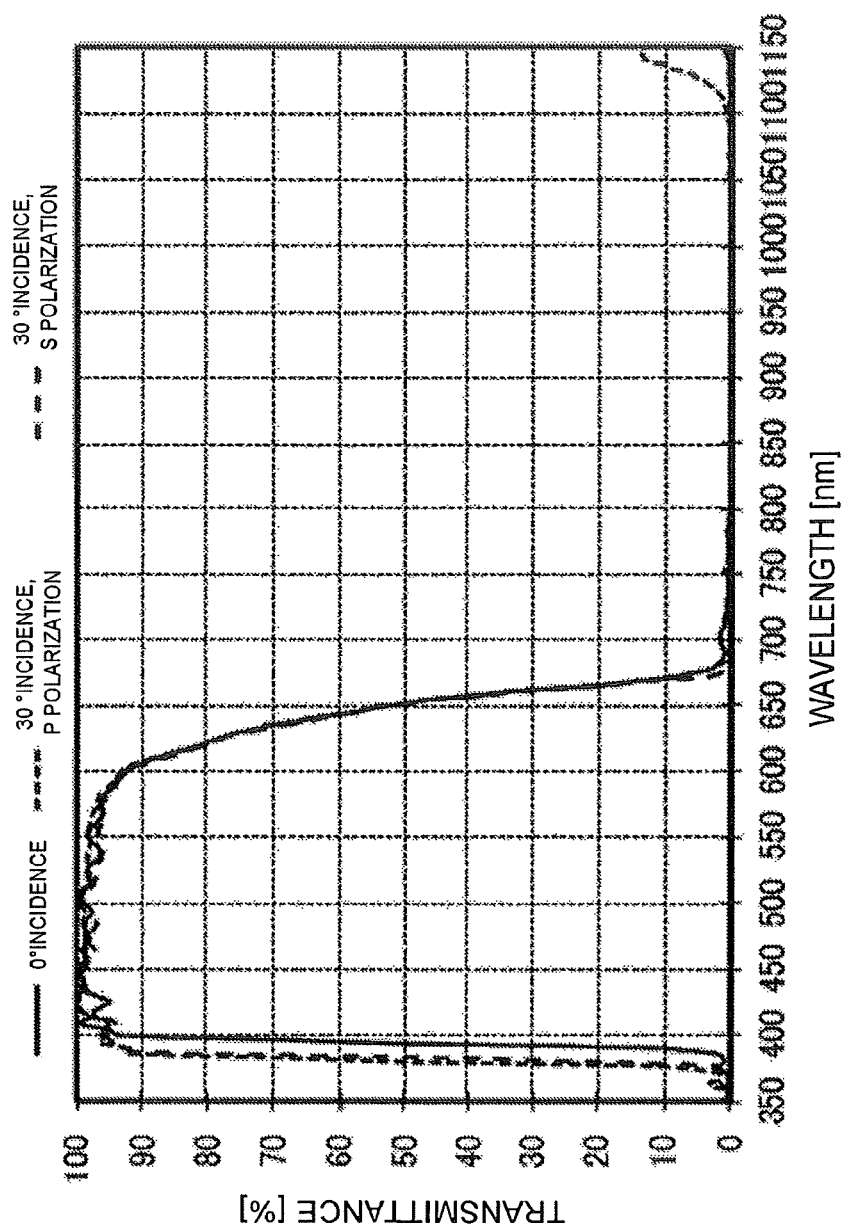
FIG. 17B is a graph illustrating calculation results of spectral transmittances of an optical filter 30(d) in Example 1.

Further, the anti-reflection layer 14 composed of three layers of $Al_2O_3$, $ZrO_2$ and $MgF_2$ is formed on the air interface of the absorption layer 11 to obtain four kinds of optical filters 30(a) to (d) having a residual reflectivity with respect to visible light of wavelengths of 400 to 700 nm at incidence angles of 0° to 30° set to 1.5% or less. FIGS. 17A and 17B illustrate calculation results of spectral transmittance curves (at an incidence angle of 0° and p-/s-polarized light at an incidence angle of 30°) of the optical filters 30(a) and 30(d). Also for the optical filters 30(b) and 30(c), the same calculation results can be obtained. Note that this example and examples and comparative examples in the following are made to have a transmittance of 100% assuming that the squarylium-based compound used in the absorbent DA and the absorbent DB has little or no absorption at a wavelength of 550 nm or less.

The absorption layers whose optical characteristics are illustrated in FIG. 3 in the optical filter 30 in this example satisfy the conditions of (i-1) to (i-3) as described above, and the reflection layer combined with the absorption layers also satisfies the conditions of (ii-1) and (ii-2) as described above.

From the spectral transmittance curves illustrated in FIGS. 17A and 17B, each of the optical filters 30(a) to (d) in Example 1 satisfies the following optical characteristics. More specifically, each of the optical filters exhibits spectral transmittances, with respect to light at incidence angles of 0° to 30°, having an average transmittance for light of wavelengths of 420 to 600 nm where the visibility is high of 97% or more and a transmittance for light of wavelengths of 690 to 720 nm of 2% or less, and approximately correcting the spectral transmittance curves of wavelengths of 600 to 690 nm to a curve capable of realizing high efficiency corresponding to the visibility curve. Further, the average transmittance for unrequired light of wavelengths of 700 to 1150 nm being noise light is 0.8% or less, showing that the change in spectral transmittance with respect to light at incidence angles of 0° to 30° is small. Further, in wavelengths of 654 to 900 nm where the transmittance is 50% or less in wavelengths of 600 to 900 nm, the transmittance difference between the incidence angles of 0° and 30° is 0 to 7%, and the transmittance change satisfies 30% or less.

Comparative Example 1

An optical filter in this Comparative example 1 is made to have the same configuration as that in Example 1 except that the absorption layer contains only the absorbent DA composed of a squarylium-based compound having a $\lambda(DA\_T_{min})$=695 nm and the effective thickness ratio CL(A) is adjusted to be (2.5).

Figure 18:
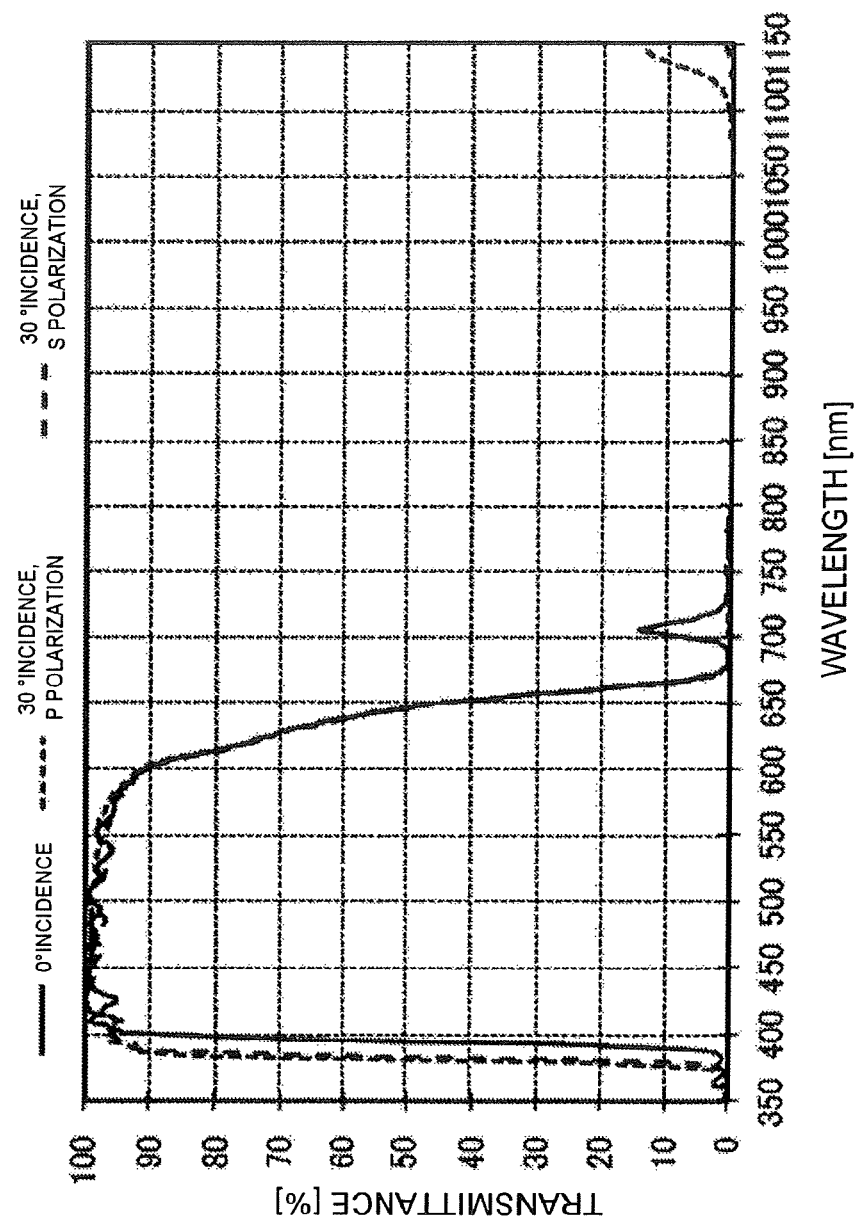
FIG. 18 is a graph illustrating calculation results of spectral transmittances of an optical filter in Comparative example 1.

FIG. 18 illustrates calculation results of spectral transmittance curves (at an incidence angle of 0° and p-/s-polarized light at an incidence angle of 30°) of the optical filter in Comparative example 1. The optical filter in Comparative example 1 exhibits a transmittance for light of wavelengths of 698 to 716 nm at an incidence angle of 30° of 0.5% or less, while exhibiting a transmittance of 4% or more and 15% at maximum at an incidence angle of 0°. In other words, in Comparative example 1, the NIR absorbent contained in the absorption layer has a narrow absorption wavelength band width. AX abs only with one kind of absorbent DA, and is therefore insufficient in light blocking property against light of wavelengths of 690 to 720 nm due to the incidence angle/polarization dependence of the reflection layer.

Comparative Example 2

An optical filter in this Comparative example 2 is made to have the same configuration as that in Example 1 except that the absorption layer contains only the absorbent DB composed of a squarylium-based compound having a $\lambda(DB\_T_{min})$=725 nm and the effective thickness ratio CL(B) is adjusted to be (5.2).

Figure 19:
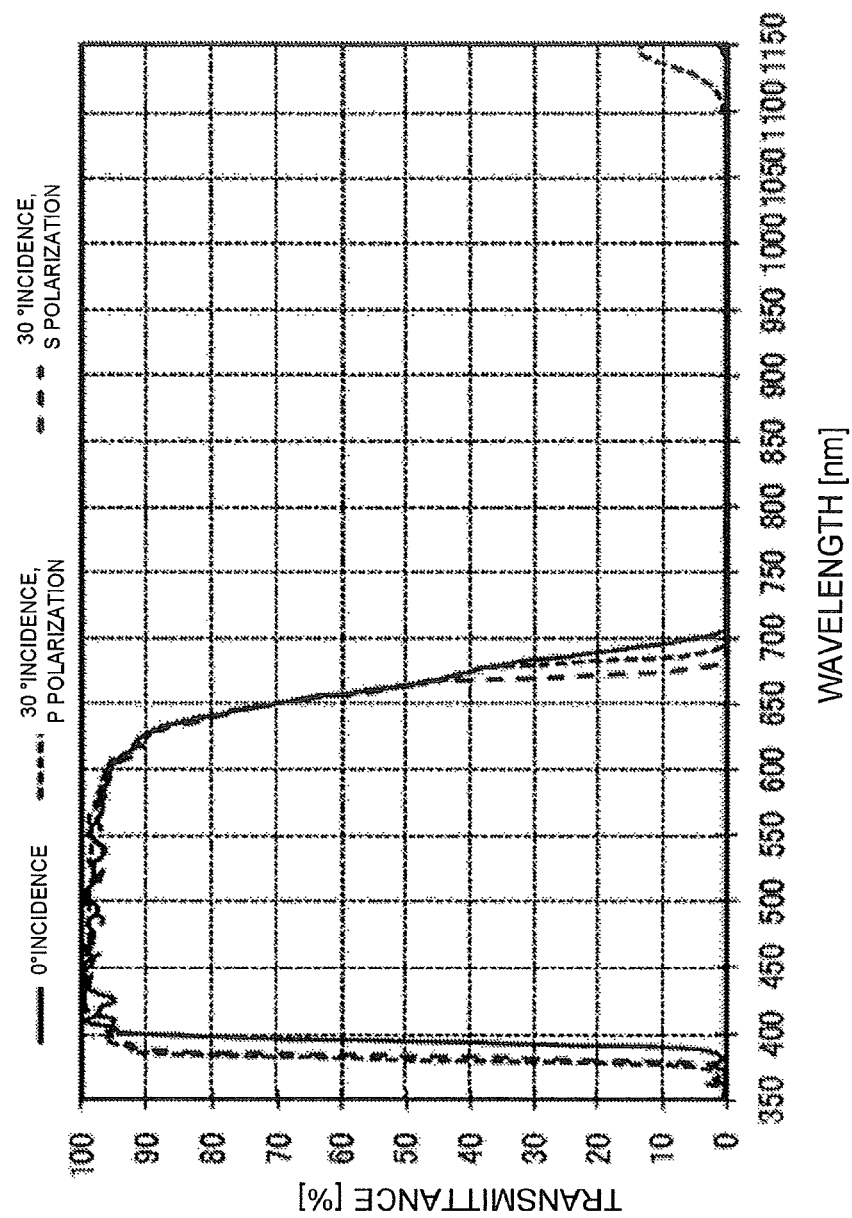
FIG. 19 is a graph illustrating calculation results of spectral transmittances of an optical filter in Comparative example 2.

FIG. 19 illustrates calculation results of spectral transmittance curves (at an incidence angle of 0° and p-/s-polarized light at an incidence angle of 30°) of the optical filter in Comparative example 2. The optical filter in Comparative example 2 is different by about 4 to 33% in spectral transmittance in wavelengths of 668 to 700 nm with respect to lights at incidence angles of 0° and 30°. In other words, the steep absorbency cannot be obtained for light of wavelengths of 668 to 700 nm only by the absorbent DB and residual transmission occurs, and therefore the light blocking property against light of the wavelength is insufficient due to the incidence angle/polarization dependence of the reflection layer. Further, in wavelengths of 664 to 900 nm where the transmittance is 50% or less in wavelengths of 600 to 900 nm, the transmittance difference between the incidence angles 0° and 30° is 0 to 34%.

Example 2

A manufacturing example of the optical filter 40 will be described in this example. First of all, the first reflection layer 12a listed in Table 1 and the second reflection layer 12b listed in Table 2 are formed in the order illustrated in FIG. 1D on one principal surface of the transparent substrate 13 composed of glass of 200 μm thick. Next, the absorption layer 11 in which a squarylium-based compound having a $\lambda(DA\_T_{min})$=705 nm as the absorbent DA and a squarylium-based compound having a $\lambda(DB\_T_{min})$=725 nm as the absorbent DB are contained in the transparent resin, is formed on the other surface of the transparent substrate 13. Specifically, the absorption layer of 10 μm thick is obtained by applying by the die coating method a coating solution made by mixing the absorbents DA and DB and a cyclopentanone solution of a polycarbonate resin having a refractive index of 1.59 at a predetermined mass ratio and then stirring and dissolving them at room temperature, and then drying the solution by heating. Here, the absorbents DA and DB are adjusted so that the effective thickness ratios (CL(A), CL(B)) are (2.0, 4.0), (2.0, 5.2), (2.4, 4.0) or (2.4, 5.2). Note that as the calculation results of spectral transmittances of only the absorption layer with respect to light of wavelengths of 550 to 800 nm, those in FIG. 4 can be referred to.

Figure 20A:
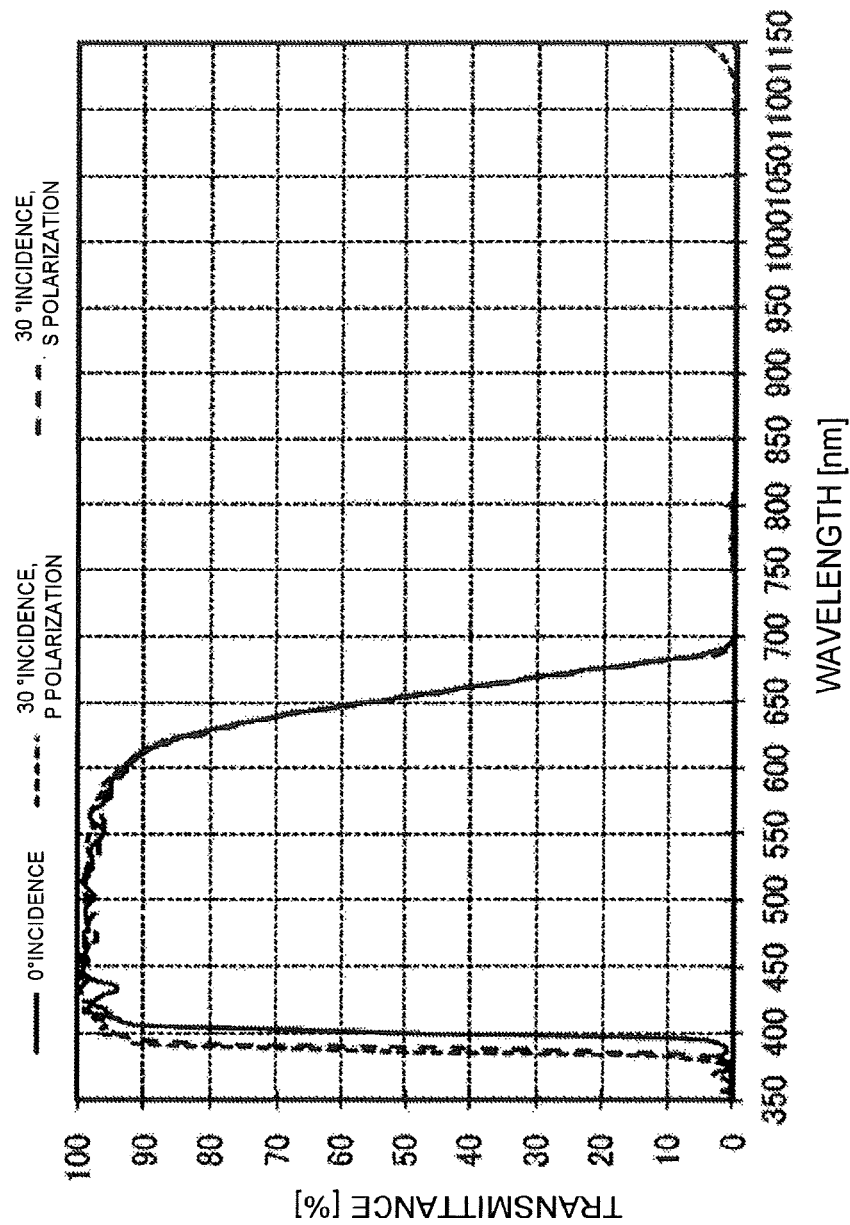
FIG. 20A is a graph illustrating calculation results of spectral transmittances of an optical filter 40(a) in Example 2.
Figure 20B:
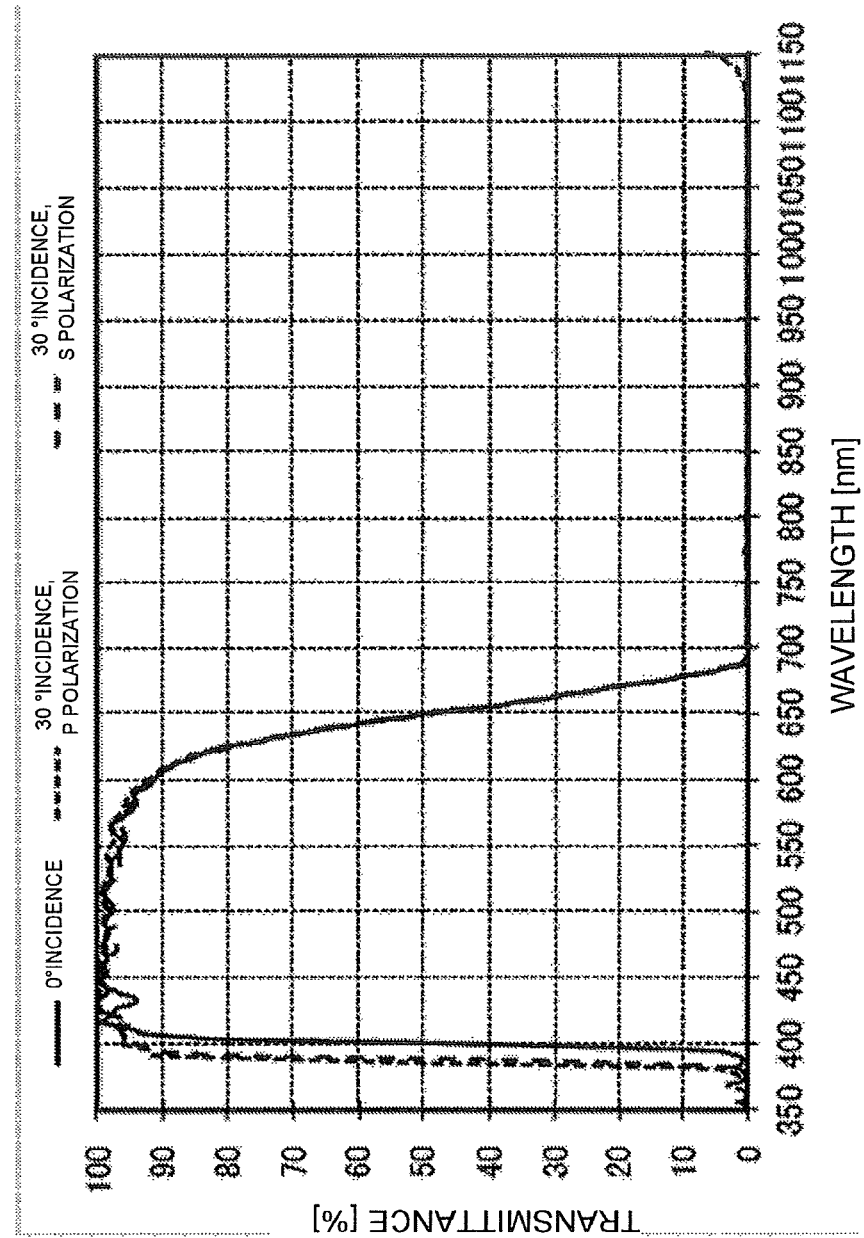
FIG. 20B is a graph illustrating calculation results of spectral transmittances of an optical filter 40(d) in Example 2.

Further, the anti-reflection layer 14 composed of four layers of $TiO_2$ and $SiO_2$ is formed on the air interface of the absorption layer 11 to obtain four kinds of optical filters 40(a) to (d) having a residual reflectivity with respect to light of wavelengths of 400 to 700 nm at incidence angles of 0° to 30° set to 1.5% or less. FIGS. 20A and 20B illustrate calculation results of spectral transmittance curves (at an incidence angle of 0° and p-/s-polarized light at an incidence angle of 30°) of the optical filters 40(a) and 40(d). Also for the optical filters 40(b) and 40(c), the same calculation results can be obtained.

The absorption layers whose optical characteristics are illustrated in FIG. 4 in the optical filter 40 in this example satisfy the conditions of (i-1) to (i-3) as described above, and the reflection layer combined with the absorption layers also satisfies the conditions of (ii-1) and (ii-2) as described above.

From the spectral transmittance curves illustrated in FIGS. 20A and 20B, each of the optical filters 40(a) to (d) in Example 2 satisfies the following optical characteristics. More specifically, each of the optical filters exhibits spectral transmittances, with respect to light at incidence angles of 0° to 30°, having an average transmittance for light of wavelengths of 420 to 600 nm where the visibility is high of 97% or more and a transmittance for light of wavelengths of 690 to 720 nm of 2% or less, and approximately correcting the spectral transmittance curves of a wavelength of 600 to 690 nm to the visibility curve. Further, the average transmittance for unrequired light of wavelengths of 700 to 1150 nm being noise light is 0.8% or less, showing that the change in spectral transmittance with respect to light at incidence angles of 0° to 30° is small. Further, in wavelengths of 654 to 900 nm where the transmittance is 50% or less in wavelengths of 600 to 900 nm, the transmittance difference between the incidence angles of 0° and 30° is 0 to 2%, and the transmittance change satisfies 30% or less.

Example 3

A manufacturing example of the optical filter 30 will be described in this example. First of all, the first reflection layer 12a listed in Table 3 and the second reflection layer 12b listed in Table 4 are formed on one principal surface and the other principal surface of the same transparent substrate 13 as that in Example 1 respectively. Next, the absorption layer 11 in which a squarylium-based compound having a $\lambda(DA\_T_{min})$=695 nm as the absorbent DA and a squarylium-based compound having a $\lambda(DB\_T_{mini})$=735 nm as the absorbent DB are contained in the transparent resin, is formed on the surface of the first reflection layer. Specifically, the absorption layer is obtained by applying by the die coating method a coating solution made by mixing the absorbents DA and DB and a cyclohexanone solution of an acrylic resin having a refractive index of 1.49 at a predetermined mass ratio and then stirring and dissolving them at room temperature, and then drying the solution by heating. Here, the absorbents DA and DB are adjusted so that the effective thickness ratios (CL(A), CL(B)) are (1.8, 2.4), (1.8, 3.6), (2.0, 2.4) or (2.0, 3.6). Note that as the calculation results of spectral transmittances of only the absorption layer with respect to light of wavelengths of 550 to 800 nm, those in FIG. 10 can be referred to.

Figure 21A:
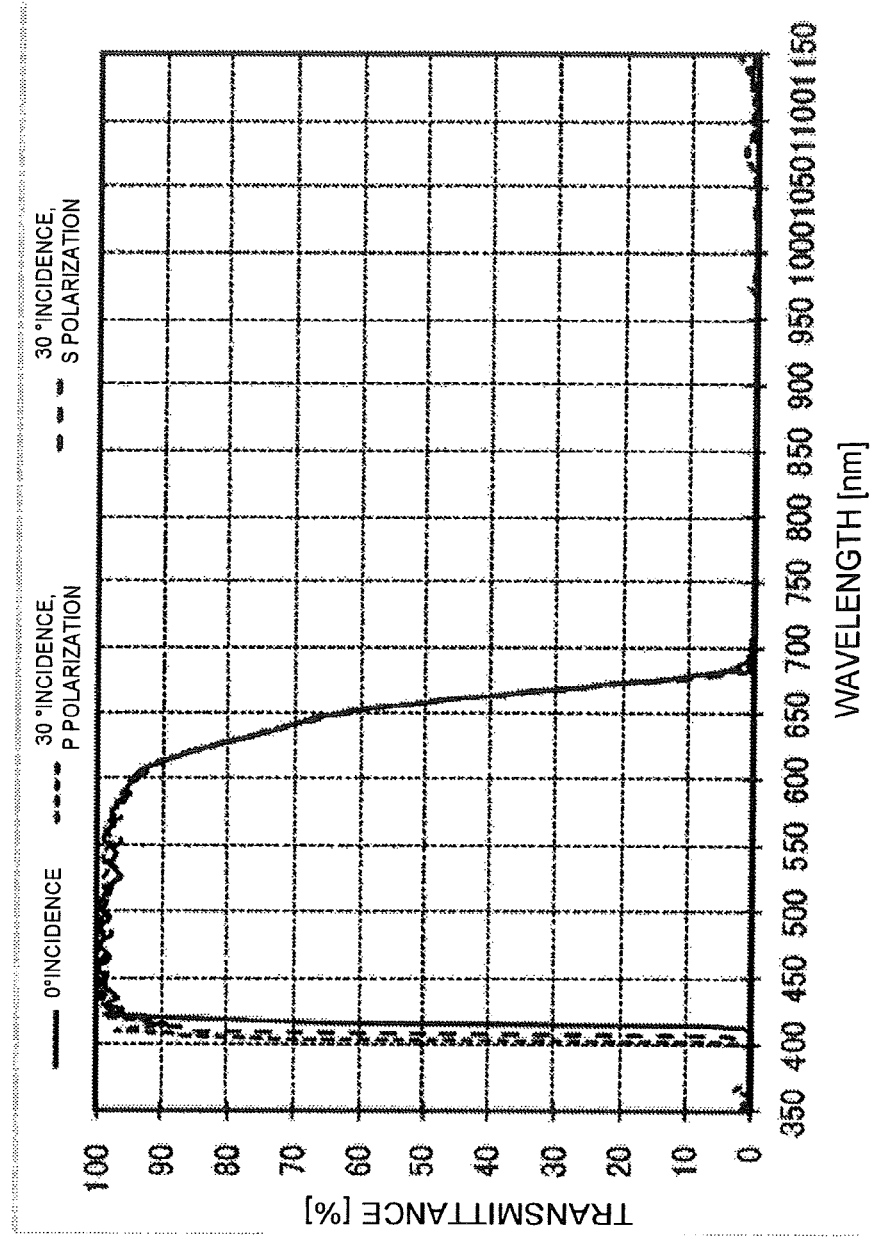
FIG. 21A is a graph illustrating calculation results of spectral transmittances of an optical filter 30(a) in Example 3.

Further, the anti-reflection layer 14 composed of three layers of $Al_2O_3$, $ZrO_2$ and $MgF_2$ is formed on the air interface of the absorption layer 11 to obtain four kinds of optical filters 30(a) to (d) having a residual reflectivity with respect to visible light of wavelengths of 400 to 700 nm at incidence angles of 0° to 30° set to 1.5% or less. FIGS. 21A and 21B illustrate calculation results of spectral transmittance curves (at an incidence angle of 0° and p-/s-polarized light at an incidence angle of 30°) of the optical filters 30(a) and 30(d). Also for the optical filters 30(b) and 30(c), the same calculation results can be obtained.

The absorption layers whose optical characteristics are illustrated in FIG. 10 in the optical filter 30 in this example satisfy the conditions of (i-4) to (i-6) as described above, and the reflection layer combined with the absorption layers also satisfies the conditions of (ii-3) to (ii-5) as described above.

From the spectral transmittance curves illustrated in FIGS. 21A and 21B, each of the optical filters 30(a) to (d) in Example 3 satisfies the following optical characteristics. More specifically, each of the optical filters exhibits spectral transmittances, with respect to light at incidence angles of 0° to 30°, having an average transmittance for light of wavelengths of 430 to 600 nm where the visibility is high of 96% or more and a transmittance for light of wavelengths of 690 to 720 nm of 2% or less, and approximately correcting the spectral transmittance curves of wavelengths of 600 to 690 nm to the visibility curve. Further, the average transmittance for unrequired light of wavelengths of 700 to 1150 nm being noise light is 0.4% or less, showing that the change in spectral transmittance with respect to light at incidence angles of 0° to 30° is small. Further, in wavelengths of 658 to 900 nm where the transmittance is 50% or less in wavelengths of 600 to 900 nm, the transmittance difference between the incidence angles of 0° and 30° is 0 to 4%, and the transmittance change satisfies 30% or less.

Example 4

A manufacturing example of the optical filter 40 will be described in this example. First of all, the first reflection layer 12a listed in Table 3 and the second reflection layer 12b listed in Table 4 are formed in the order illustrated in FIG. 1D on one principal surface of the same transparent substrate 13 as that in Example 2. Next, the design wavelength $\lambda_0$ of the first reflection layer listed in Table 3 is adjusted so that the near-infrared reflection band shifts by about 10 nm to the longer wavelength side, so as to conform to the spectral transmittance of the absorption layer. Further, the configurations in Table 3 and Table 4 are adjusted to prevent occurrence of large transmission ripples in a wavelength range where the reflection bands in the first and second reflection layers overlap.

Next, the near-infrared absorption layer 11 in which a squarylium-based compound having a $\lambda(DA\_T_{min})=705$ nm as the absorbent DA and a squarylium-based compound having a $\lambda(DB\_T_{min})=765$ nm as the absorbent DB are contained in the transparent resin, is formed on the other surface of the transparent substrate 13. Specifically, the absorption layer of 10 μm thick is obtained by applying by the die coating method a coating solution made by mixing the absorbents DA and DB and a cyclopentanone solution of a polycarbonate resin having a refractive index of 1.59 at a predetermined mass ratio and then stirring and dissolving them at room temperature, and then drying the solution by heating. Here, the absorbents DA and DB are adjusted so that the effective thickness ratios (CL(A), CL(B)) are (2.0, 2.8), (2.0, 4.0), (2.6, 2.8) or (2.6, 4.0). Note that as the calculation results of spectral transmittances of only the absorption layer with respect to light of wavelengths of 550 to 800 nm, those in FIG. 11 can be referred to.

Figure 22A:
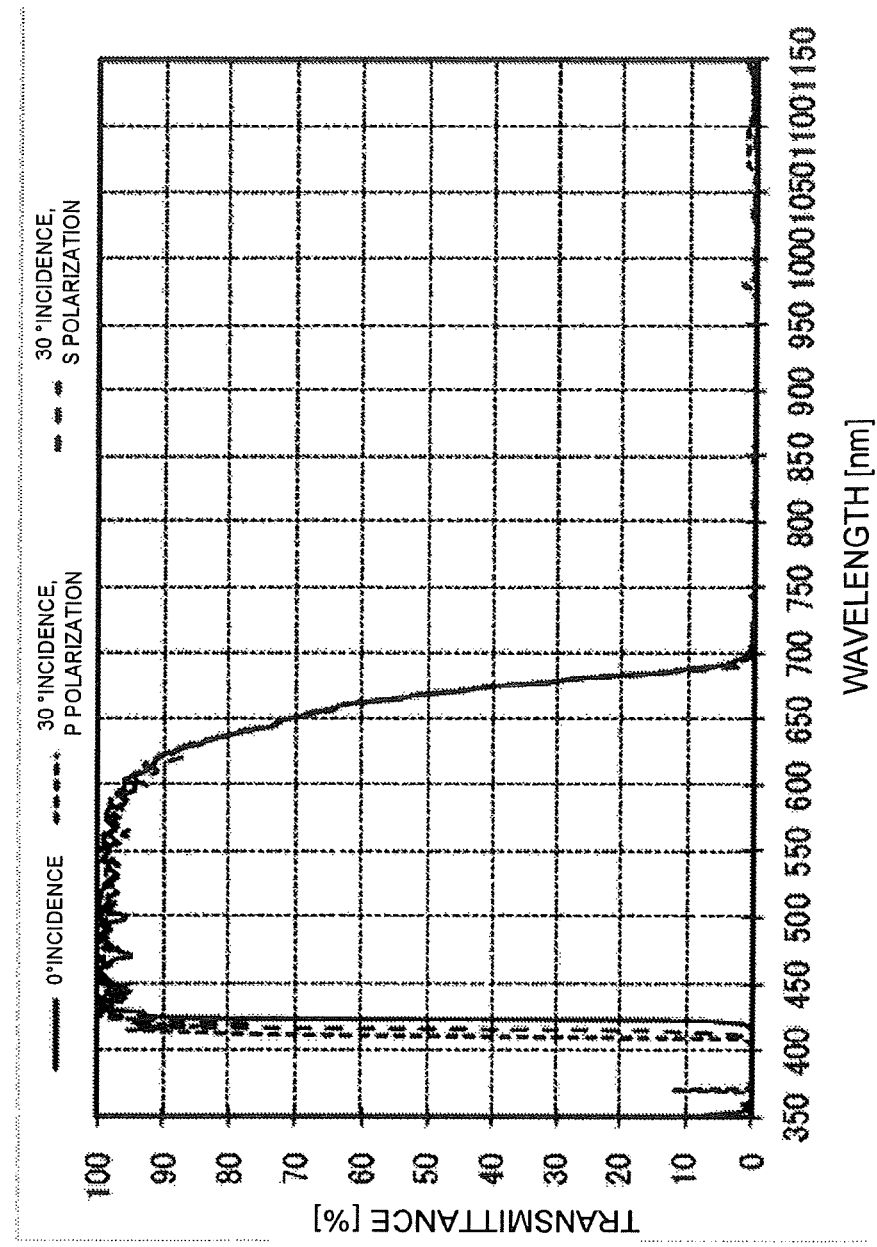
FIG. 22A is a graph illustrating calculation results of spectral transmittances of an optical filter 40(a) in Example 4.
Figure 22B:
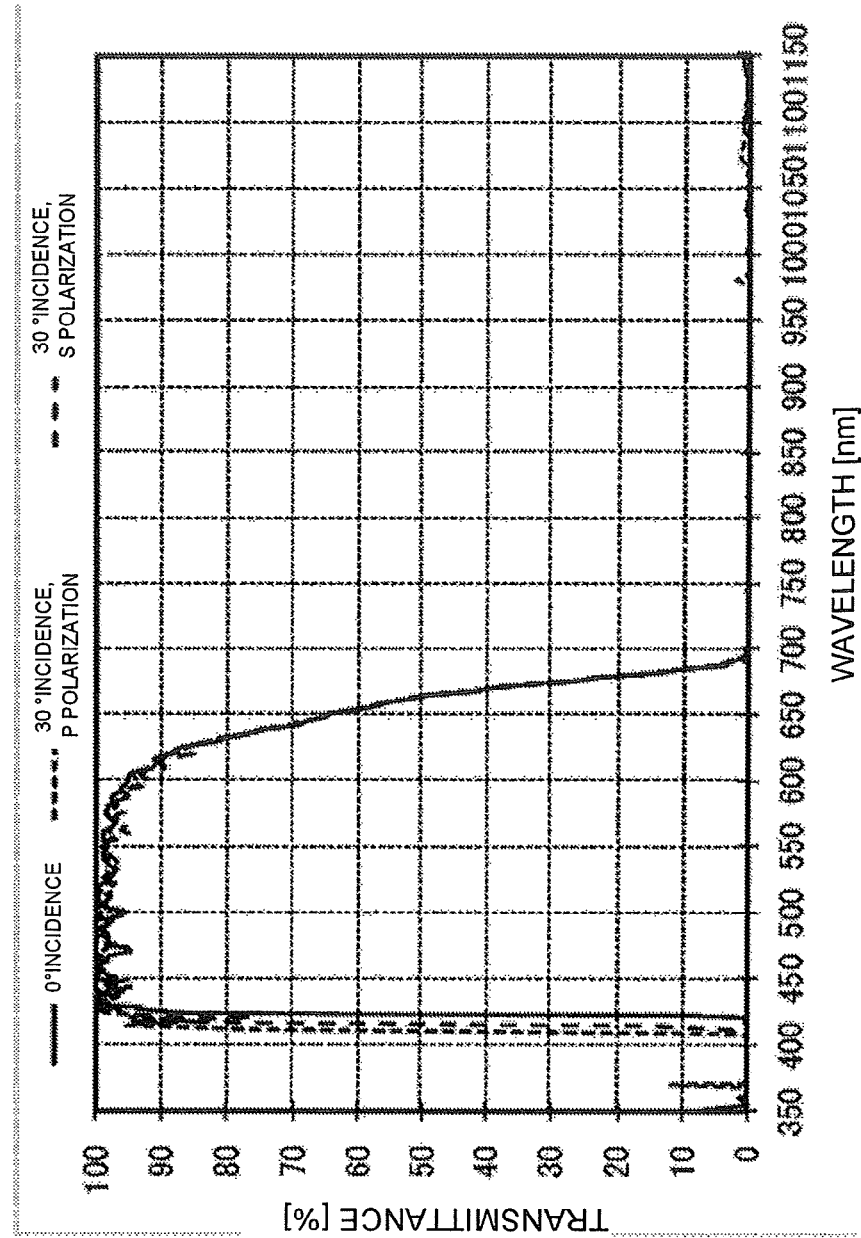
FIG. 22B is a graph illustrating calculation results of spectral transmittances of an optical filter 40(d) in Example 4.

Further, the anti-reflection layer 14 composed of four layers of $TiO_2$ and $SiO_2$ is formed on the air interface of the absorption layer 11 to obtain four kinds of optical filters 40(a) to (d) having a residual reflectivity with respect to visible light of wavelengths of 400 to 700 nm at incidence angles of 0° to 30° set to 1.5% or less. FIGS. 22A and 22B illustrate calculation results of spectral transmittance curves (at an incidence angle of 0° and p-/s-polarized light at an incidence angle of 30°) of the optical filters 40(a) and 40(d). Also for the optical filters 40(b) and 40(c), the same calculation results can be obtained.

The absorption layers whose optical characteristics are illustrated in FIG. 11 in the optical filter 40 in this example satisfy the conditions of (i-4) to (i-6) as described above, and the reflection layer combined with the absorption layers also satisfies the conditions of (ii-3) to (ii-5) as described above.

From the spectral transmittance curves illustrated in FIGS. 22A and 22B, each of the optical filters 40(a) to (d) in Example 4 satisfies the following optical characteristics. More specifically, each of the optical filters exhibits spectral transmittances, with respect to light at incidence angles of 0° to 30°, having an average transmittance for light of wavelengths of 430 to 600 nm where the visibility is high of 97% or more and a transmittance for light of wavelengths of 690 to 720 nm of 5% or less, and approximately correcting the spectral transmittance curves of wavelengths of 600 to 690 nm to the visibility curve. Further, the average transmittance for unrequired light of wavelengths of 700 to 1150 nm being noise light is 0.3% or less, showing that the change in spectral transmittance with respect to light at incidence angles of 0° to 30° is small. Further, in wavelengths of 664 to 900 nm where the transmittance is 50% or less in wavelengths of 600 to 900 nm, the transmittance difference between the incidence angles of 0° and 30° is 0 to 6%, and the transmittance change satisfies 30% or less.

As described above, the optical filters 30(a) to (d) and the optical filters 40(a) to (d) in Examples 1, 2 and the optical filters 30(a) to (d) and the optical filters 40(a) to (d) in Examples 3, 4 have the following characteristics. Specifically, these optical filters block light of wavelengths of 700 to 1150 nm at incidence angles of 0° to 30° for which the human eye does not have sensitivity but an solid-state image sensing device equipped with an RGB filter has sensitivity. In addition, these optical filters have little or no fluctuation in spectral transmittance for light of wavelengths of 600 to 690 nm at incidence angles of 0° to 30°, correct the spectral sensitivity of the solid-state image sensing device to the spectral transmittance curve approximated to the visibility, and obtain high transmittance with respect to light of wavelengths of 430 to 600 nm. In particular, these optical filters have high light blocking property against light of wavelengths of 690 to 720 nm and have little or no incidence angle/polarization dependence of the spectral transmittance curves where the transmittance for light of wavelengths of 650 to 700 nm becomes 50% or less, so that an image excellent in color reproducibility can be obtained when it is mounted on an imaging device. Further, Examples 3 and 4 can provide optical filters each having a higher transmittance with respect to light of wavelengths of 600 to 650 nm of 55 to 70% and less light amount loss than those in Examples 1 and 2.

Comparative Example 3

An optical filter in Comparative example 3 uses the reflection layer used in Example 1, in place of the reflection layer having less incidence angle/polarization dependence of the spectral transmittances used in Example 4. Other than that, the optical filter is made to have the same configuration as that in Example 4. More specifically, the absorption layers satisfy the conditions of (i-4) to (i-6) but the reflection layer combined with the absorption layers does not satisfy all of the conditions of (ii-3) to (ii-5). Accordingly, in wavelengths of 600 to 700 nm, the shift amount of the spectral transmittance curves of the reflection layer at which the transmittance becomes 50% with respect to light at incidence angles of 0° to 30° expands to 36 nm in this comparative example, whereas it is 20 nm in Example 4.

Figure 23:
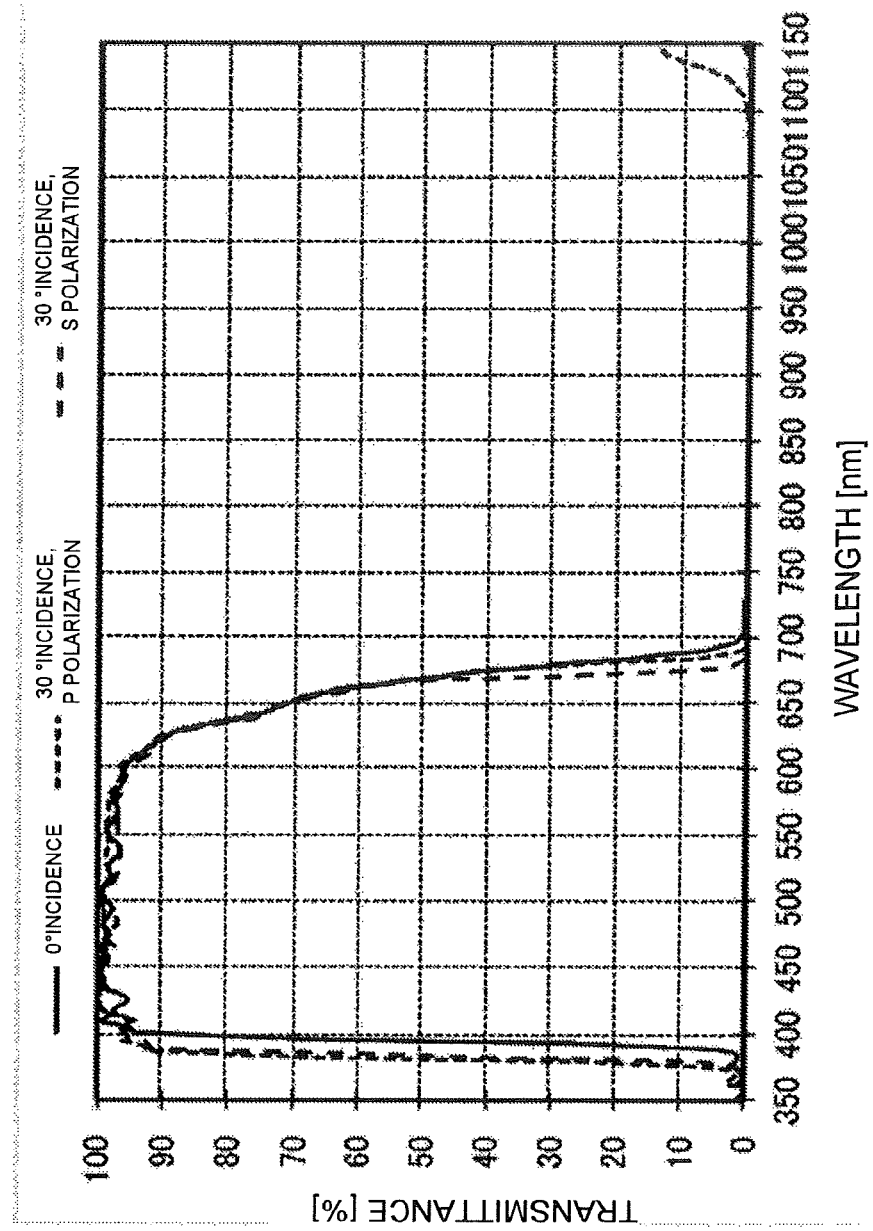
FIG. 23 is a graph illustrating calculation results of spectral transmittances of an optical filter in Comparative example 3.

FIG. 23 illustrates calculation results of spectral transmittance curves (at an incidence angle of 0° and p-/s-polarized light at an incidence angle of 30°) of the optical filter in Comparative example 3. The optical filter in Comparative example 3 has little or no incidence angle/polarization dependence of the spectral transmittances in wavelengths of 696 to 800 nm, so that light blocking property of a transmittance of 2% or less can be obtained. However, in wavelengths of 668 to 692 nm where the transmittance is 50% or less, the difference in transmittance between the incidence angles of 0° and 30° differ such as 4 to 31%. In other words, when the optical filter made by combining the reflection layer in Example 1 and the absorption layers in Example 4 is configured as in Comparative example 3, the light blocking property against light of wavelengths of 668 to 692 nm at incidence angles of 0° to 30° is insufficient due to the incidence angle/polarization dependence of the reflection layer.

Comparative Example 4

An optical filter in Comparative example 4 is configured such that the reflection layer is designed to have a design wavelength $\lambda_0$ adjusted so that the reflection band shifts by about 20 nm to the longer wavelength side so as to decrease the incidence angle/polarization dependence of the transmittance with respect to light of wavelengths of 668 to 692 nm, and configured similarly to that in Comparative example 3 other than that. More specifically, the absorption layers satisfy the conditions of (i-4) to (i-6) but the reflection layer combined with the absorption layers does not satisfy all of the conditions of (ii-3) to (ii-5).

Figure 24:
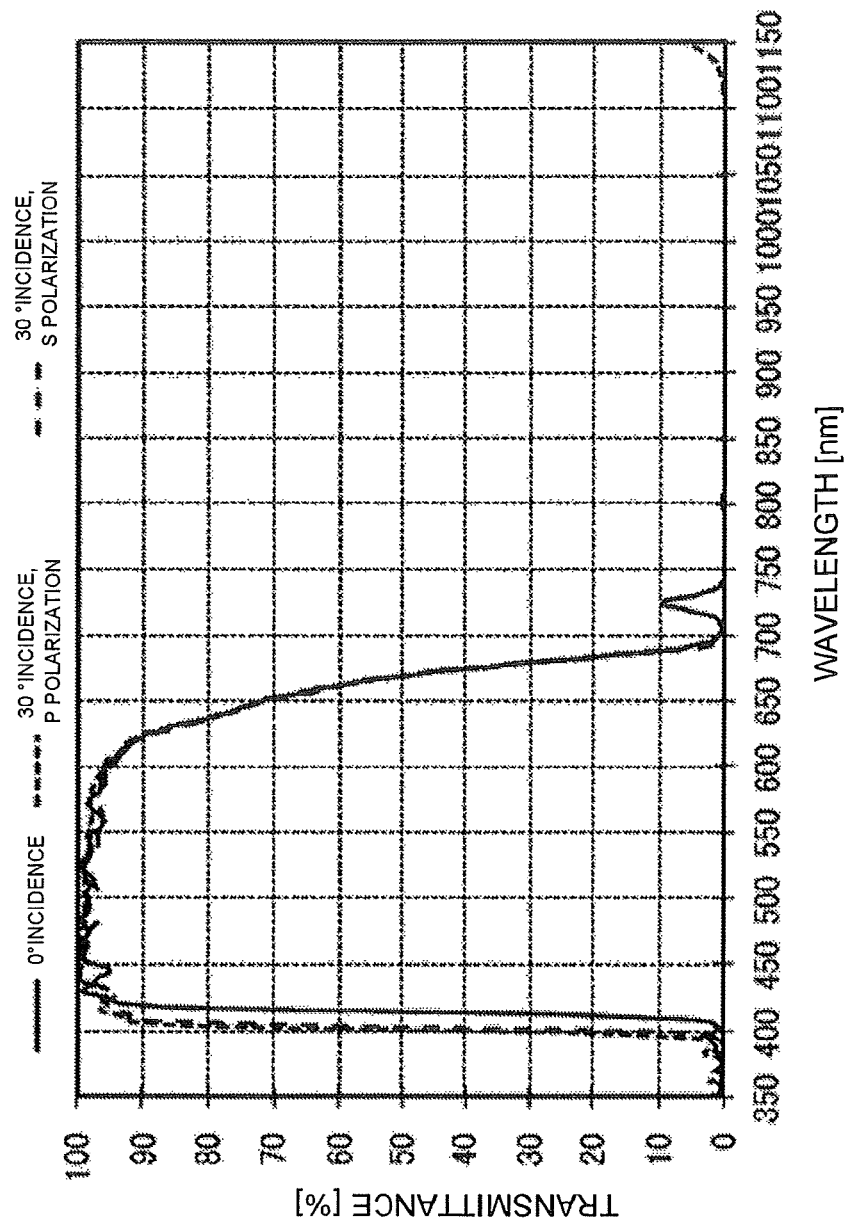
FIG. 24 is a graph illustrating calculation results of spectral transmittances of an optical filter in Comparative example 4.

FIG. 24 illustrates calculation results of spectral transmittance curves (at an incidence angle of 0° and p-/s-polarized light at an incidence angle of 30°) of the optical filter in Comparative example 4. The optical filter in Comparative example 4 can obtain spectral transmittances with little or no transmittance change of light at the incidence angles of 0° and 30° in wavelengths of 668 to 700 nm where the transmittance is 50% or less. Further, the optical filter in Comparative example 4 exhibits a transmittance of 0.5% or less for light of wavelengths of 715 to 734 nm near $\lambda_C(T_{max})$ of the absorption layer at an incidence angle of 30°, but has a transmission band of a transmittance of 2% or more and 10% at maximum with respect to light of the above wavelengths at an incidence angle of 0°. In other words, the optical filter in Comparative example 4 is insufficient in light blocking property of the absorption layer against light of wavelengths of 710 to 740 nm with respect to light at incidence angles of 0° to 30° due to the incidence angle/polarization dependence of the reflection layer.

Reference Example

An optical filer in this example uses, in Example 4, an absorption-type glass substrate containing CuO (NF-50E manufactured by ASAHI GLASS CO., LTD.) as the transparent substrate 13 and uses the near-infrared absorption layer 11 in which only a squarylium-based compound having a $\lambda(DA\_T_{min})$=705 nm as the absorbent DA is contained in the transparent resin. In short, the absorption layer has the resin layer containing the absorbent DA and the absorption-type glass substrate containing CuO as the absorbent DB. Other than that, the optical filter is made to have the same configuration as that in Example 4.

Here, the absorption-type glass substrate is processed to have a thickness of 0.2 mm so that the transmittance $T_{min}$ at a wavelength $\lambda(DB\_T_{min})$=850 nm becomes about 20%. Since the near-infrared absorption wavelength band is wider than the absorbent DB in which a dye is contained in the transparent resin in Examples 1 to 4, the absorption-type glass substrate having a $T_{min}$=10 to 30% is used so as to suppress the decrease in transmittance in the visible range.

As a result, the optical filter exhibits spectral transmittances, with respect to light at incidence angles of 0° to 30°, having an average transmittance for light of wavelengths of 430 to 600 nm where the visibility is high of 94% or more and a transmittance for light of wavelengths of 690 to 720 nm of 5% or less, and approximately correcting the spectral transmittance curves of wavelengths of 600 to 690 nm to the visibility curve. Further, the average transmittance for unrequired light of wavelengths of 700 to 1150 nm being noise light is 0.3% or less, showing that the change in spectral transmittance with respect to light at incidence angles of 0° to 30° is small. Further, in wavelengths of 660 to 900 nm where the transmittance is 50% or less in wavelengths of 600 to 900 nm, the transmittance difference between the incidence angles of 0° and 30° is 0 to 5%, and the transmittance change satisfies 30% or less.

The optical filter of the present invention is useful as an optical filter used in an imaging device such as a digital still camera, a camera of mobile phone or the like, which uses a solid-state image sensing device.

What is claimed is:

1. An optical filter comprising:
an absorption layer containing a first near-infrared absorbent (DA) having a maximum absorption wavelength $\lambda(DA\_T_{min})$ in wavelengths of 685 to 715 nm and a second near-infrared absorbent (DB) having a maximum absorption wavelength $\lambda(DB\_T_{min})$ in wavelengths of 705 to 725 nm, and satisfying the following requirements (i-1) to (i-3); and
a reflection layer comprising a dielectric multilayer film satisfying the following requirements (ii-1) to (ii-2),
(i-1) 10 nm≤$\lambda(DB\_T_{min})$−$\lambda(DA\_T_{min})$<40 nm,
(i-2) a transmittance for light of a wavelength of 600 nm is 80% or more, a transmittance for light of a wavelength of 650 nm is 40% or more, a transmittance for light of a wavelength of 700 nm is 3% or less, and a transmittance for light of a wavelength of 714 nm is 10% or less,
(i-3) {$\lambda Sh(DAB\_T50\%)$−$\lambda Sh(DAB\_T90\%)$}≥{$\lambda Sh(DAB\_T5\%)$−$\lambda Sh(DAB\_T50\%)$}
where $\lambda Sh(DAB\_T90\%)$, $\lambda Sh(DAB\_T50\%)$ and $\lambda Sh(DAB\_T5\%)$ indicate wavelengths at which transmittances in wavelengths of 580 nm to $\lambda(DA\_T_{min})$ become 90%, 50% and 5% respectively,
(ii-1) the reflection layer has a reflection band where a transmittance with respect to light at an incidence angle of 0° in wavelengths of 700 to 1150 nm becomes 5% or less, and
(ii-2) $\lambda Sh(DAB\_T10\%)$+30 nm<$\lambda_R(0°\_T50\%)$<$\lambda Lo(DAB\_T5\%)$
where $\lambda_R(0°\_T50\%)$ indicates a wavelength at which a transmittance with respect to the light at the incidence angle of 0° in wavelengths of 680 to 750 nm becomes 50%, $\lambda Sh(DAB\_T10\%)$ indicates a wavelength at which a transmittance of the absorption layer in the wavelengths of 580 nm to $\lambda(DA\_T_{min})$ becomes 10%, and $\lambda Lo(DAB\_T5\%)$ indicates a wavelength at which a transmittance thereof in wavelengths $\lambda(DB\_T_{min})$ to 800 nm becomes 5%.

2. The optical filter according to claim 1,
wherein an absorption wavelength band width $\Delta\lambda_{abs}$(T10%) where the transmittance becomes 10% or less in a vicinity of a wavelength of 700 nm of the absorption layer is 40 nm or more.

3. The optical filter according to claim 1, satisfying the following requirements (1) and (2) in spectral transmittance curves at incidence angles of 0° to 30°,
(1) an average transmittance in wavelengths of 440 to 600 nm is 80% or more, and
(2) a transmittance in a whole range of wavelengths of 690 to 720 nm is 5% or less.

4. The optical filter according to claim 1,
wherein an average transmittance with respect to light of wavelengths of 350 to 390 nm in a spectral transmittance curve at the incidence angle of 0° is 10% or less.

5. The optical filter according to claim 1,
wherein a wavelength $\lambda Lo(30°\_Tp15\%)$ where a transmittance for p-polarized light at the incidence angle of 30° of the reflection layer becomes 15% is more than 1150 nm.

6. The optical filter according to claim 1,
wherein the absorption layer contains a near-ultraviolet absorbent having a maximum absorption wavelength $\lambda(DU\_T_{min})$ in wavelengths of 370 to 405 nm and having a wavelength $\lambda Lo(DU\_T50\%)$ at which a transmittance becomes 50% in wavelengths of 400 to 420 nm.

7. The optical filter according to claim 1,
wherein a difference between a transmittance with respect to light at the incidence angle of 0° and a transmittance with respect to light at the incidence angle of 30° of a wavelength at which a transmittance becomes 50% or less in spectral transmittance curves in wavelengths of 600 to 900 nm is 30% or less.

8. The optical filter according to claim 1, further comprising a transparent substrate.

9. The optical filter according to claim 8, wherein the transparent substrate is an absorption glass.

10. The optical filter according to claim 9, wherein the absorption glass is a fluorophosphate-based glass or a phosphate-based glass containing CuO.

11. The optical filter according to claim 1, wherein the first near-infrared absorbent (DA) contains at least one kind selected from a squarylium-based compound, a cyanine-based compound, a phthalocyanine-based compound, a naphthalocyanine-based compound, a dithiol metal complex-based compound, and a diimonium-based compound.

12. An imaging device comprising the optical filter according to claim 1.

13. An optical filter comprising:
an absorption layer containing a first near-infrared absorbent (DA) having a maximum absorption wavelength $\lambda(DA\_T_{min})$ in wavelengths of 685 to 715 nm and a second near-infrared absorbent (DB) having a maximum absorption wavelength $\lambda(DB\_T_{min})$ in wavelengths of more than 725 nm and 900 nm or less, and the satisfying following requirements (i-4) to (i-6); and
a reflection layer comprising a dielectric multilayer film satisfying the following requirements (ii-3) to (ii-5),
(i-4) 40 nm≤$\lambda(DB\_T_{min})-\lambda(DA\_T_{min})$≤215 nm,
(i-5) a transmittance for light of a wavelength of 600 nm is 80% or more, a transmittance for light of a wavelength of 650 nm is 40% or more, a transmittance for light of the wavelength $\lambda(DA\_T_{min})$ is 3% or less, and a transmittance for light of the wavelength $\lambda(DB\_T_{min})$ is 3% or less,
(i-6) {$\lambda Sh(DAB\_T50\%)-\lambda Sh(DAB\_T90\%)$}≥{$\lambda Sh(DAB\_T5\%)-\lambda Sh(DAB\_T50\%)$}
where $\lambda Sh(DAB\_T90\%)$, $\lambda Sh(DAB\_T50\%)$ and $\lambda Sh(DAB\_T5\%)$ indicate wavelengths at which transmittances in wavelengths of 580 nm to $\lambda(DA\_T_{min})$ become 90%, 50% and 5% respectively,
(ii-3) the reflection layer has a reflection band where a transmittance with respect to light at an incidence angle of 0° in wavelengths of 700 to 1150 nm becomes 5% or less,
(ii-4) $\lambda Sh(DAB\_T10\%)+20$ nm<$\lambda_R(0°\_T50\%)$<$\lambda_C(T_{max})$
where $\lambda_R(0°\_T50\%)$ indicates a wavelength at which a transmittance with respect to the light at the incidence angle of 0° in wavelengths of 680 to 750 nm becomes 50%, $\lambda Sh(DAB\_T10\%)$ indicates a wavelength at which a transmittance of the absorption layer in the wavelengths of 580 nm to $\lambda(DA\_T_{min})$ becomes 10%, and $\lambda_C(T_{max})$ indicates a wavelength at which a transmittance of the absorption layer becomes maximum in wavelengths $\lambda(DA\_T_{min})$ to $\lambda(DB\_T_{min})$, and
(ii-5) 0 nm<$\delta\lambda_R Sh(T50\%)$≤25 nm
where $\delta\lambda_R Sh(T50\%)$ indicates a difference between $\lambda_R(0°\_T50\%)$ and $\lambda_R(30°\_Ts50\%)$, and $\lambda_R(30°\_Ts50\%)$ indicates a wavelength at which a transmittance with respect to s-polarized light at an incidence angle of 30° in wavelengths of 640 to 750 nm becomes 50%.

14. The optical filter according to claim 13, wherein the absorption layer has a resin layer containing the first near-infrared absorbent (DA) and an absorption glass containing the second near-infrared absorbent (DB).

15. The optical filter according to claim 13, satisfying the following requirements (1) and (2) in spectral transmittance curves at incidence angles of 0° to 30°,
(1) an average transmittance in wavelengths of 440 to 600 nm is 80% or more, and
(2) a transmittance in a whole range of wavelengths of 690 to 720 nm is 5% or less.

16. The optical filter according to claim 13, wherein an average transmittance with respect to light of wavelengths of 350 to 390 nm in a spectral transmittance curve at the incidence angle of 0° is 10% or less.

17. The optical filter according to claim 13, wherein a wavelength $\lambda Lo(30°\_Tp15\%)$ where a transmittance for p-polarized light at the incidence angle of 30° of the reflection layer becomes 15% is more than 1150 nm.

18. The optical filter according to claim 13, wherein the absorption layer contains a near-ultraviolet absorbent having a maximum absorption wavelength $\lambda(DU\_T_{min})$ in wavelengths of 370 to 405 nm and having a wavelength $\lambda Lo(DU\_T50\%)$ at which a transmittance becomes 50% in wavelengths of 400 to 420 nm.

19. The optical filter according to claim 13, wherein a difference between a transmittance with respect to light at the incidence angle of 0° and a transmittance with respect to light at the incidence angle of 30° of a wavelength at which a transmittance becomes 50% or less in spectral transmittance curves in wavelengths of 600 to 900 nm is 30% or less.

20. The optical filter according to claim 13, further comprising a transparent substrate.

21. The optical filter according to claim 20, wherein the transparent substrate is an absorption glass.

22. The optical filter according to claim 21, wherein the absorption glass is a fluorophosphate-based glass or a phosphate-based glass containing CuO.

23. The optical filter according to claim 13, wherein the first near-infrared absorbent (DA) contains at least one kind selected from a squarylium-based compound, a cyanine-based compound, a phthalocyanine-based compound, a naphthalocyanine-based compound, a dithiol metal complex-based compound, and a diimonium-based compound.

24. An imaging device comprising the optical filter according to claim 13.

* * * * *

UNITED STATES PATENT AND TRADEMARK OFFICE
CERTIFICATE OF CORRECTION

PATENT NO. : 10,746,908 B2
APPLICATION NO. : 15/819670
DATED : August 18, 2020
INVENTOR(S) : Yoshiharu Ooi et al.

It is certified that error appears in the above-identified patent and that said Letters Patent is hereby corrected as shown below:

On the Title Page

Item (63), the Related U.S. Application Data is incorrect. Item (63) should read:
-- (63) Related U.S. Application Data
Continuation of application PCT/JP2016/078010, filed on September 23, 2016. --

Signed and Sealed this
Twenty-ninth Day of September, 2020

Andrei Iancu
*Director of the United States Patent and Trademark Office*